United States Patent
Takahashi et al.

(10) Patent No.: US 8,891,117 B2
(45) Date of Patent: Nov. 18, 2014

(54) IMAGE FORMING DEVICE AND CONTROL METHOD FOR CHANGING A PROTOCOL TO REDUCE POWER CONSUMPTION

(75) Inventors: Kenichi Takahashi, Sennan-gun (JP); Kazuaki Tomono, Itami (JP); Daisuke Sakiyama, Kawanishi (JP); Takehisa Yamaguchi, Ikoma (JP); Toshikazu Kawaguchi, Kobe (JP)

(73) Assignee: Konica Minolta, Inc., Tokyo (JP)

( * ) Notice: Subject to any disclaimer, the term of this patent is extended or adjusted under 35 U.S.C. 154(b) by 107 days.

(21) Appl. No.: 13/399,736

(22) Filed: Feb. 17, 2012

(65) Prior Publication Data

US 2012/0224206 A1  Sep. 6, 2012

(30) Foreign Application Priority Data

Mar. 1, 2011 (JP) ................................. 2011-043655

(51) Int. Cl.
  *G06F 3/12* (2006.01)
(52) U.S. Cl.
  CPC ............ *G06F 3/1236* (2013.01); *G06F 3/1221* (2013.01); *G06F 3/1229* (2013.01); *Y02B 60/1271* (2013.01); *G06F 3/1285* (2013.01)
  USPC ........ 358/1.15; 358/1.13; 358/1.14; 709/230; 710/11
(58) Field of Classification Search
  CPC ... G06F 1/3284; G06F 3/1221; G06F 3/1236; G03G 15/5004
  USPC .................... 358/1.13–1.15; 709/230; 710/11
  See application file for complete search history.

(56) References Cited

U.S. PATENT DOCUMENTS

| 7,389,431 | B2 | 6/2008 | Ohara | |
| 7,756,434 | B2* | 7/2010 | Murata | 399/70 |
| 8,462,375 | B2* | 6/2013 | Murata | 358/1.15 |
| 2006/0010331 | A1* | 1/2006 | Ohara | 713/323 |
| 2006/0218440 | A1 | 9/2006 | Inoue | |

(Continued)

FOREIGN PATENT DOCUMENTS

| JP | H10-308790 A | 11/1998 |
| JP | 2006-25212 | 1/2006 |

(Continued)

OTHER PUBLICATIONS

Japanese Decision to Grant a Patent for Application No. 2011-043655, mailed on Mar. 4, 2014 (3 pages).

*Primary Examiner* — Peter K Huntsinger
(74) *Attorney, Agent, or Firm* — Osha Liang LLP

(57) ABSTRACT

An image forming device that operates in one of power-saving mode and normal mode by switching therebetween comprises: an automatic response unit configured to perform control to switch from the power-saving mode to the normal mode in accordance with a protocol on which a request issued by an information terminal device is based; an analysis unit configured to analyze whether or not the information terminal device has issued a request based on a protocol that requires the switching from the power-saving mode to the normal mode without a job execution; a message generation unit configured to, when the result of the analysis by the analysis unit is affirmative, generate a message for causing the information terminal device to change the protocol; and a transmission unit configured to transmit the generated message.

18 Claims, 33 Drawing Sheets

(56) References Cited

U.S. PATENT DOCUMENTS

| | | | |
|---|---|---|---|
| 2007/0174478 A1* | 7/2007 | Ryu et al. | 709/231 |
| 2007/0288606 A1 | 12/2007 | Kito et al. | |
| 2008/0025305 A1* | 1/2008 | Choi | 370/390 |
| 2009/0002753 A1* | 1/2009 | Mitsuoka et al. | 358/1.15 |
| 2009/0086270 A1* | 4/2009 | Miyazawa | 358/1.15 |
| 2011/0185201 A1* | 7/2011 | Kawakami et al. | 713/320 |

FOREIGN PATENT DOCUMENTS

| | | |
|---|---|---|
| JP | 2006-069008 A | 3/2006 |
| JP | 2006-108899 A | 4/2006 |
| JP | 2006-309731 A | 11/2006 |
| JP | 2007-052544 A | 3/2007 |
| JP | 2010-234726 A | 10/2010 |

\* cited by examiner

FIG. 4

Automatic response protocol list

| Automatic response protocol information ||
|---|---|
| Item No. | Protocol No. |
| 1 | No. of protocol A |
| 2 | No. of protocol B |
| 3 | No. of protocol C |
| 4 | No. of protocol X |

Communication history list

| Item No. | Communication history information | | | | | |
|---|---|---|---|---|---|---|
| | Protocol No. | Transmission source | Job execution record | Reception mode | Return record | Reception time |
| 1 | No. of protocol X | PC3 | Not executed | Power-saving | Not returned | 2009/6/1 10:30 |
| 2 | No. of protocol X | PC3 | Not executed | Power-saving | Not returned | 2009/6/2 10:30 |

Communication history list 141i

| Item No. | Protocol No. | Transmission source | Job execution record | Reception mode | Return record | Reception time |
|---|---|---|---|---|---|---|
| | | | | Communication history information 141j | | |
| 1 | No. of protocol A | PC1 | Executed | Power-saving | Returned | 2009/6/1 10:20 |
| 2 | No. of protocol B | PC2 | Executed | Power-saving | Returned | 2009/6/1 10:25 |
| 3 | No. of protocol A | PC1 | Executed | Power-saving | Returned | 2009/6/1 10:26 |
| 4 | No. of protocol X | PC3 | Not executed | Power-saving | Returned | 2009/6/1 10:30 |
| 5 | No. of protocol A | PC1 | Executed | Power-saving | Returned | 2009/6/1 10:35 |
| 6 | No. of protocol X | PC3 | Executed | Power-saving | Returned | 2009/6/1 10:36 |
| 7 | No. of protocol X | PC3 | Not executed | Power-saving | Returned | 2009/6/2 10:30 |

FIG. 7

Communication history list 141k

| Item No. | Communication history information ||||||
|---|---|---|---|---|---|---|
| | Protocol No. | Transmission source | Job execution record | Reception mode | Return record | Reception time |
| 1 | No. of protocol A | PC1 | Executed | Power-saving | Returned | 2009/6/1 10:20 |
| 2 | No. of protocol B | PC2 | Executed | Power-saving | Returned | 2009/6/1 10:25 |
| 3 | No. of protocol A | PC1 | Executed | Power-saving | Returned | 2009/6/1 10:26 |
| 4 | No. of protocol X | PC3 | Not executed | Power-saving | Returned | 2009/6/1 10:30 |
| 5 | No. of protocol A | PC1 | Executed | Power-saving | Returned | 2009/6/1 10:35 |
| 6 | No. of protocol X | PC3 | Executed | Power-saving | Returned | 2009/6/1 10:36 |
| 7 | No. of protocol X | PC3 | Not executed | Power-saving | Returned | 2009/6/2 10:30 |
| 8 | No. of protocol X | PC1 | Not executed | Normal | Not returned | 2009/6/4 14:30 |
| 9 | No. of protocol A | PC1 | Executed | Normal | Not returned | 2009/6/4 14:35 |
| 10 | No. of protocol X | PC3 | Executed | Normal | Not returned | 2009/6/4 14:36 |
| 11 | No. of protocol X | PC2 | Not executed | Normal | Not returned | 2009/6/4 14:30 |

Columns 141m (Reception mode, Return record) and 141n (Reception time) indicated.

FIG. 15

Alternative protocol list  ,142

| Alternative protocol information ||
|---|---|
| Target protocol No. | Alternative protocol No. |
| No. of protocol X | No. of protocol A |
| No. of protocol Y | No. of protocol A |

FIG. 17

Multicast protocol list   ↙144

| Protocol No. |
|---|
| No. of protocol X |
| No. of protocol Y |

Protocol changeover list

| Protocol changeover information ||
|---|---|
| Target protocol No. | Alternative protocol No. |
| No. of protocol X | No. of protocol A |
| No. of protocol Y | No. of protocol A |

Driver information list

| Driver information | |
|---|---|
| Transmission source | Protocol No. |
| PC1 | No. of protocol A |
| PC1 | No. of protocol B |
| PC1 | No. of protocol C |
| PC2 | No. of protocol A |
| PC2 | No. of protocol C |
| PC2 | No. of protocol X |
| PC3 | No. of protocol A |
| PC3 | No. of protocol B |
| PC3 | No. of protocol C |
| PC3 | No. of protocol D |
| PC3 | No. of protocol X |
| PC3 | No. of protocol Y |

- 145a (PC1 rows)
- 145b (PC2 rows)
- 145c (PC3 rows)

Driver information list

| Driver information | |
|---|---|
| Transmission source | Protocol No. |
| PC2 | No. of protocol X |
| PC3 | No. of protocol X |
| PC3 | No. of protocol Y |

146a — Transmission source column
146b — Protocol No. column

FIG. 27

```
                                                    305
┌─────────────────────────────────────────────────────┐
│ PCs that have a possibility of causing MFP to switch│
│ from power-saving mode to normal mode without job execution│
│ PC 2: Protocol X                                    │
│ PC 3: Protocols X and Y                             │
│                                                     │
│ Alternative protocols                               │
│ Protocol X → Protocol A                             │
│ Protocol Y → Protocol B                             │
└─────────────────────────────────────────────────────┘
```

FIG. 33

First return record list
(record of MFP returning from power-saving mode
to normal mode without executing job)

| Protocol No. | Transmission source | Job execution record | Reception mode | Reception time |
|---|---|---|---|---|
| No. of protocol X | PC3 | Not executed | Power-saving | 2009/6/1 10:30 |
| No. of protocol X | PC3 | Not executed | Power-saving | 2009/6/2 10:30 |

FIG. 34

Second return record list
(record of MFP returning from power-saving mode
to normal mode with job execution)

| Protocol No. | Transmission source | Job execution record | Reception mode | Reception time |
|---|---|---|---|---|
| No. of protocol A | PC1 | Executed | Power-saving | 2009/6/1 10:20 |
| No. of protocol B | PC2 | Executed | Power-saving | 2009/6/1 10:25 |
| No. of protocol A | PC1 | Executed | Power-saving | 2009/6/1 10:26 |
| No. of protocol A | PC1 | Executed | Power-saving | 2009/6/1 10:35 |
| No. of protocol X | PC3 | Executed | Power-saving | 2009/6/1 10:36 |

IMAGE FORMING DEVICE AND CONTROL METHOD FOR CHANGING A PROTOCOL TO REDUCE POWER CONSUMPTION

This application is based on an application No. 2011-043655 filed in Japan, the contents of which are hereby incorporated by reference.

BACKGROUND OF THE INVENTION (1) Field of the Invention

The present invention relates to power-saving control technology used in image forming devices, such as printers, copiers, facsimile machines, and multi-functional peripherals having the functions of printers, copiers, and facsimile machines.

(2) Description of the Related Art

In order to avoid wasteful consumption of power, some conventional image forming devices automatically switch to power-saving mode by shutting down power supply to a printer engine and a control panel when they have not received data from outside for a predetermined time period or longer, when no panel operation has been performed for a predetermined time period or longer, etc. After entering the power-saving mode, these image forming devices cancel the power-saving mode and return to normal mode when they receive data from outside, when a user performs a panel operation, etc.

Document 1 discloses, as one type of power-saving mode, deep sleep mode that makes use of a received packet. During the deep sleep mode, electrical conduction is always established between an image forming device and a LAN controller built in the image forming device, even when the main power of the image forming device is turned off. When the received packet includes a print request, the image forming device performs printing as requested. After the printing, if a first predetermined time has elapsed without the image forming device receiving any request from outside, the image forming device performs control so as to return to sleep mode. On the other hand, when the received packet does not include a print request, if a second predetermined time, which is shorter than the first predetermined time, has elapsed without the image forming device receiving any request from outside, the image forming device performs control so as to return to the deep sleep mode. In the above manner, after the deep sleep mode is cancelled, the time period for which the normal mode lasts is shortened when the received packet does not include a print request, thereby reducing a power consumption.

Incidentally, in order to connect computers and image forming devices (peripheral devices of the computers) to a network such as the Internet so as to allow the computers and the image forming devices to communicate with one another, a dynamic host configuration protocol (DHCP) server or a domain name system (DNS) server is required. The DHCP server automatically issues IP addresses and the like. The DNS server converts domain names into IP addresses. In light of the above, Bonjour, which does not require the DHCP server or DNS server, has been developed. Representative functions of Bonjour include automatic assignment of IP addresses and host names, and automatic discovery of services. When a device is connected to a Bonjour network, an IP address is automatically assigned to the device, and available services are notified to the device together with corresponding host names. Here, preset device names are used as host names. Bonjour uses multicast. The device sends, by multicasting, an inquiry to all the other devices connected to the network about which servers provide a desired service. In response, one or more servers that provide the desired service notify the device to that effect.

However, according to the technology disclosed in Document 1, the image forming device returns to the normal mode from the power-saving mode even in a case where the received packet does not include a print request. Furthermore, the technology disclosed in Document 1 is such that, when Bonjour is employed, the image forming device returns to the normal mode from the power-saving mode also in a case where the image forming device receives, from another device, a request that is not directly related to printing. Therefore, in either case, there is a problem of wasteful consumption of power in the image forming device.

Document 1: JP Patent Application Publication No. 2006-025212

SUMMARY OF THE INVENTION

In order to solve the above problem, the present invention aims to provide an image forming device and a control method that decrease the possibility of the image forming device returning to the normal mode from the power-saving mode, thereby preventing wasteful consumption of power.

To achieve the above aim, the present invention is an image forming device that operates in one of power-saving mode and normal mode by switching therebetween, the image forming device comprising: an automatic response unit configured to perform control to switch from the power-saving mode to the normal mode in accordance with a protocol on which a request issued by an information terminal device is based; an analysis unit configured to analyze whether or not the information terminal device has issued a request based on a protocol that requires the switching from the power-saving mode to the normal mode without a job execution; a message generation unit configured to, when the result of the analysis by the analysis unit is affirmative, generate a message for causing the information terminal device to change the protocol; and a transmission unit configured to transmit the generated message.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 4 shows one example of a data structure of an automatic response protocol list 132;

FIG. 5 shows one example of a data structure of a communication history list 141;

FIG. 6 shows one example of a data structure of a communication history list 141i;

FIG. 7 shows one example of a data structure of a communication history list 141k;

FIG. 15 shows one example of a data structure of an alternative protocol list 142 pertaining to Embodiment 3;

FIG. 17 shows one example of a data structure of a multicast protocol list 144 pertaining to Embodiment 4;

FIG. 20 shows one example of a data structure of a protocol changeover list 143 pertaining to Embodiment 5;

FIG. 25 shows one example of a data structure of a driver information list 145 pertaining to Embodiment 8;

FIG. 26 shows one example of a data structure of a driver information list 146;

FIG. 27 shows one example of a screen 305;

FIG. 33 shows one example of a data structure of a first return record list 151 pertaining to modification example (1), the first return record list 151 showing the record of the MFP 1 (10) returning from power-saving mode to normal mode without executing a job;

FIG. 34 shows one example of a data structure of a second return record list 152 pertaining to modification example (1), the second return record list 152 showing the record of the MFP 1 (10) returning from power-saving mode to normal mode with a job execution.

DESCRIPTION OF THE PREFERRED EMBODIMENTS

1. Embodiment 1

The following describes a network system 5 as one embodiment of the present invention.

1.1. Structure of Network System 5

Figure 1:
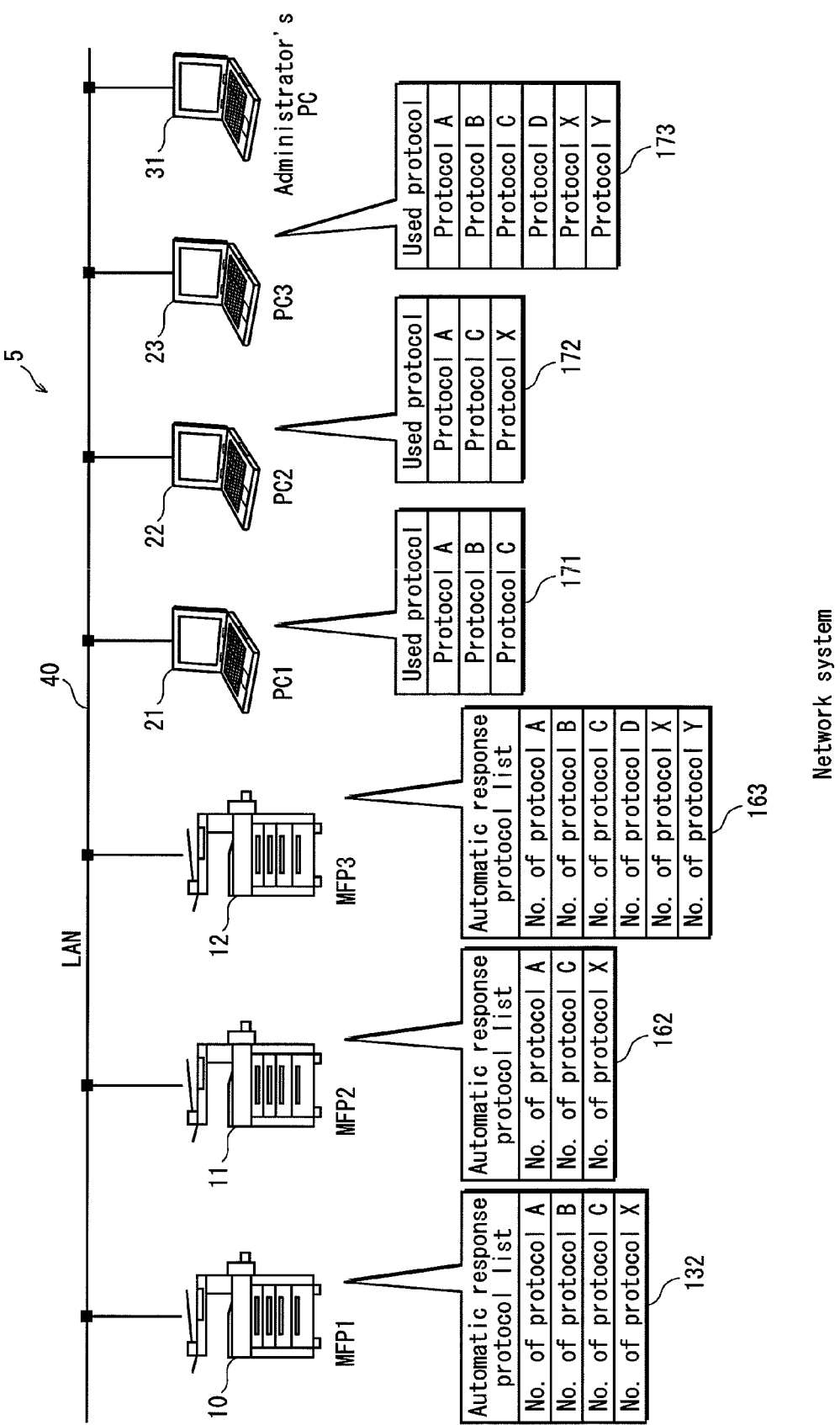
FIG. 1 shows the structure of a network system 5 pertaining to Embodiment 1 of the present invention.

As shown in FIG. 1, the network system 5 includes a multi-functional peripheral (MFP) 1 (10), an MFP 2 (11), an MFP 3 (12), a personal computer (PC) 1 (21), a PC 2 (22), a PC 3 (23), and the administrator's PC 31. The MFP 1 (10), MFP 2 (11), MFP 3 (12), PC 1 (21), PC 2 (22), PC 3 (23), and administrator's PC 31 are connected to one another via LAN 40.

The PC 1 (21), PC 2 (22), PC 3 (23), and administrator's PC 31 are all information terminal devices, and transmit communication data including, for example, a request for printing or other processing to the MFP 1 (10), MFP 2 (11) and MFP 3 (12) via LAN 40. The PC 1 (21), PC 2 (22), and PC 3 (23) are used by general users, while the administrator's PC 31 is used by an administrator who administrates the network system 5.

The MFP 1 (10) is an image forming device having the functions of a printer, copier, facsimile machine, and the like. The MFP 1 (10) operates in one of power-saving mode and normal mode by switching therebetween. The MFP 1 (10) receives communication data from the PC 1 (21), PC 2 (22), PC 3 (23) and administrator's PC 31. In response to a request included in the received communication data, the MFP 1 (10) performs printing or other processing. The same applies to the MFP 2 (11) and MFP 3 (12).

One example of the communication data is communication data for requesting the MFP 1 (10) to perform printing. This communication data contains data to be printed. To process this communication data, a print engine provided in the MFP 1 (10) operates. Another example of the communication data is communication data for inquiring about print services provided by the MFP 1 (10). This communication data does not contain data to be printed. To process this communication data, an automatic response unit (described later) responds, but the print engine provided in the MFP 1 (10) does not operate.

The MFP 1 (10) stores therein an automatic response protocol list containing one or more protocol numbers. Assume that the MFP 1 (10) has received communication data from each PC while operating in the power-saving mode. In this case, if the protocol number contained in the received communication data is contained in the automatic response protocol list, the MFP 1 (10) switches from the power-saving mode to the normal mode, and performs processing corresponding to the received communication data in the normal mode.

Note, each protocol number is information indicating the type of a corresponding protocol, and is an identifier for identifying the corresponding protocol. A protocol is a set of rules that is mutually determined among computers. The computers communicate with one another via a network based on (in compliance with) a protocol. A protocol may be referred to as a communication procedure, a communication regulation, or the like. A protocol may be a printing protocol for controlling a printer via a network.

Examples of protocols include a line printer daemon protocol (LPD), line printer remote protocol (LPR), RAW printing protocol, simple network management protocol (SNMP), server message block (SMB), business machine linkage service (BMLinkS), Bonjour, file transfer protocol (FTP), and simple mail transfer protocol (SMTP).

The LPD is a protocol for causing a printer connected to another computer (print server) in the network to perform printing. The specification of the LPD is documented in RFC 1179. The RAW printing protocol controls a printer with use of SNMP or the management information base (MIB). The SNMP is a protocol for monitoring and controlling communication devices (e.g., routers, computers and terminals) connected to a TCP/IP network via the TCP/IP network. The SMB is a network communication protocol used by an OS of a personal computer. The SMB is used to share a printer and a file. The BMLinkS is used to, for example, search for a device in a network and perform printing. Bonjour has already been described above. The FTP is a protocol used when transferring a file in a TCP/IP network (e.g., the Internet and intranet). The SMTP is a protocol for transmitting an e-mail via the Internet or intranet. The SMTP is used when exchanging e-mails between servers, and when a client transmits an e-mail to a server.

Communication data containing the above-described request or the like is generated based on a protocol indicating a communication procedure or a printing protocol.

The MFP 1 (10), MFP 2 (11) and MFP 3 (12) store therein automatic response protocol lists 132, 162 and 163, respectively. The details of the automatic response protocol lists will be described later.

The protocols used by the PC 1 (21), PC 2 (22) and PC 3 (23) are illustrated in FIG. 1 as used protocols 171, 172 and 173. As shown in FIG. 1, the PC 1 (21) uses protocols A, B and C, the PC 2 (22) uses protocols A, C and X, and the PC 3 (23) uses protocols A, B, C, D, X and Y.

1.2 Structure of PC 1 (21), PC 2 (22), PC 3 (23) and Administrator's PC 31

Each of the PC 1 (21), PC 2 (22), PC 3 (23) and administrator's PC 31 is a computer system including a microprocessor, ROM, RAM, hard disk unit, display unit, keyboard, mouse, and the like. A computer program is stored in the RAM or hard disk unit. Each PC realizes its functions by the microprocessor operating in accordance with the computer program.

Each PC has installed a device driver for controlling printing performed by an MFP connected to the PC via the network. The device driver is a computer program composed of a combination of a plurality of instruction codes representing instructions to a computer. The device driver for controlling the printing follows each of the printing protocols mentioned earlier.

Based on a protocol, each PC generates communication data for performing the printing, or communication data for performing other processing, and outputs the generated communication data to LAN 40. The communication data is composed of one or more packets. The data structure of these packets will be described later.

Upon being instructed to change a protocol, each PC deletes a device driver corresponding to the original protocol, and stores a device driver corresponding to a new protocol.

1.3 Structure of MFP 1 (10)

Figure 2:
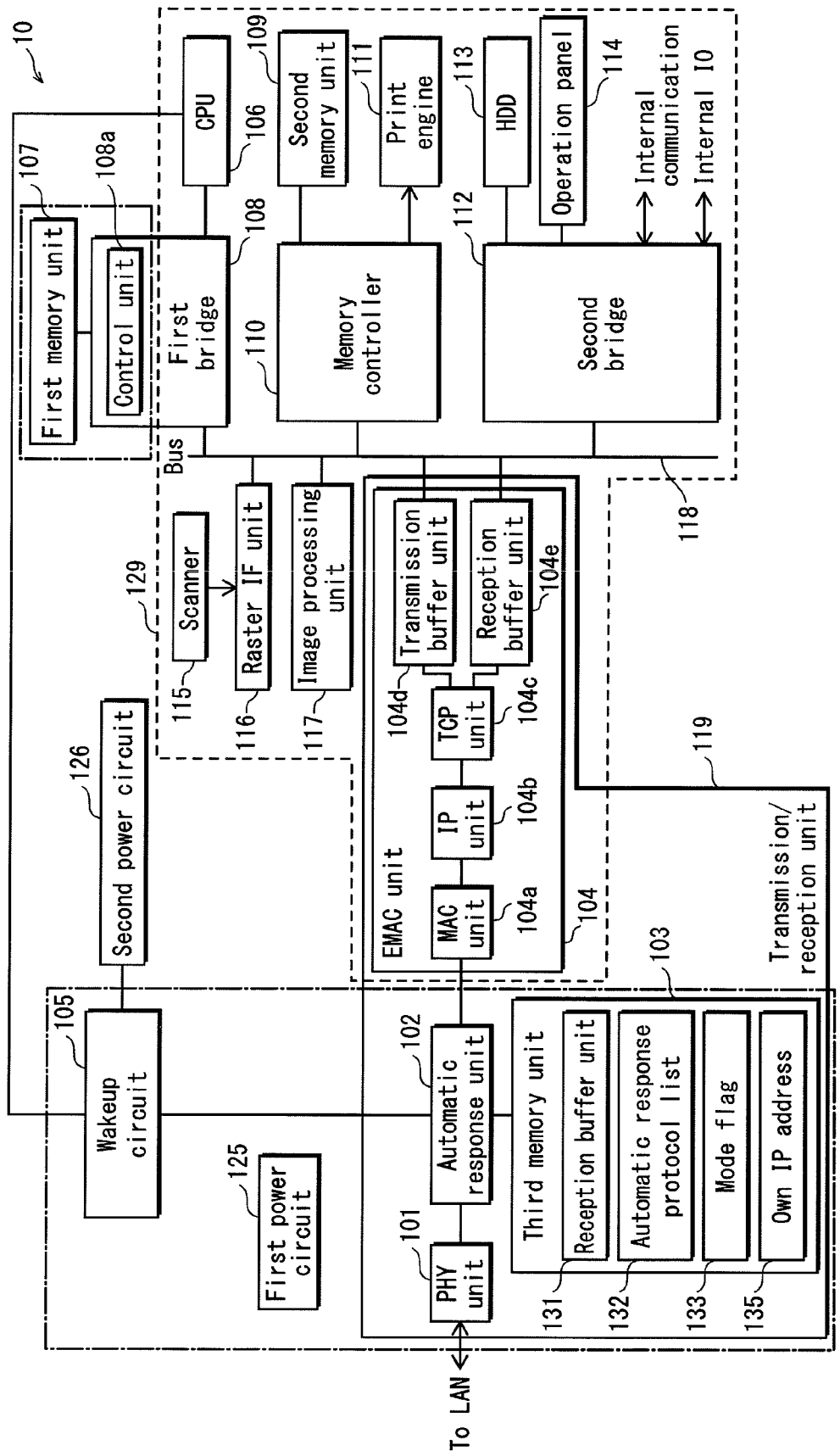
FIG. 2 is a block diagram showing the structure of an MFP 1 (10)

As shown in FIG. 2, the MFP 1 (10) includes a transmission/reception unit 119, a wakeup circuit 105, a first power circuit 125, a second power circuit 126, CPU 106, a first memory unit 107, a first bridge 108, a second memory unit 109, a memory controller 110, a print engine 111, a second bridge 112, a hard disk drive (HDD) 113, an operation panel 114, a scanner 115, a raster IF unit 116, an image processing unit 117, and a bus 118. The first bridge 108 includes a control unit 108a. The transmission/reception unit 119 includes a physical layer device (PHY) unit 101, an automatic response unit 102, a third memory unit 103, and an EMAC unit 104. The transmission/reception unit 119 transmits a message generated by a message generation unit 120 (described later).

The raster IF unit 116, image processing unit 117, transmission/reception unit 119, first bridge 108, memory controller 110, and second bridge 112 are all connected to the bus 118.

Figure 3:
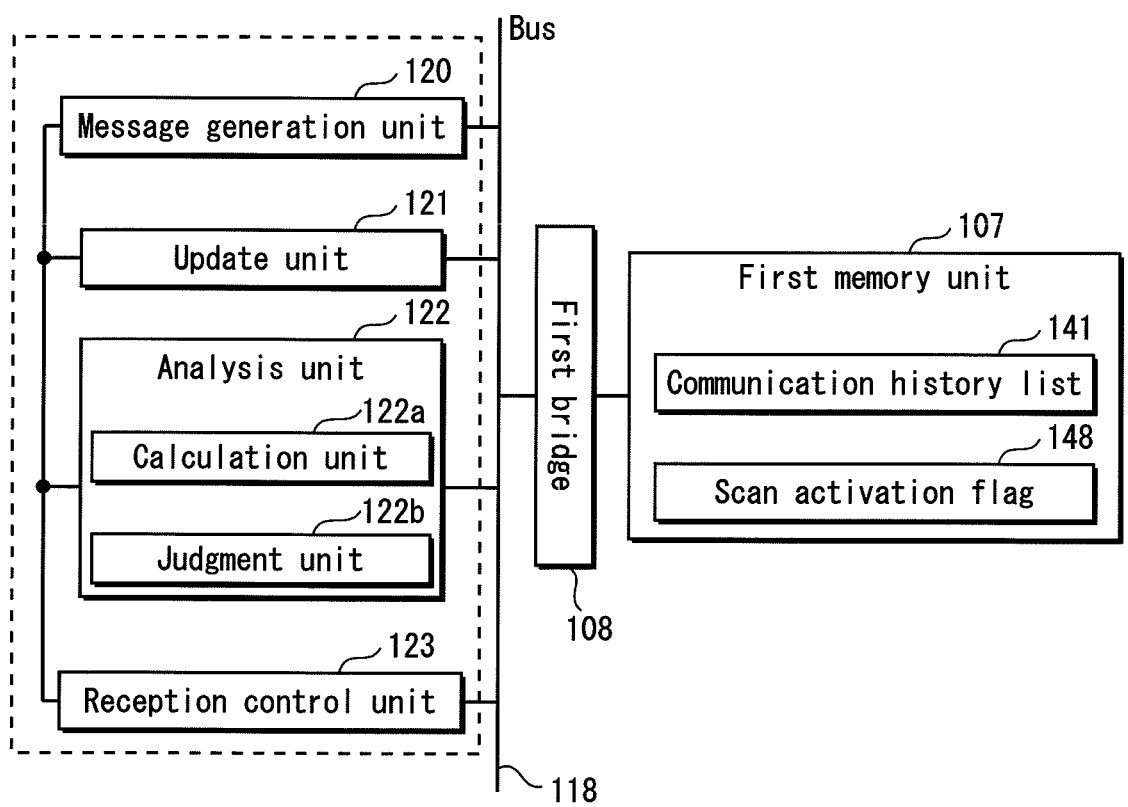
FIG. 3 is a block diagram showing part of the constituent elements of the MFP 1 (10)

As shown in FIG. 3, the MFP 1 (10) further includes the message generation unit 120, an update unit 121, an analysis unit 122, and a reception control unit 123. A computer program for control is stored in the first memory unit 107. The message generation unit 120, update unit 121, analysis unit 122 and reception control unit 123 realize their functions by the CPU 106 operating in accordance with this computer program.

As mentioned earlier, the MFP 1 (10) operates in one of power-saving mode and normal mode by switching therebetween.

The MFP 1 (10) stores therein the automatic response protocol list 132 containing protocol numbers indicating protocols. The MFP 1 (10) switches from the power-saving mode to the normal mode when a protocol indicated by a request received from a PC matches one of the protocols indicated by the protocol numbers contained in the automatic response protocol list 132. More specifically, the automatic response unit 102 switches from the power-saving mode to the normal mode when the information indicating the type of the protocol requested by the PC (information terminal device) is contained in the automatic response protocol list 132.

After the user turns on the power of the MFP 1 (10), the first power circuit 125 constantly supplies power to the PHY unit 101, automatic response unit 102, third memory unit 103, wakeup circuit 105, first memory unit 107, and control unit 108a.

When the MFP 1 (10) is operating in the normal mode, power is supplied to all of the constituent elements of the MFP 1 (10). That is to say, in addition to the power supply by the first power circuit 125, the second power circuit 126 supplies power to the EMAC unit 104, CPU 106, constituent elements of the first bridge 108 other than the control unit 108a, second memory unit 109, memory controller 110, print engine 111, second bridge 112, HDD 113, operation panel 114, scanner 115, raster IF unit 116, image processing unit 117, and bus 118.

On the other hand, when the MFP 1 (10) is operating in the power-saving mode, (i) the second power circuit 126 stops supplying power to the EMAC unit 104, CPU 106, constituent elements of the first bridge 108 other than the control unit 108a, second memory unit 109, memory controller 110, print engine 111, second bridge 112, HDD 113, operation panel 114, scanner 115, raster IF unit 116, image processing unit 117, and bus 118, and (ii) only the power supply by the first power circuit 125 is performed.

Note that as the structure of the MFP 2 (11) and MFP 3 (12) is similar to that of the MFP 1 (10), the descriptions of the MFP 2 (11) and MFP 3 (12) are omitted.

(1) Third Memory Unit 103

By way of example, the third memory unit 103 is configured with semiconductor memory, and includes an area for storing a reception buffer unit 131, the automatic response protocol list 132, a mode flag 133, and its own IP address 135.

(Reception Buffer Unit 131)

When the MFP 1 (10) is operating in the power-saving mode, the reception buffer unit 131 is used to store a received packet that has been addressed to the MFP 1(10) or transmitted by multicasting during the power-saving mode.

(Automatic Response Protocol List 132)

As shown in the example of FIG. 4, the automatic response protocol list 132 contains one or more pieces of automatic response protocol information, each of which is composed of an item number and a protocol number.

The item number included in each piece of automatic response protocol information identifies the piece of automatic response protocol information. The protocol number included in each piece of automatic response protocol information identifies a corresponding protocol.

The automatic response protocol list 132 indicates that, when the MFP 1 (10) is operating in the power-saving mode, if the protocol number included in the received packet matches one of the protocol numbers contained in the automatic response protocol list 132, the mode of the MFP 1 (10) is switched from the power-saving mode to the normal mode.

By way of example, the automatic response protocol list 132 shown in FIG. 4 contains a protocol number 132a ("No. of protocol A"), protocol number 132b ("No. of protocol B"), protocol number 132c ("No. of protocol C"), and protocol number 132d ("No. of protocol X"). These examples are used herein to facilitate the understanding of the present invention. In practice, the automatic response protocol list 132 may contain such numbers as "10", "11", "12", and "13" as protocol numbers.

Assume that the MFP 1 (10) stores therein the automatic response protocol list 132 shown in FIG. 4. In this case, when the MFP 1 (10) is operating in the power-saving mode, if the protocol number included in a packet constituting the received communication data matches one of "No. of protocol A", "No. of protocol B", "No. of protocol C", and "No. of protocol X", the MFP 1 (10) switches from the power-saving mode to the normal mode.

(Mode Flag 133)

The mode flag 133 indicates whether the MFP 1 (10) is currently operating in the power-saving mode or the normal mode. When the mode flag 133 indicates "1", it means that the MFP 1 (10) is currently operating in the normal mode. When the mode flag 133 indicates "0", it means that the MFP 1 (10) is currently operating in the power-saving mode.

(Own IP Address 135)

The own IP address 135 is an IP address assigned to the MFP 1 (10).

(2) First Memory Unit 107

The first memory unit 107 is configured with RAM, and operates in self-refresh mode during the power-saving mode.

The first memory unit 107 stores therein a plurality of control programs. Each of these control programs is a computer program that is, in order to achieve a predetermined function, composed of a combination of a plurality of instruction codes representing instructions to the CPU 106. The MFP 1 (10) achieves part of its functions by the CPU 106 operating in accordance with the control programs.

More specifically, each control program is a computer program for causing the message generation unit 120, update unit 121, analysis unit 122, and reception control unit 123 to operate.

The first memory unit 107 also includes an area for storing a communication history list 141 and a scan activation flag 148.

(Communication History List 141)

With respect to each of the protocol-based requests received from PCs in the past, the communication history list 141 includes information indicating, for example, whether or not the MFP 1 (10) executed a job, and whether or not the MFP 1 (10) switched from the power-saving mode to the normal mode. The communication history list 141 records therein a history of, from among pieces of communication data received from external devices via LAN 40, communication data that satisfies the following condition (a).

(a) The destination IP address included in the packet constituting the communication data is either the IP address assigned to the MFP 1 (10) or a multicast address.

As shown in the example of FIG. 5, the communication history list 141 includes an area for storing one or more pieces of communication history information, each of which is composed of an item number, a protocol number, a transmission source, a job execution record, a reception mode, a return record, and a reception time. By way of example, the communication history list 141 shown in FIG. 5 contains a piece of communication history information 141a, which is composed of an item number 141b, a protocol number 141c, a transmission source 141d, a job execution record 141e, a reception mode 141f, a return record 141g, and a reception time 141h.

The item number uniquely identifies a corresponding piece of communication history information. By way of example, the item number 141b in the piece of communication history information 141a is "1".

The protocol number uniquely identifies a corresponding protocol, and is included in the packet. By way of example, the protocol number 141c in the piece of communication history information 141a is "No. of protocol X". The "No. of protocol X" is an identifier that uniquely identifies "protocol X". Specifically, the protocol number is a number such as "10", "11" and "12". However, to facilitate the understanding of the present invention, the protocol number is expressed herein as "No. of protocol X", etc.

The transmission source indicates an IP address of the transmission source, which is included in the packet constituting the received communication data. The transmission source 141d in the piece of communication history information 141a is expressed as "PC 3" in order to facilitate the understanding of the present invention. Specifically, the transmission source 141d is expressed as, for example, "10.11.12.13".

The job execution record indicates whether or not the MFP 1 (10) executed a print job requested by the packet constituting the received communication data. When the job execution record indicates "Executed", it means that the print job was executed. When the job execution record indicates "Not executed", it means that the print job was not executed. By way of example, the job execution record 141e in the piece of communication history information 141a indicates "Not executed".

The reception mode indicates whether or not the MFP 1 (10) was operating in the power-saving mode or the normal mode at the time of reception of the communication data. When the reception mode indicates "Power-saving", it means that the MFP 1 (10) was operating in the power-saving mode at the time of reception of the communication data. When the reception mode indicates "Normal", it means that the MFP 1 (10) was operating in the normal mode at the time of reception of the communication data. By way of example, the reception mode 141f in the piece of communication history information 141a indicates "Power-saving".

The return record indicates whether or not the MFP 1 (10) switched from the power-saving mode to the normal mode in accordance with the received communication data. When the return record indicates "Not returned", it means that the MFP 1 (10) did not switch from the power-saving mode to the normal mode. When the return record indicates "Returned", it means that the MFP 1 (10) switched from the power-saving mode to the normal mode. By way of example, the return record 141*g* in the piece of communication history information 141*a* indicates "Not returned".

The reception time indicates the time at which the communication data is received in the form of year/month/date and time. By way of example, the reception time 141*h* in the piece of communication history information 141*a* indicates "2009/6/1 10:30".

FIGS. 6 and 7 respectively show communication history lists 141*i* and 141*k*, which are other examples of the communication history list 141.

Seven pieces of communication history information 141*j* contained in the communication history list 141*i* correspond to pieces of communication data that the MFP 1 (10) received during the power-saving mode.

The communication history list 141*k* shown in FIG. 7 is obtained by, after the MFP 1 (10) switches from the power-saving mode to the normal mode with the first memory unit 107 storing therein the communication history list 141*i* shown in FIG. 6, receiving four pieces of communication data during the normal mode.

Seven pieces of communication history information 141*m* contained in the communication history list 141*k* are the same as the seven pieces of communication history information 141*j* contained in the communication history list 141*i*. Four pieces of communication history information 141*n* contained in the communication history list 141*k* correspond to the four pieces of communication data received during the normal mode.

(Scan Activation Flag 148)

The scan activation flag 148 is set to one of the values "0" and "1". When the scan activation flag 148 is set to "0", it means that processing of the analysis unit 122 is not to be performed. When the scan activation flag 148 is set to "1", it means that processing of the analysis unit 122 is to be performed.

(3) PHY Unit 101

The PHY unit 101 converts logical data format (digital data) into an electric signal, and vice versa, between a physical layer determined by an OSI reference model and an upper layer of the physical layer. The physical layer is the first layer of the OSI reference model. Physical connection/transmission techniques for the network are defined in the physical layer.

The PHY unit 101 receives digital data from the automatic response unit 102, generates an electric signal by converting the format of the received digital data, and outputs the generated electric signal to LAN 40. The PHY unit 101 also receives an electric signal from LAN 40, generates digital data by converting the format of the received electric signal, and outputs the generated digital data to the automatic response unit 102. Put another way, the PHY unit 101 receives a protocol-based request and the like from each PC.

The digital data is, for example, a packet.

Figure 8:
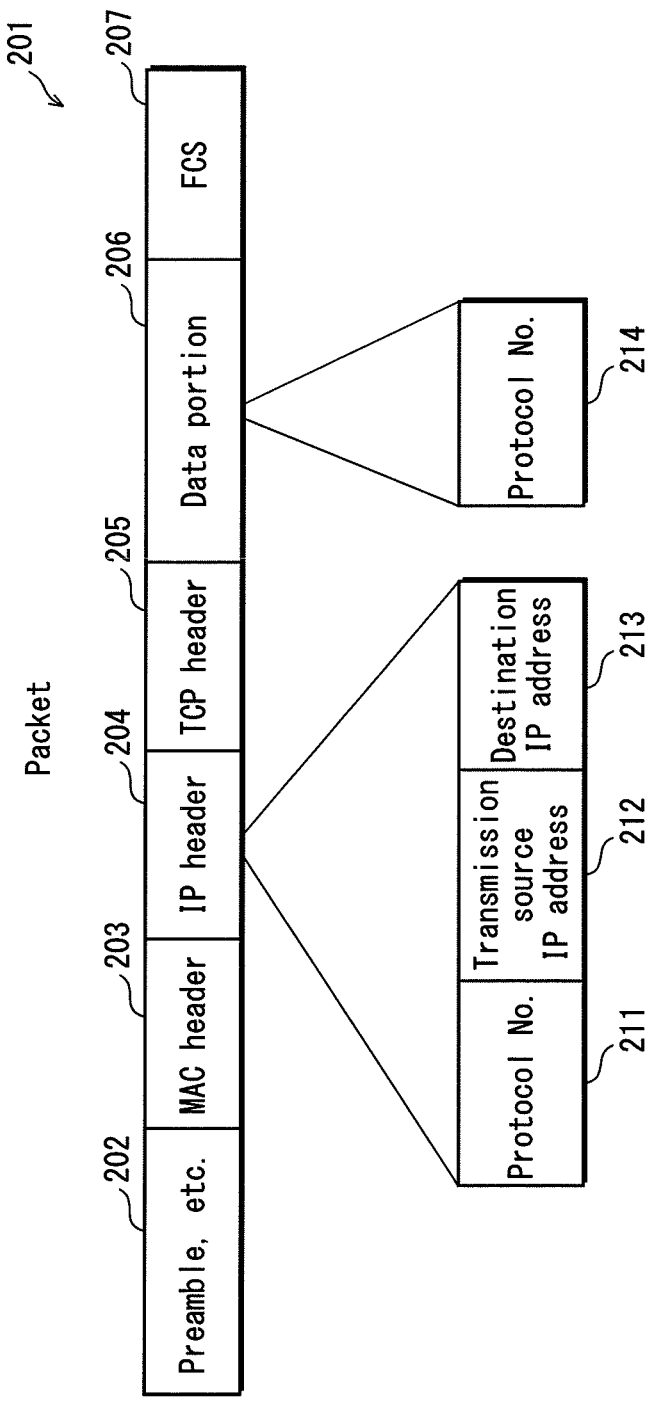
FIG. 8 shows one example of a data structure of a packet 201 received by the MFP 1 (10)

By way of example, as shown in FIG. 8, a packet 201 is composed of a preamble, etc. 202, a MAC header 203, an IP header 204, a TCP header 205, a data portion 206, and a frame check sequence (FCS) 207.

The preamble, etc. 202 is a signal for adjusting the timing for reading this packet.

By way of example, the MAC header 203 includes a destination MAC address and a transmission source MAC address, and indicates a device to which the packet should be passed when using the LAN standard specified in IEEE 802.3.

As shown in FIG. 8, the IP header 204 includes a protocol number 211, transmission source IP address 212 and destination IP address 213, and indicates, for example, a device to which the packet should be passed.

The TCP header 205 includes a transmission source port number, destination port number, and sequence number.

The data portion 206 includes data to be transmitted from an application program or the like indicated by the transmission source port number, to an application program or the like indicated by the destination port number. Depending on the protocol to be used, the data portion 206 may contain a protocol number 214.

The FCS 207 is data that is appended to detect an error.

(4) Automatic Response Unit 102

Depending on a protocol requested by a PC (information terminal device), the automatic response unit 102 performs control so as to switch from the power-saving mode to the normal mode. More specifically, when the protocol indicated by the request received from the PC matches one of the protocols indicated by the protocol numbers contained in the automatic response protocol list 132, the automatic response unit 102 performs control so as to switch the mode of the MFP 1 (10) from the power-saving mode to the normal mode.

Furthermore, when the automatic response unit 102 receives a request that does not cause a job execution (e.g., when the automatic response unit 102 receives an inquiry about print services provided by the MFP 1 (10)) during the power-saving mode, the automatic response unit 102 transmits, to the transmission source of the request, a message indicating that the MFP 1 (10) provides the print services. In this case, power is not supplied to the CPU 106 and print engine 111.

The following is a detailed description of the automatic response unit 102.

Immediately after the power of the MFP 1 (10) is turned on, the automatic response unit 102 reads the own IP address 135 from the third memory unit 103.

(Receiving Packet from PHY Unit)

The automatic response unit 102 receives a packet from the PITY unit 101. An example of this packet is illustrated in FIG. 8.

Next, the automatic response unit 102 reads the mode flag 133 from the third memory unit 103, and judges whether the read mode flag 133 indicates the normal mode or the power-saving mode.

When the mode flag 133 indicates the normal mode, the automatic response unit 102 outputs the received packet to the EMAC unit 104.

When the mode flag 133 indicates the power-saving mode, the automatic response unit 102, upon receiving the packet, extracts the protocol number, transmission source IP address and destination IP address from the received packet. The automatic response unit 102 may extract the protocol number from the data portion of the received packet. Subsequently, the automatic response unit 102 judges whether or not the destination IP address is the own IP address 135 or a multicast address. Among the 32 bits in the multicast address, the first 4 bits are "1110", and the remaining 28 bits are used to identify a corresponding multicast group. Accordingly, the judgment as to whether the destination IP address is a multicast address or not is made based on whether the first 4 bits of the destination IP address are "1110".

When judging that the destination IP address is neither the own IP address 135 nor the multicast address, the automatic response unit 102 discards the received packet and waits for reception of the next packet.

When judging that the destination IP address is the own IP address 135 or the multicast address, the automatic response unit 102 writes the received packet into the reception buffer unit 131.

Furthermore, when judging that the destination IP address is the own IP address 135 or the multicast address, the automatic response unit 102 also searches the automatic response protocol list 132 to judge whether or not the automatic response protocol list 132 contains the same protocol number as the protocol number extracted from the received packet.

When judging that the automatic response protocol list 132 does not contain the same protocol number as the protocol number extracted from the received packet, the automatic response unit 102 waits for reception of the next packet.

When judging that the automatic response protocol list 132 contains the same protocol number as the protocol number extracted from the received packet, the automatic response unit 102 outputs, to the wakeup circuit 105, a return trigger signal indicating that the mode of the MFP 1 (10) is to be switched from the power-saving mode to the normal mode.

The automatic response unit 102 receives, from the EMAC unit 104, a return complete notification indicating that the MFP 1 (10) has returned to the normal mode from the power-saving mode. Upon receiving the return complete notification, the automatic response unit 102 reads all the packets from the reception buffer unit 131 in order of the time when the packets were stored therein, and sequentially outputs the read packets to the EMAC unit 104. After reading the packets from the reception buffer unit 131, the automatic response unit 102 deletes these packets from the reception buffer unit 131.

(Reception of Packets from EMAC Unit 104)

The automatic response unit 102 receives packets from the EMAC unit 104, and outputs the received packets to the PHY unit 101.

(5) EMAC Unit 104

The second power circuit 126 supplies power to the EMAC unit 104. When the activation of the EMAC unit 104 is completed, the EMAC unit 104 outputs, to the automatic response unit 102, a return complete notification indicating that the MFP 1 (10) has returned to the normal mode from the power-saving mode.

As shown in FIG. 2, the EMAC unit 104 includes a MAC unit 104a, an IP unit 104b, a TCP unit 104c, a transmission buffer unit 104d, and a reception buffer unit 104e.

(MAC Unit 104a)

The MAC unit 104a receives a packet from the automatic response unit 102. Upon receiving the packet, the MAC unit 104a removes the preamble, etc. and the FCS from the received packet, and outputs the remaining portions of the received packet (the MAC header, IP header, TCP header and data portion) to the IP unit 104b.

Also, the MAC unit 104a (i) receives, from the IP unit 104b, a data portion to which a MAC header, an IP header and a TCP header are appended, (ii) generates a packet by adding a preamble, etc. and an FCS to the received data portion to which the MAC header, IP header and TCP header are appended, and (iii) outputs the generated packet to the automatic response unit 102.

The MAC unit 104a further detects packet collision, performs packet retransmission, etc. in LAN 40.

(IP Unit 104b)

The IP unit 104b (i) receives, from the TCP unit 104c, a destination and a data portion to which a TCP header is appended, (ii) generates an IP header based on the received destination, (iii) appends the IP header and MAC header to the data portion to which the TCP header is appended, so as to generate the data portion to which the MAC header, IP header and TCP header are added, and (iv) outputs the generated data portion to the MAC unit 104a.

Also, the IP unit 104b (i) receives, from the MAC unit 104a, a data portion to which a MAC header, an IP header and a TCP header are appended, (ii) removes the MAC header and IP header from the received data portion to which the MAC header, IP header and TCP header are appended, so as to extract the data portion to which the TCP header is appended, and (iii) outputs, to the TCP unit 104c, the extracted data portion to which the TCP header is appended.

(TCP Unit 104c)

The TCP unit 104c (i) receives, from the IP unit 104b, a data portion to which a TCP header is appended, (ii) analyzes the TCP header appended to the received data portion so as to search for an application program corresponding to the destination port number included in the TCP header, and (iii) after removing the TCP header from the data portion, writes the data portion into the reception buffer unit 104e together with a program identification number for identifying the application program corresponding to the destination port number.

Also, the TCP unit 104c (i) reads a destination and a data portion from the transmission buffer unit 104d, (ii) generates a TCP header based on the read destination, (iii) appends the generated TCP header to the read data portion, and (iv) outputs the destination and the data portion to which the TCP header is appended to the IP unit 104b.

(Transmission Buffer Unit 104d and Reception Buffer Unit 104e)

The transmission buffer unit 104d and reception buffer unit 104e are buffers each configured with RAM.

The transmission buffer unit 104d includes an area for storing one or more pairs of destination and data portion. The reception buffer unit 104e includes an area for storing one or more pairs of data portion and program identification number.

(6) Reception Control Unit 123

The reception control unit 123 reads a pair of data portion and program identification number from the reception buffer unit 104e as needed. Upon reading the pair of data portion and program identification number, the reception control unit 123 outputs the read data portion to an application program identified by the read program identification number.

Once the reception control unit 123 has read the pair of data portion and program identification number from the reception buffer unit 104e, this pair is deleted from the reception buffer unit 104e.

(7) Wakeup Circuit 105

During the power-saving mode, the wakeup circuit 105 receives a return trigger signal from the automatic response unit 102. Upon receiving the return trigger signal, the wakeup circuit 105 controls the second power circuit 126 to supply power to the following constituent elements for which power supply had been stopped: the EMAC unit 104, CPU 106, constituent elements of the first bridge 108 other than the control unit 108a, second memory unit 109, memory controller 110, print engine 111, second bridge 112, HDD 113, operation panel 114, scanner 115, raster IF unit 116, image processing unit 117, and bus 118. The wakeup circuit 105 also resets the CPU 106 and outputs an interrupt signal that instructs a return to the normal mode to the CPU 106.

Thereafter, during the normal mode, the second power circuit 126 supplies power to the EMAC unit 104, CPU 106, constituent elements of the first bridge 108 other than the control unit 108a, second memory unit 109, memory controller 110, print engine 111, second bridge 112, HDD 113, operation panel 114, scanner 115, raster IF unit 116, image processing unit 117, and bus 118.

During the normal mode, the wakeup circuit 105 also receives, from the CPU 106, a switch trigger signal indicating that the mode of the MFP 1 (10) is to be switched from the normal mode to the power-saving mode. Upon receiving the switch trigger signal, the wakeup circuit 105 controls the second power circuit 126 to stop supplying power to the EMAC unit 104, CPU 106, constituent elements of the first bridge 108 other than the control unit 108a, second memory unit 109, memory controller 110, print engine 111, second bridge 112, HDD 113, operation panel 114, scanner 115, raster IF unit 116, image processing unit 117, and bus 118.

Note that the first power circuit 125 constantly supplies power to the PHY unit 101, automatic response unit 102, third memory unit 103, wakeup circuit 105, first memory unit 107, and control unit 108a.

(8) CPU 106

The CPU 106 is constituted from a fetch unit, a decode unit, an execution unit, a register file, an instruction counter, and the like. The CPU 106 (i) reads, from a control program stored in the first memory unit 107, instructions included in the control program one-by-one, (ii) decodes the read instructions, and (iii) operates in accordance with the result of the decoding.

Immediately after the power of the MFP 1 (10) is turned on, the CPU 106 initializes the constituent elements thereof. This places the CPU 106 in an operable state. When the MFP 1 (10) switches from the normal mode to the power-saving mode, the CPU 106 writes the state of the constituent elements thereof (e.g., contents of the register file) to the first memory unit 107 via the first bridge 108. When the MFP 1 (10) switches from the power-saving mode to the normal mode, the CPU 106 (i) reads the contents of the register file which are stored in the first memory unit 107 via the first bridge 108, and (ii) writes the read contents of the register file back into the register file.

(9) Update Unit 121

During the normal mode, the update unit 121 (i) receives a data portion included in the received packet from the reception buffer unit 104e of the EMAC unit 104 via the reception control unit 123, (ii) obtains the protocol number, information on a communication source PC, and the like from the received data portion, and (iii) writes the obtained protocol number, the obtained information on the communication source PC, the time of return to the normal mode, the job execution record, and the like into the communication history list 141.

(10) Message Generation Unit 120 and Analysis Unit 122

The analysis unit 122 analyzes whether or not a PC (information terminal device) has requested a protocol that causes the MFP 1 (10) to switch from the power-saving mode to the normal mode without a job execution. More specifically, with use of the communication history list 141, the analysis unit 122 analyzes whether or not the MFP 1 (10) has a possibility of switching from the power-saving mode to the normal mode without a job execution on the basis of the protocol-based request from the PC. The analysis unit 122 then outputs the result of the analysis to the message generation unit 120.

As shown in FIG. 3, the analysis unit 122 includes a calculation unit 122a and a judgment unit 122b.

Based on the scan activation flag 148 stored in the first memory unit 107, the analysis unit 122 judges whether or not to activate scanning of the communication history list 141. When the scan activation flag 148 indicates "0", the scanning of the communication history list 141 is not to be activated. When the scan activation flag 148 indicates "1", the scanning of the communication history list 141 is to be activated.

When judging that the scanning of the communication history list 141 is not to be activated, the analysis unit 122 does not perform the following processing for requesting the PC to change its protocol.

When judging that the scanning of the communication history list 141 is to be activated, the calculation unit 122a tallies, for each PC, a return frequency indicating the number of times the MFP 1 (10) switched from the power-saving mode to the normal mode, based on one or more pieces of communication history information that are contained in the communication history list 141 and that did not cause a job execution—i.e., one or more pieces of communication history information whose job execution record indicates "Not executed". Put another way, the calculation unit 122a calculates the number of times the MFP 1 (10) switched from the power-saving mode to the normal mode without a job execution.

Next, the judgment unit 122b judges, for each PC, whether or not the return frequency satisfies a predetermined criterion. More specifically, the judgment unit 122b judges, for each PC, whether or not the return frequency is larger than a predetermined reference value. The predetermined reference value is, for example, "10". When the judgment unit 122b judges that the return frequency is smaller than or equal to the predetermined reference value, the analysis unit 122 does not perform any processing.

When the result of the analysis by the analysis unit 122 shows that the corresponding PC (information terminal device) has requested a protocol that causes the MFP 1 (10) to switch from the power-saving mode to the normal mode without a job execution, the message generation unit 120 generates a message for causing the corresponding PC to change its protocol. In other words, the message generation unit 120 (i) receives the result of the analysis from the analysis unit 122, and (ii) when the result of the analysis shows that the MFP 1 (10) has a possibility of switching from the power-saving mode to the normal mode without a job execution, the message generation unit 120 generates a message for changing the protocol used by the corresponding PC (the source of the request) to another protocol. That is, the message generation unit 120 generates the message when the calculated return frequency satisfies the predetermined criterion. More specifically, when the judgment unit 122b judges that the return frequency is larger than the predetermined reference value, the message generation unit 120 (i) generates a protocol changeover screen for suggesting the corresponding PC to change its protocol, (ii) generates a data portion to be included in a packet to be transmitted based on the generated protocol changeover screen, and (iii) writes the generated data portion, which is addressed to the corresponding PC, into the transmission buffer unit 104d.

Figure 9:
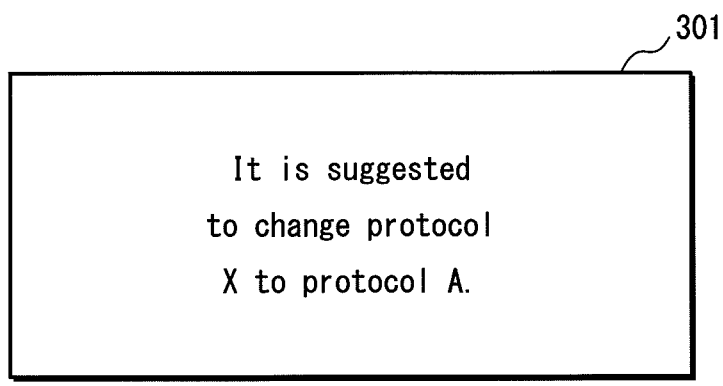
FIG. 9 shows one example of a screen 301.

One example of the protocol changeover screen is illustrated in FIG. 9. As illustrated in FIG. 9, a screen 301 shows a message suggesting that the protocol indicated by a target protocol number be changed to the protocol indicated by an alternative protocol number.

Although it has been described above that the calculation unit 122a tallies, for each PC, a return frequency indicating the number of times the MFP 1 (10) returned to the normal mode from the power-saving mode based on one or more pieces of communication history information that are contained in the communication history list 141 and that did not cause a job execution, the present invention is not limited in this way. For example, the calculation unit 122a may tally, for each PC, a return frequency indicating the number of times the MFP 1 (10) returned to the normal mode from the power-saving mode per predetermined time period. The predetermined time period is, for example, one day, one week, two weeks, one month, etc.

Although it has been described above that the data portion addressed to the corresponding PC is written into the transmission buffer unit 104d, the present invention is not limited in this way. Alternatively, the data portion may be addressed to the administrator's PC 31.

Alternatively, the protocol changeover screen may be transmitted by e-mail to the corresponding PC, to the administrator's PC 31, or to both of the corresponding PC and administrator's PC 31.

Alternatively, a device driver that uses an appropriate protocol may be transmitted to the corresponding PC so as to mandatorily cause the corresponding PC to update its device driver.

(11) First Bridge 108 and Second Bridge 112

The first bridge 108 bridges the CPU 106, first memory unit 107 and bus 118. The first bridge 108 includes the control unit 108a. The control unit 108a controls storage of data into the first memory unit 107 and reading of data from the first memory unit 107. The second bridge 112 bridges the HDD 113, operation panel 114, bus 118, and the like.

(12) Memory Controller 110 and Second Memory Unit 109

The memory controller 110 controls storage of data into the second memory unit 109 and reading of data from the second memory unit 109. The memory controller 110 also outputs image data stored in the second memory unit 109 to the print engine 111.

The second memory unit 109 stores therein image data and the like.

(13) Print Engine 111

By way of example, the print engine 111 includes a rotatably-mounted photosensitive drum, and around the photosensitive drum, a charger, an exposure unit, a developer, a transfer charger, and a cleaner for cleaning residual toner. The exposure unit is composed of a plurality of LEDs that are linearly arranged at an appropriate interval. The exposure unit exposes the surface of the photosensitive drum, which is uniformly charged by the charger to a predetermined electric potential, to light beams. As a result, an electrostatic latent image is formed in accordance with an input image. The electrostatic latent image is developed by the developer into a toner image. A recording sheet is conveyed to a transfer unit via timing rollers. After the toner image is transferred onto the recording sheet in the transfer unit, the toner image is fixed onto the recording sheet by a fixing device. Thereafter, the recording sheet is discharged by discharge rollers onto the upper part of the MFP 1 (10).

(14) Hard Disk Drive (MD) 113, Operation Panel 114, Scanner 115, Raster IF Unit 116, Image Processing Unit 117, and Bus 118

The HDD 113 stores therein data that is to be stored over a long period of time. The operation panel 114 receives a user operation. The scanner 115 reads a document and outputs data of the read document to the second memory unit 109 via the raster IF unit 116. The image processing unit 117 performs various types of image processing on the data of the read document. The raster IF unit 116, image processing unit 117, transmission/reception unit 119, first bridge 108, memory controller 110, and second bridge 112 are connected to one another via the bus 118.

1.4. Operations of Network System 5

The following describes the operations of the network system 5 with reference to the sequence diagrams of FIGS. 10 through 13.

(1) Operations of PHY Unit 101, Automatic Response Unit 102, EMAC Unit 104, and Wakeup Circuit 105

Figure 10:
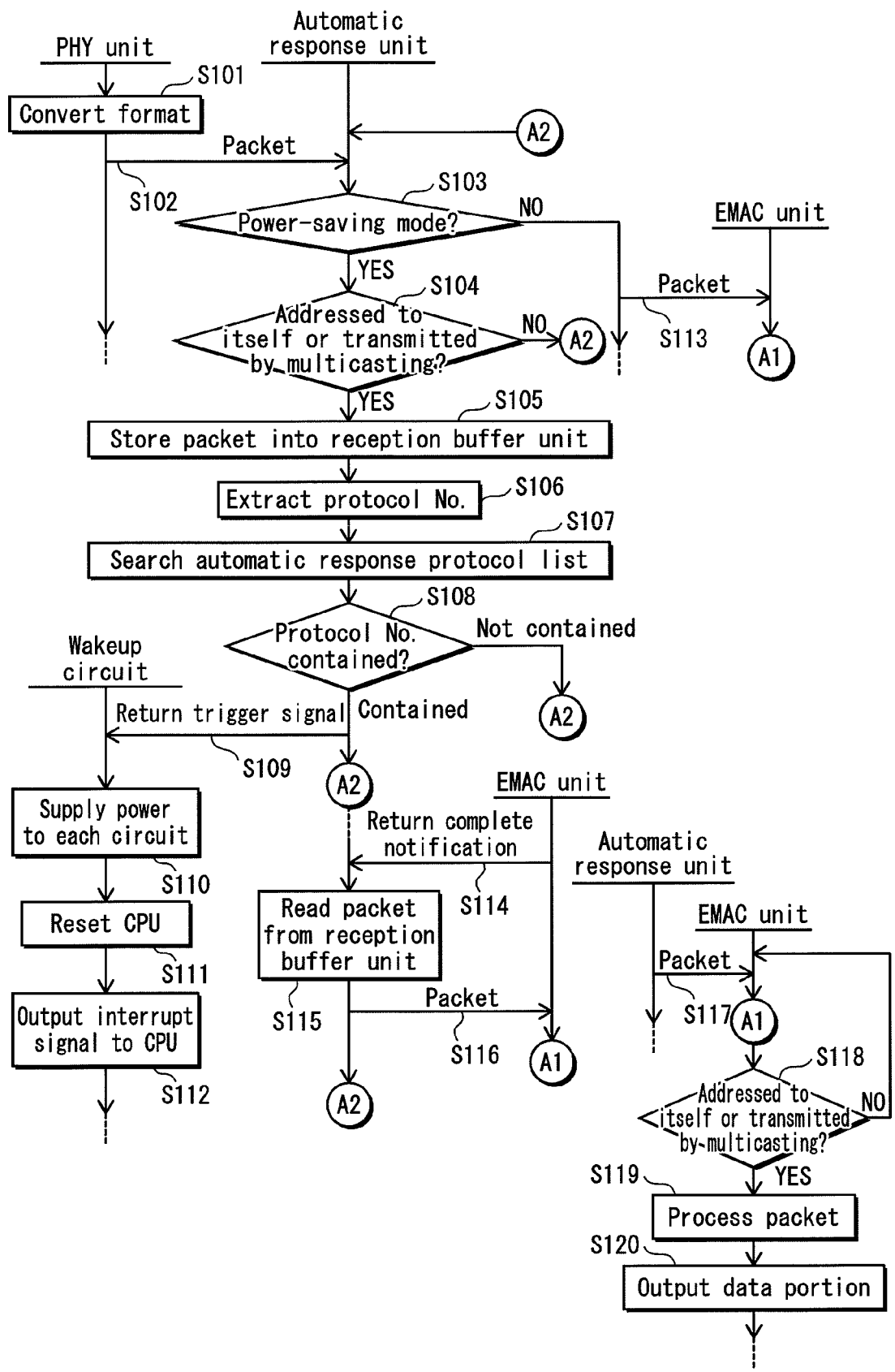
FIG. 10 is a sequence diagram of operations performed by a PHY unit 101, an automatic response unit 102, an EMAC unit 104, and a wakeup circuit 105.

A description is now given of the operations performed by the PHY unit 101, automatic response unit 102, EMAC unit 104, and wakeup circuit 105 with reference to the sequence diagram of FIG. 10.

The PHY unit 101 receives an electric signal from LAN 40, generates digital data as a packet by converting the format of the received electric signal (step S101), and outputs the packet to the automatic response unit 102 (step S102).

The automatic response unit 102 judges whether the mode flag 133 indicates the normal mode or the power-saving mode (step S103). When judging that the mode flag 133 indicates the normal mode (the NO branch of step S103), the automatic response unit 102 outputs the received packet to the EMAC unit 104 (step S113).

When judging that the mode flag 133 indicates the power-saving mode (the YES branch of step S103), the automatic response unit 102 judges, for example, whether or not the received packet has been either addressed to itself or transmitted by multicasting (step S104). When the received packet has been neither addressed to the automatic response unit 102 nor transmitted by multicasting (the NO branch of step S104), the automatic response unit 102 discards this packet and waits for reception of the next packet.

When the automatic response unit 102 judges that the received packet has been either addressed to itself or is transmitted by multicasting (the YES branch of step S104), the automatic response unit 102 writes the received packet into the reception buffer unit 131 (step S105), extracts a protocol number from the received packet (step S106), searches the automatic response protocol list 132 (step S107), and judges whether or not the automatic response protocol list 132 contains the extracted protocol number (step S108).

When judging that the automatic response protocol list 132 does not contain the extracted protocol number (the "Not contained" branch of step S108), the automatic response unit 102 waits for reception of the next packet.

When judging that the automatic response protocol list 132 contains the extracted protocol number (the "Contained" branch of step S108), the automatic response unit 102 outputs a return trigger signal to the wakeup circuit 105 (step S109).

Upon receiving the return trigger signal (step S109), the wakeup circuit 105 controls the second power circuit 126 to supply power to the following constituent elements for which power supply had been stopped (step S110): the EMAC unit 104, CPU 106, constituent elements of the first bridge 108 other than the control unit 108a, second memory unit 109, memory controller 110, print engine 111, second bridge 112, HDD 113, operation panel 114, scanner 115, raster IF unit 116, image processing unit 117, and bus 118. Then, the wakeup circuit 105 resets the CPU 106 (step S111) and outputs an interrupt signal that instructs a return to the normal mode to the CPU 106 (step S112).

Upon receiving a return complete notification from the EMAC unit 104 (step S114), the automatic response unit 102 reads a packet from the reception buffer unit 131 (step S115) and outputs the read packet to the EMAC unit 104 (step S116).

The EMAC unit 104 receives the packet from the automatic response unit 102 (step S117) and judges whether or not the received packet has been either addressed to itself or transmitted by multicasting (step S118). When the EMAC unit 104 judges that the received packet has been neither addressed to itself nor transmitted by multicasting (the "NO" branch of step S118), the EMAC unit 104 discards this packet and waits for reception of the next packet.

When the EMAC unit 104 judges that the received packet has been either addressed to itself or transmitted by multicasting (the "YES" branch of step S118), the EMAC unit 104 processes this packet (step S119) and outputs a data portion of this packet (step S120).

(2) Operations of CPU 106 and PC

Figure 11:
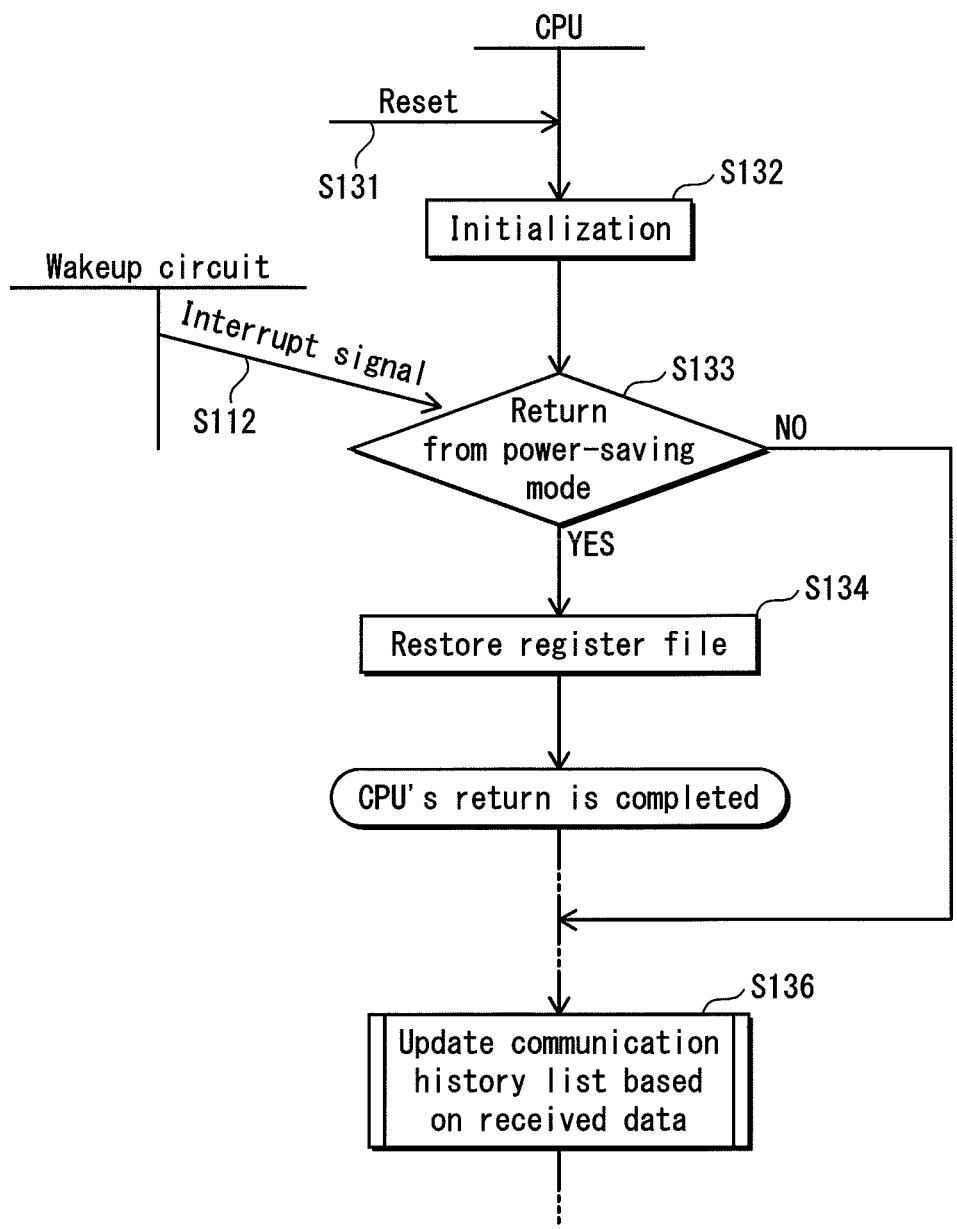
FIG. 11 is a sequence diagram of operations performed by CPU 106.

A description is now given of the operations of the CPU 106 and PC with reference to the sequence diagram of FIG. 11.

When the CPU 106 is reset (step S131), the CPU 106 initializes the constituent elements thereof (step S132). When the CPU 106 receives an interrupt signal from the wakeup circuit 105 (step S112)—i.e., when the MFP 1 (10) is to switch from the power-saving mode to the normal mode (the "YES" branch of step S133), the CPU 106 writes contents of the register file, which have been backed up in the first memory unit 107, into the register file (step S134). Through the above procedure, the CPU 106 completes switching from the power-saving mode to the normal mode.

Next, the update unit 121 updates the communication history list 141 based on the received data (step S136).

Figure 12:
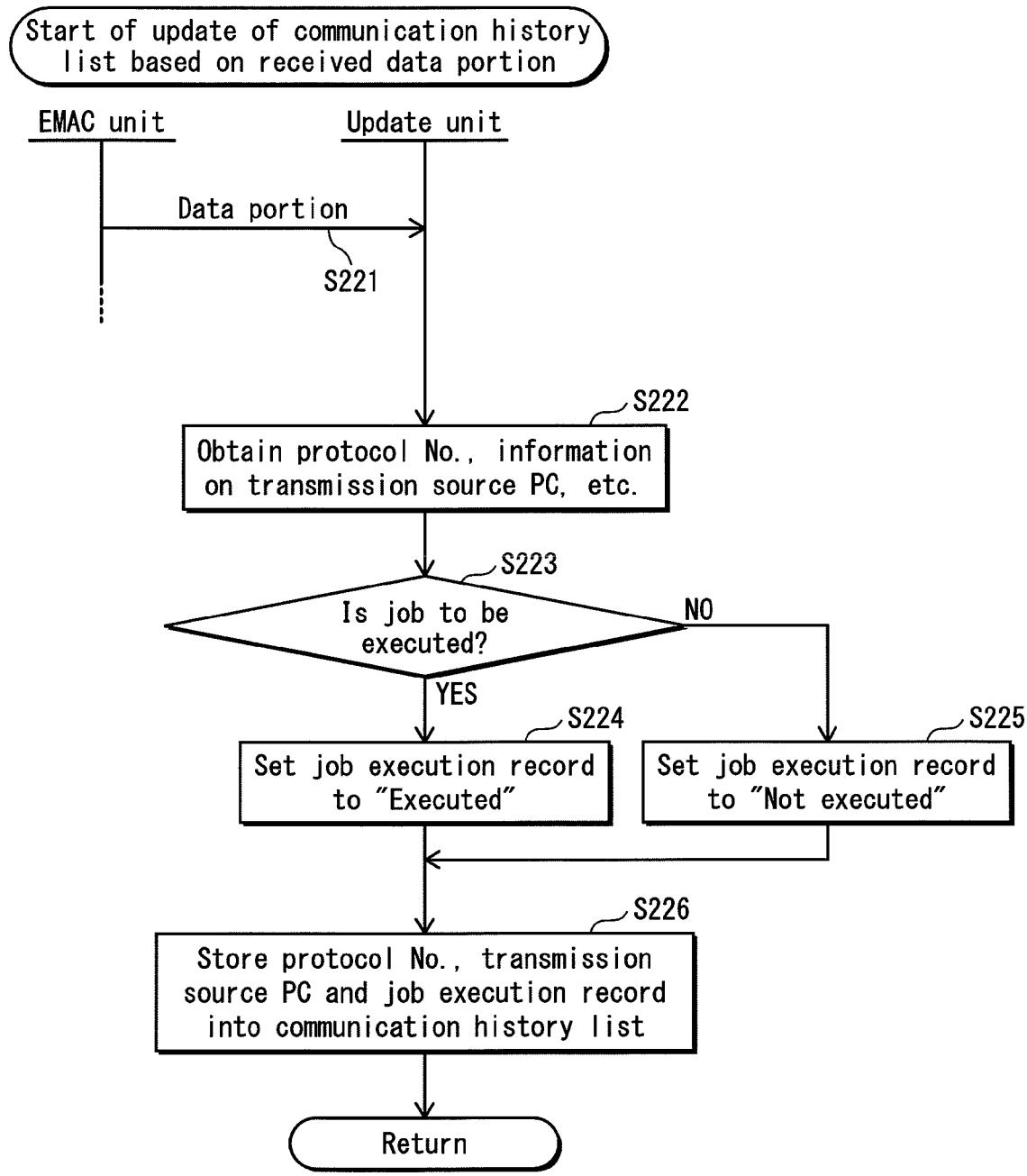
FIG. 12 is a sequence diagram of operations performed by the EMAC unit 104 and an update unit 121 to update a communication history list.

(3) Operations for Updating Communication History List 141 Based on Received Data Portion A description is now given of the operations for updating the communication history list 141 based on the received data portion with reference to the sequence diagram of FIG. 12.

During the normal mode, the update unit 121 (i) receives a data portion from the reception buffer unit 104e of the EMAC unit 104 via the reception control unit 123 (step S221), (ii) obtains the protocol number, information on the communication source PC, etc. from the received data portion (step S222), and (iii) judges whether a job is to be executed or not based on data included in the received data portion (step S223). When judging that the job is to be executed (the "YES" branch of step S223), the update unit 121 sets the "Job execution record" to indicate "Executed" (step S224). When judging that the job is not to be executed (the "NO" branch of step S223), the update unit 121 sets the "Job execution record" to indicate "Not executed" (step S225). Then, the update unit 121 generates a piece of communication history information composed of the protocol number, the information on the communication source PC, the job execution record, etc., and additionally writes the generated piece of communication history information into the communication history list 141 (step S226).

Figure 13:
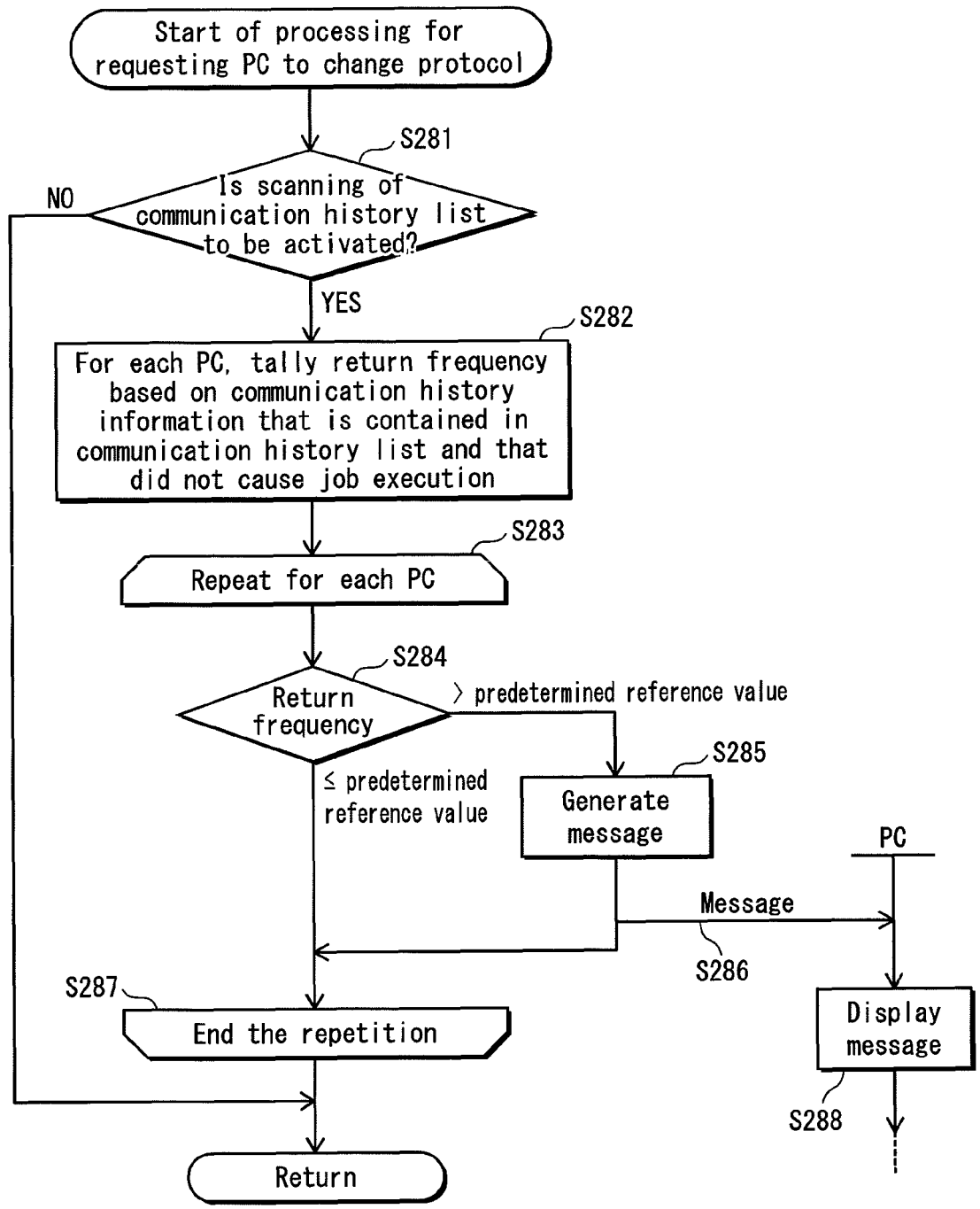
FIG. 13 is a sequence diagram of operations performed by an analysis unit 122 relating to processing for requesting a PC to change a protocol.

(4) Operations of Analysis Unit 122 Relating to Processing for Requesting Protocol Changeover A description is now given of the operations of the analysis unit 122 relating to processing for requesting a protocol changeover with reference to the sequence diagram of FIG. 13.

Based on the scan activation flag 148 stored in the first memory unit 107, the analysis unit 122 judges whether or not to activate scanning of the communication history list 141 (step S281). When the scan activation flag 148 indicates "0" (the "NO" branch of step S281), scanning of the communication history list 141 is not activated. When the scan activation flag 148 indicates "1" (the "YES" branch of step S281), the calculation unit 122a tallies, for each PC, a return frequency indicating the number of times the MFP 1 (10) switched from the power-saving mode to the normal mode, based on one or more pieces of communication history information that are contained in the communication history list 141 and that did not cause a job execution—i.e., one or more pieces of communication history information whose job execution record indicates "Not executed" (step S282).

Next, the analysis unit 122 repeats the following steps S284, S285 and S286 for each PC (steps S283 through S287).

The judgment unit 122b judges whether or not the return frequency is larger than a predetermined reference value (step S284). When the judgment unit 122b judges that the return frequency is smaller than or equal to the predetermined reference value (the "≦predetermined reference value" branch of step S284), the analysis unit 122 does not perform any processing. When the judgment unit 122b judges that the return frequency is larger than the predetermined reference value (the ">predetermined reference value" branch of step S284), the message generation unit 120 (i) generates a protocol changeover screen showing a message suggesting a protocol changeover, (ii) generates a data portion to be included in a packet to be transmitted based on the generated protocol changeover screen showing the message, and (iii) writes the generated data portion, which is addressed to the corresponding PC, into the transmission buffer unit 104d (step S285). The transmission/reception unit 119 transmits the data portion to the corresponding PC via LAN 40 (step S286). The corresponding PC receives the data portion, i.e., the protocol changeover screen (step S286), and displays the received protocol changeover screen showing the message suggesting a protocol changeover (step S288).

As described above, when the number of times an image forming device switched from the power-saving mode to the normal mode without a job execution satisfies a predetermined criterion, it means that the image forming device wastefully consumed power in the past each time it returned to the normal mode from the power-saving mode. If an information terminal device changes its protocol, then the possibility of the image forming device returning to the normal mode from the power-saving mode decreases. If the information terminal device changes its protocol as a result of transmitting thereto a message instructing a protocol changeover, the possibility of the image forming device returning to the normal mode from the power-saving mode decreases. This can prevent wasteful consumption of power.

2. Embodiment 2

The following describes a network system 5a (not illustrated) as another embodiment of the present invention. The structure of the network system 5a is similar to that of the network system 5 pertaining to Embodiment 1. The main difference between the network system 5a and the network system 5 pertaining to Embodiment 1 is the processing for requesting a general PC to change its protocol. In the present embodiment, the processing of the network system 5 for requesting a general PC to change its protocol, which has been described in Embodiment 1, is replaced with the following processing of the network system 5a for requesting a general PC to change its protocol. The following description will be given with a focus on the above difference.

(Structure of Analysis Unit 122)

The analysis unit 122 includes a search unit 122c (not illustrated) in addition to the calculation unit 122a and judgment unit 122b.

Based on the scan activation flag 148 stored in the first memory unit 107, the analysis unit 122 judges whether or not to activate scanning of the communication history list 141.

When judging that the scanning of the communication history list 141 is not to be activated, the analysis unit 122 does not perform the following processing for requesting a PC to change its protocol.

When judging that the scanning of the communication history list 141 is to be activated, the calculation unit 122a tallies, for each PC, a return frequency indicating the number of times the MFP 1 (10) returned to the normal mode from the power-saving mode, based on one or more pieces of communication history information that are contained in the communication history list 141 and that did not cause a job execution—i.e., one or more pieces of communication history information whose job execution record indicates "Not executed". That is to say, the calculation unit 122*a* calculates the number of times the MFP 1 (10) switched from the power-saving mode to the normal mode without executing a job.

Next, the judgment unit 122*b* judges, for each PC, whether or not the return frequency satisfies a predetermined criterion. More specifically, the judgment unit 122*b* judges, for each PC, whether or not the return frequency is larger than a predetermined reference value. When the judgment unit 122*b* judges that the return frequency is smaller than or equal to the predetermined reference value, the analysis unit 122 does not perform any processing, and ends the processing for requesting the corresponding PC to change its protocol.

With reference to the communication history list 141, the search unit 122*c* searches for the corresponding PC from among PCs that issued a request causing a job execution. More specifically, the search unit 122*c* searches for the corresponding PC from one or more pieces of communication history information that are contained in the communication history list 141 and that caused a job execution—i.e., one or more pieces of communication history information whose job execution record indicates "Executed". When the corresponding PC is found, the analysis unit 122 does not perform any processing, and ends the processing for requesting the corresponding PC to change its protocol.

When the judgment unit 122*b* judges that the tallied return frequency satisfies the predetermined criterion and the search unit 122*c* has not found the corresponding PC from among PCs that issued a request causing a job execution, the message generation unit 120 generates a message for suggesting a protocol changeover. More specifically, when the return frequency is judged to be larger than the predetermined reference value and the corresponding PC has not been found from among PCs that issued a request causing a job execution, the message generation unit 120 (i) generates a protocol changeover screen showing the message for suggesting the protocol changeover, (ii) generates a data portion to be included in a packet to be transmitted, based on the generated protocol changeover screen showing the message, and (iii) writes the generated data portion, which is addressed to the corresponding PC, into the transmission buffer unit 104*d*.

One example of the protocol changeover screen is illustrated in FIG. 9. As illustrated in FIG. 9, the screen 301 shows a message suggesting that the protocol indicated by a target protocol number be changed to the protocol indicated by an alternative protocol number.

Although it has been described above that the calculation unit 122*a* tallies, for each PC, a return frequency indicating the number of times the MFP 1 (10) returned to the normal mode from the power-saving mode based on one or more pieces of communication history information that are contained in the communication history list 141 and that did not cause a job execution, the present invention is not limited in this way. For example, the calculation unit 122*a* may tally, for each PC, a return frequency indicating the number of times the MFP 1 (10) returned to the normal mode from the power-saving mode per predetermined time period. The predetermined time period is, for example, one day, one week, two weeks, one month, etc.

Although it has been described above that the data portion addressed to the corresponding PC is written into the transmission buffer unit 104*d*, the present invention is not limited in this way. Alternatively, the data portion may be addressed to the administrator's PC 31.

Alternatively, the above message may be transmitted by e-mail to the corresponding PC, to the administrator's PC 31, or to both of the corresponding PC and administrator's PC 31.

Alternatively, a device driver that uses an appropriate protocol may be transmitted to the corresponding PC so as to mandatorily cause the corresponding PC to update its device driver.

(Operations of Analysis Unit 122 Relating to Processing for Requesting PC to Change Protocol)

Figure 14:
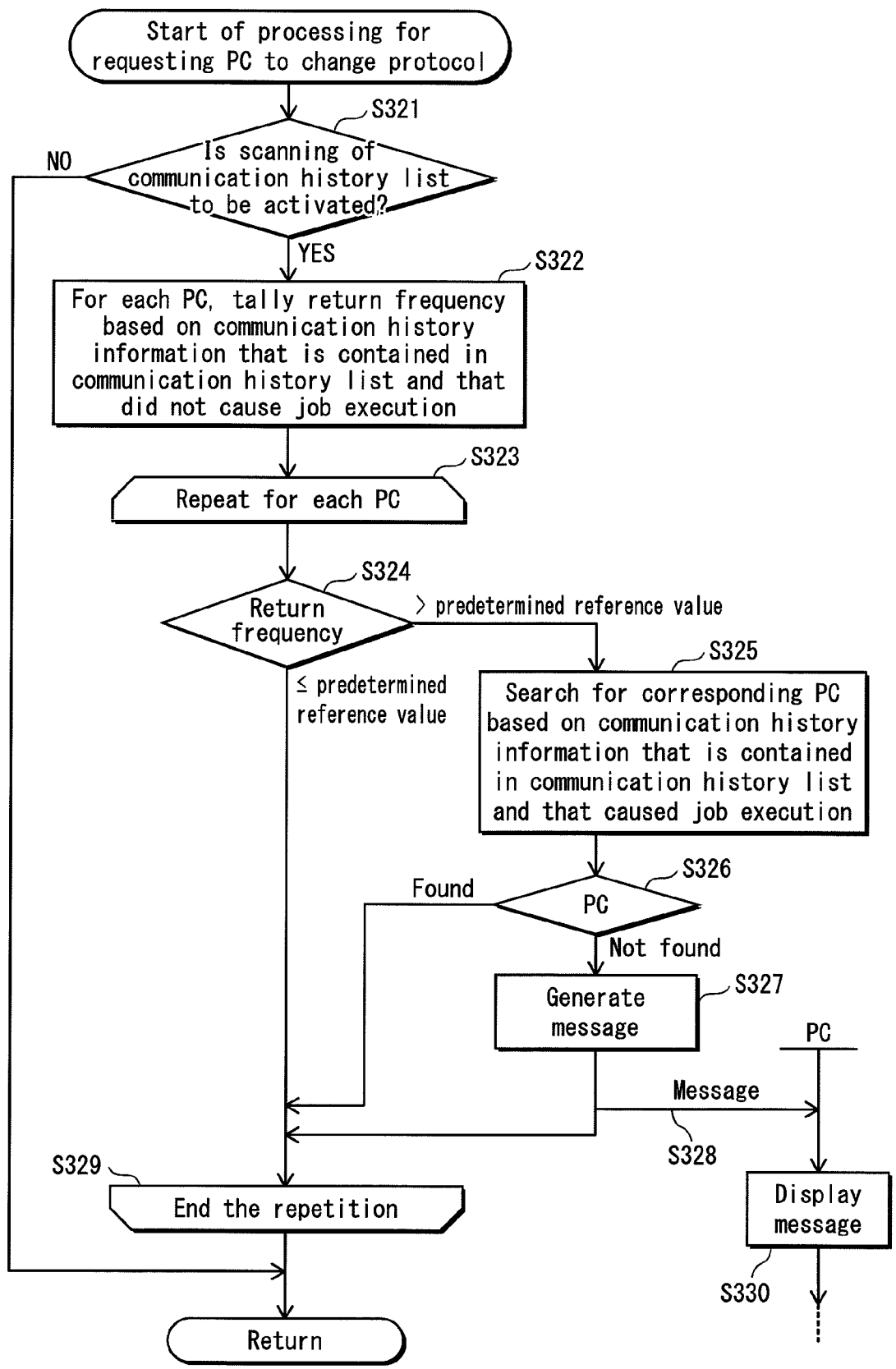
FIG. 14 is a sequence diagram of operations performed by an analysis unit 122 pertaining to Embodiment 2 relating to processing for requesting a PC to change a protocol.

The following describes the operations of the analysis unit 122 relating to processing for requesting a PC to change its protocol with reference to the sequence diagram of FIG. 14.

Based on the scan activation flag 148 stored in the first memory unit 107, the analysis unit 122 judges whether or not to activate scanning of the communication history list 141 (step S321).

When judging that the scanning of the communication history list 141 is not to be activated (the "NO" branch of step S321), the analysis unit 122 does not perform processing for requesting a protocol changeover to a PC.

When the analysis unit 122 judges that the scanning of the communication history list 141 is to be activated (the "YES" branch of step S321), the calculation unit 122*a* tallies, for each PC, a return frequency indicating the number of times the MFP 1 (10) switched from the power-saving mode to the normal mode, based on one or more pieces of communication history information that are contained in the communication history list 141 and that did not cause a job execution—i.e., one or more pieces of communication history information whose job execution record indicates "Not executed" (step 322).

Next, the analysis unit 122 repeats the steps S324, S325, S326, S327, S328, and S330 for each PC (steps S323 through S329).

The judgment unit 122*b* judges, for each PC, whether or not the return frequency is larger than a predetermined reference value (step S324). When the judgment unit 122*b* judges that the return frequency is smaller than or equal to the predetermined reference value, the analysis unit 122 does not perform any processing, and ends the processing for requesting the corresponding PC to change its protocol. When the judgment unit 122*b* judges that the return frequency is larger than the predetermined reference value (the ">predetermined reference value" branch of step S324), the search unit 122*c* searches for the corresponding PC from among PCs that issued a request causing a job execution, based on one or more pieces of communication history information that are contained in the communication history list 141 and that caused a job execution—i.e., one or more pieces of communication history information whose job execution record indicates "Executed" (step S325). When the corresponding PC is found (the "Found" branch of step S326), the analysis unit 122 does not perform any processing, and ends the processing for requesting the corresponding PC to change its protocol.

When the corresponding PC is not found (the "Not found" branch of step S326), the message generation unit 120 (i) generates a protocol changeover screen showing a message for suggesting a protocol changeover, (ii) generates a data portion to be included in a packet to be transmitted, based on the generated protocol changeover screen showing the message, and (iii) writes the generated data portion, which is addressed to the corresponding PC, into the transmission buffer unit 104*d* (step S327).

The transmission/reception unit 119 transmits the data portion to the corresponding PC via LAN 40 (step S328). The corresponding PC receives the data portion, i.e., the protocol changeover screen (step S328), and displays the received protocol changeover screen showing the message for suggesting a protocol changeover (step S330).

As described above, when the number of times an image forming device switched from the power-saving mode to the normal mode without a job execution satisfies a predetermined criterion, it means that the image forming device wastefully consumed power in the past each time it returned to the normal mode from the power-saving mode. In a case where a request from an information terminal device does not cause a job execution, if the information terminal device changes its protocol, then the possibility of the image forming device returning to the normal mode from the power-saving mode decreases. This way, if the information terminal device changes its protocol as a result of the image forming device transmitting thereto a message for instructing a protocol changeover, then the possibility of the image forming device returning to the normal mode from the power-saving mode decreases. This can prevent wasteful consumption of power 3. Embodiment 3

The following describes a network system 5b (not illustrated) as yet another embodiment of the present invention. The structure of the network system 5b is similar to that of the network system 5 pertaining to Embodiment 1. The main difference between the network system 5b and the network system 5 pertaining to Embodiment 1 is processing for suggesting an alternative protocol. In the present embodiment, the processing of the network system 5 for requesting a general PC to change its protocol, which has been described in Embodiment 1, is replaced with the following processing for suggesting an alternative protocol. The following description will be given with a focus on the above difference.
(Alternative Protocol List 142)

The first memory unit 107 further stores therein an alternative protocol list 142.

The alternative protocol list 142 is used to, when a user attempts to install a device driver for a new printer that uses a printing protocol not recommended by the MFP, suggest the user to install a device driver that uses an alternative protocol instead of the printing protocol not recommended by the MFP.

By way of example, as shown in FIG. 15, the alternative protocol list 142 has an area for storing one or more pieces of alternative protocol information, each of which is composed of a target protocol number and an alternative protocol number.

Each target protocol number shows a protocol number of a printing protocol that is not recommended by the MFP. Each alternative protocol number shows a protocol number of a printing protocol that is recommended for the user to install in place of the printing protocol indicated by the corresponding target protocol number.
(Analysis Unit 122)

The analysis unit 122 analyzes whether or not a protocol number received from a PC, which indicates a protocol used by the PC, is contained in the alternative protocol list 142 as a target protocol number. When contained, the analysis unit 122 generates a message suggesting that the PC should switch to a protocol indicated by a corresponding alternative protocol number.

The following provides a detailed description of the analysis unit 122.

The analysis unit 122 receives a protocol number from a PC via the reception control unit 123, and judges whether or not the received protocol number is contained in the alternative protocol list 142 as a target protocol number. When the received protocol number is not contained in the alternative protocol list 142, the analysis unit 122 ends the processing for suggesting the alternative protocol.

When the received protocol number is contained in the alternative protocol list 142 as a target protocol number, the message generation unit 120 (i) reads, from the alternative protocol list 142, an alternative protocol number corresponding to the target protocol number, (ii) with use of the corresponding alternative protocol number that has been read, generates a changeover screen showing a message suggesting that the protocol indicated by the target protocol number be changed to the protocol indicated by the corresponding alternative protocol number, and (iii) based on the generated changeover screen, generates a data portion to be included in a packet to be transmitted.

One example of the changeover screen is illustrated in FIG. 9. As illustrated in FIG. 9, the screen 301 shows a message suggesting that the protocol indicated by a target protocol number be changed to the protocol indicated by an alternative protocol number.

Next, the message generation unit 120 writes the generated data portion, which is addressed to the corresponding PC, into the transmission buffer unit 104d of the EMAC unit.

Alternatively, the above message may be transmitted by e-mail to the corresponding PC.

Alternatively, a device driver that uses the protocol indicated by the alternative protocol number may be transmitted to the corresponding PC so as to mandatorily cause the corresponding PC to update its device driver.
(Operations of Analysis Unit 122 Relating to Processing for Suggesting Alternative Protocol)

Figure 16:
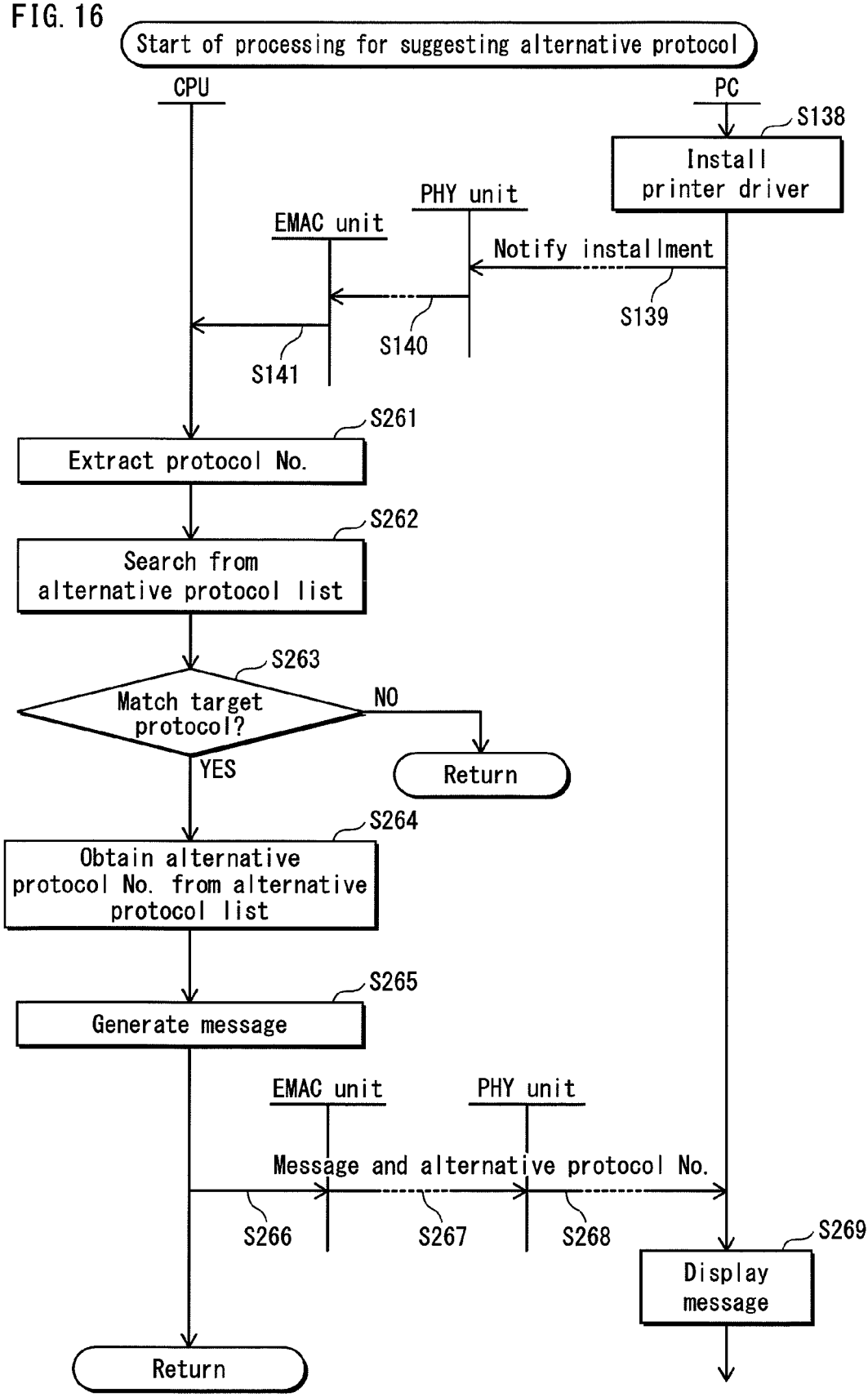
FIG. 16 is a sequence diagram of operations performed by an analysis unit 122 relating to processing for suggesting an alternative protocol.

The following describes the operations of the analysis unit 122 relating to processing for suggesting an alternative protocol with reference to the sequence diagram of FIG. 16.

Upon installment of a printer driver (step S138), the PC 1 (21) notifies the MFP 1 (10) of the installment (step S139). The PHY unit 101, automatic response unit 102 and EMAC unit 104 receive the notification about the installment (steps S140 and S141).

Upon receiving the notification about the installment, the analysis unit 122 receives a protocol number from the PC via the reception control unit 123 (step S261), searches the alternative protocol list 142 (step S262), and judges whether or not the received protocol number is contained in the alternative protocol list 142 as a target protocol number (step S263). When the received protocol number is not contained in the alternative protocol list 142 (the "NO" branch of step S263), the analysis unit 122 ends the processing for suggesting the alternative protocol.

When the received protocol number is contained in the alternative protocol list 142 as a target protocol number (the YES branch of step S263), the message generation unit 120 (i) reads, from the alternative protocol list 142, an alternative protocol number corresponding to the target protocol number (step S264), (ii) with use of the corresponding alternative protocol number that has been read, generates a changeover screen showing a message suggesting that the protocol indicated by the target protocol number be changed to the protocol indicated by the corresponding alternative protocol number, and (iii) based on the generated changeover screen, generates a data portion to be included in a packet to be transmitted (step S265).

Next, the message generation unit 120 writes the generated data portion, which is addressed to the PC, into the transmission buffer unit 104d of the EMAC unit (step S266).

The transmission/reception unit 119 transmits the data portion that has been written into the transmission buffer unit 104d of the EMAC unit 104 and that is addressed to the administrator's PC 31 (i.e., the changeover screen showing the message suggesting that the protocol indicated by the target protocol number be changed to the protocol indicated by the corresponding alternative protocol number) to the administrator's PC 31 via LAN 40 (steps S267 and S268). When the PC 1 (21) receives the changeover screen (step S268), the PC 1 (21) displays the received changeover screen showing the message suggesting that the protocol indicated by the target protocol number be changed to the protocol indicated by the corresponding alternative protocol number (step S269).

As described above, an alternative protocol is presented upon outputting a message suggesting a protocol changeover. If the information terminal device accordingly changes its protocol, the possibility of the image forming device returning to the normal mode from the power-saving mode decreases. This can prevent wasteful consumption of power.

4. Embodiment 4

The following describes a network system 5c (not illustrated) as yet another embodiment of the present invention. The structure of the network system 5c is similar to that of the network system 5 pertaining to Embodiment 1. The main difference between the network system 5c and the network system 5 pertaining to Embodiment 1 is processing for generating a suggested protocol list. In the present embodiment, the processing of the network system 5 for requesting a general PC to change its protocol, which has been described in Embodiment 1, is replaced with the following processing for generating a suggested protocol list.

The following description will be given with a focus on the above difference.

(Multicast Protocol List 144)

The first memory unit 107 further stores therein a multicast protocol list 144.

By way of example, as shown in FIG. 17, the multicast protocol list 144 has an area for storing one or more protocol numbers. Each protocol number indicates a protocol used by a device driver that transmits packets by multicasting.

(Analysis Unit 122)

The analysis unit 122 selects a protocol number of a protocol that does not cause multicast by analyzing automatic response protocol lists 132, 162 and 163. The automatic response protocol list 132 is stored in the third memory unit 103 of the MFP 1 (10). The automatic response protocol lists 162 and 163 are respectively stored in and transmitted by other MFPs 2 (11) and 3 (12). Then, the analysis unit 122 generates a suggested protocol list composed of the selected protocol number, and transmits the generated suggested protocol list to each PC.

The following provides a detailed description of the analysis unit 122.

The analysis unit 122 (i) generates a request for an automatic response protocol list with respect to the MFP 1 (10), MFP 2 (11) and MFP 3 (12), (ii) based on the generated request, generates a data portion to be included in a packet to be transmitted, and (iii) writes the generated data portion, which is addressed to the MFP 1 (10), MFP 2 (11) and MFP 3 (12), into the transmission buffer unit 104d of the EMAC unit 104. Next, the analysis unit 122 receives, from the reception control unit 123, the automatic response protocol list of the MFP 1 (10), the automatic response protocol list of the MFP 2 (11), and the automatic response protocol list of the MFP 3 (12).

Next, the analysis unit 122 reads the multicast protocol list 144 from the first memory unit 107. If the automatic response protocol list of the MFP 1 (10) contains a protocol number contained in the multicast protocol list 144, the analysis unit 122 removes that protocol number from the automatic response protocol list of the MFP 1 (10). If the automatic response protocol list of the MFP 2 (11) contains a protocol number contained in the multicast protocol list 144, the analysis unit 122 removes that protocol number from the automatic response protocol list of the MFP 2 (11). If the automatic response protocol list of the MFP 3 (12) contains a protocol number contained in the multicast protocol list 144, the analysis unit 122 removes that protocol number from the automatic response protocol list of the MFP 3 (12). The analysis unit 122 then generates one protocol list by merging the three resultant automatic response protocol lists. Thereafter, the analysis unit 122 generates one suggested protocol list by deleting redundant protocol numbers from the generated protocol list.

The suggested protocol list thus generated contains protocol numbers contained in the automatic response protocol lists of the MFP 1 (10), MFP 2 (11) and MFP 3 (12), except for multicast protocol numbers.

Furthermore, the message generation unit 120 (i) generates a message that includes the generated suggested protocol and thus indicates suggested protocols, (ii) based on the generated message, generates a data portion to be included in a packet to be transmitted, and (iii) writes the generated data portion, which is addressed to the PC, to the transmission buffer unit 104d of the EMAC unit 104.

Figure 18:
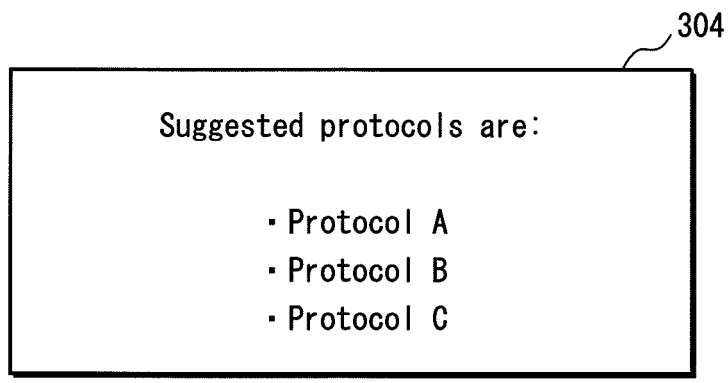
FIG. 18 shows one example of a screen 304.

FIG. 18 shows one example of a screen showing a message that includes the generated suggested protocol list and thus indicates suggested protocols. As shown in FIG. 18, a screen 304 shows a message showing the suggested protocols.

Here, a message including the generated suggested protocol list may be transmitted by e-mail to each PC.

Alternatively, a device driver that uses an appropriate protocol contained in the suggested protocol list may be transmitted to the corresponding PC so as to mandatorily cause the corresponding PC to update its device driver.

(Operations of Analysis Unit 122 to Generate Suggested Protocol List)

Figure 19:
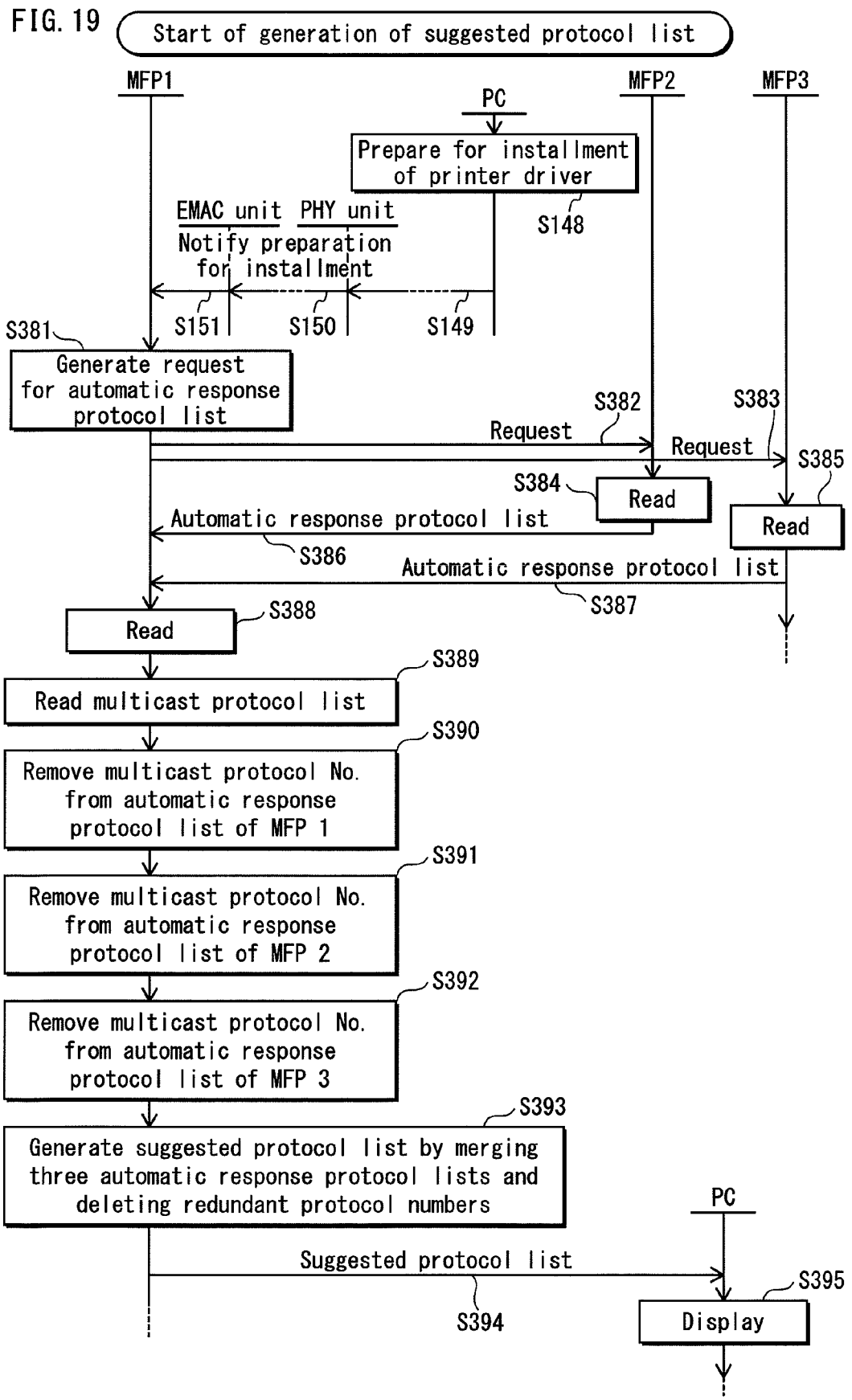
FIG. 19 is a sequence diagram of operations performed by an analysis unit 122 to generate a suggested protocol list.

The following describes the operations of the analysis unit 122 to generate the suggested protocol list with reference to the sequence diagram of FIG. 19.

When the installment of a printer driver is prepared (step S148), the PC 1 (21) notifies the MFP 1 (10) of the preparation for the installment (step S149). The PHY unit 101, automatic response unit 102 and EMAC unit 104 receive the notification about the preparation for the installment (steps S150 and S151).

Upon receiving the notification about the preparation for the installment, the analysis unit 122 (i) generates a request for an automatic response protocol list with respect to the MFP 1 (10), MFP 2 (11) and MFP 3 (12), (ii) based on the generated request, generates a data portion to be included in a packet to be transmitted, and (iii) writes the generated data portion, which is addressed to the MFP 1 (10), MFP 2 (11) and MFP 3 (12), into the transmission buffer unit 104d of the EMAC unit 104 (step S381).

The transmission/reception unit 119 transmits the data portion to each of the MFP 2 (11) and MFP 3 (12) via LAN 40 (steps S382 and S383). Each of the MFP 2 (11) and MFP 3 (12) receives the data portion, i.e., the request for the automatic response protocol list (steps S382 and S383), reads the automatic response protocol list (steps S384 and S385), and transmits the read automatic response protocol list to the analysis unit 122 via the transmission/reception unit 119 of the MFP 1 (10) (steps S386 and S387).

Upon receiving the request, the automatic response unit 102 of the MFP 1 (10) reads the automatic response protocol list and outputs the read automatic response protocol list to the analysis unit 122 via the EMAC unit 104 (step S388).

The analysis unit 122 receives the automatic response protocol list of the MFP 1 (10), the automatic response protocol list of the MFP 2 (11), and the automatic response protocol list of the MFP 3 (12) via the transmission/reception unit 119 and reception control unit 123 (steps S388, S386 and S387).

Next, the analysis unit 122 reads the multicast protocol list 144 from the first memory unit 107 (step S389). If the automatic response protocol list of the MFP 1 (10) contains a protocol number contained in the multicast protocol list 144, the analysis unit 122 removes that protocol number from the automatic response protocol list of the MFP 1 (10) (step S390). If the automatic response protocol list of the MFP 2 (11) contains a protocol number contained in the multicast protocol list 144, the analysis unit 122 removes that protocol list from the automatic response protocol list of the MFP 2 (11) (step S391). If the automatic response protocol list of the MFP 3 (12) contains a protocol number contained in the multicast protocol list 144, the analysis unit 122 removes that protocol number from the automatic response protocol list of the MFP 3 (12) (step S392). The analysis unit 122 then generates one protocol list by merging the three resultant automatic response protocol lists. Thereafter, the analysis unit 122 generates one suggested protocol list by deleting redundant protocol numbers from the generated protocol list. Furthermore, the message generation unit 120 (i) generates a message that includes the generated suggested protocol and thus indicates the suggested protocols, (ii) based on the generated message, generates a data portion to be included in a packet to be transmitted, and (iii) writes the generated data portion, which is addressed to the PC, to the transmission buffer unit 104*d* of the EMAC unit 104 (step S393).

The transmission/reception unit 119 transmits the data portion to the PC via LAN 40 (step S394). The PC receives the data portion, i.e., the message including the suggested protocol list (step S394), and displays, on a screen, the message including the suggested protocol list and thus indicates the suggested protocols (step S395).

As described above, the suggested protocol list is transmitted. Therefore, if an information terminal device switches to a protocol contained in the suggested protocol list, the possibility of an image forming device returning to the normal mode from the power-saving mode decreases. This can prevent wasteful consumption of power.

5. Embodiment 5

The following describes a network system 5*d* (not illustrated) as yet another embodiment of the present invention. The structure of the network system 5*d* is similar to that of the network system 5 pertaining to Embodiment 1. The main difference between the network system 5*d* and the network system 5 pertaining to Embodiment 1 is the processing for requesting the administrator's PC 31 to change a protocol. In the present embodiment, the processing of the network system 5 for requesting a general PC to change its protocol, which has been described in Embodiment 1, is replaced with the following processing for requesting the administrator's PC 31 to change a protocol. The following description will be given with a focus on the above difference.

(Protocol Changeover List 143)

The first memory unit 107 further stores therein a protocol changeover list 143.

The protocol changeover list 143 is used to notify the administrator that the effect of power saving are improved by switching from a device driver currently installed in each PC to another device driver. The protocol changeover list 143 contains, in correspondence, (i) a target protocol number of a printing protocol used by a device driver currently installed in each PC, and (ii) an alternative protocol number of a printing protocol used by a device driver that would improve the effect of power saving in the MFP.

By way of example, as shown in FIG. 20, the protocol changeover list 143 includes an area for storing one or more pieces of protocol changeover information, each of which is composed of a target protocol number and an alternative protocol number.

Each target protocol number is a protocol number of one printing protocol. Each alternative protocol number is a protocol number of a printing protocol that is expected to improve the effect of power saving in the MFP, provided that a device driver that uses this printing protocol indicated by the alternative protocol number is installed in place of a device driver that uses the protocol indicated by the corresponding target protocol number.

(Analysis Unit 122)

The analysis unit 122 includes a search unit 122*c* in addition to the calculation unit 122*a* and judgment unit 122*b*.

Based on the scan activation flag 148 stored in the first memory unit 107, the analysis unit 122 judges whether or not to activate scanning of the communication history list 141.

When judging that the scanning of the communication history list 141 is not to be activated, the analysis unit 122 does not perform the following processing for requesting the administrator's PC 31 to change a protocol.

When judging that the scanning of the communication history list 141 is to be activated, the calculation unit 122*a* tallies, for each PC, a return frequency indicating the number of times the MFP 1 (10) returned to the normal mode from the power-saving mode, based on one or more pieces of communication history information that are contained in the communication history list 141 and did not cause a job execution—i.e., one or more pieces of communication history information whose job execution record indicates "Not executed". That is to say, the calculation unit 122*a* calculates the number of times the MFP 1 (10) switched from the power-saving mode to the normal mode without executing a job.

Next, the judgment unit 122*b* judges, for each PC, whether or not the return frequency satisfies a predetermined criterion. More specifically, the judgment unit 122*b* judges, for each PC, whether or not the return frequency is larger than a predetermined reference value. When the judgment unit 122*b* judges that the return frequency is smaller than or equal to the predetermined reference value, the analysis unit 122 does not perform any processing, and ends the processing for requesting a protocol changeover.

The search unit 122*c* searches whether or not a protocol number that is contained in the pieces of communication history information and that indicates a protocol used by the corresponding PC is contained in the protocol changeover list 143 as a target protocol number. When the search unit 122*c* judges that the protocol number indicating the protocol used by the corresponding PC is not contained in the protocol changeover list 143 as a target protocol number, the analysis unit 122 does not perform any processing and ends the processing for requesting a protocol changeover.

When the judgment unit 122b judges that the tallied return frequency satisfies the predetermined criterion and the search unit 122c judges that the protocol number indicating the protocol used by the corresponding PC is contained in the protocol changeover list 143 as a target protocol number, the message generation unit 120 generates a message described below.

More specifically, when the judgment unit 122b judges that the return frequency is larger than the predetermined reference value and the search unit 122c judges that the protocol number indicating the protocol used by the corresponding PC is contained in the protocol changeover list 143 as a target protocol number, the message generation unit 120 calculates the effect of power saving by using the following equation.

Amount of power saved (watt)=amount of power required each time MFP switches from power-saving mode to normal mode×the number of times MFP switches from power-saving mode to normal mode per predetermined time period Next, the message generation unit 120 generates a message indicating that, if the protocol used by the corresponding PC is changed to the protocol indicated by the alternative protocol number corresponding to the target protocol number, the calculated amount of power (watt) can be saved as the effect of power saving. Based on the generated message, the message generation unit 120 generates a data portion to be included in a packet to be transmitted, and writes the generated data portion, which is addressed to the administrator's PC, into the transmission buffer unit 104d of the EMAC unit 104.

Figure 21:
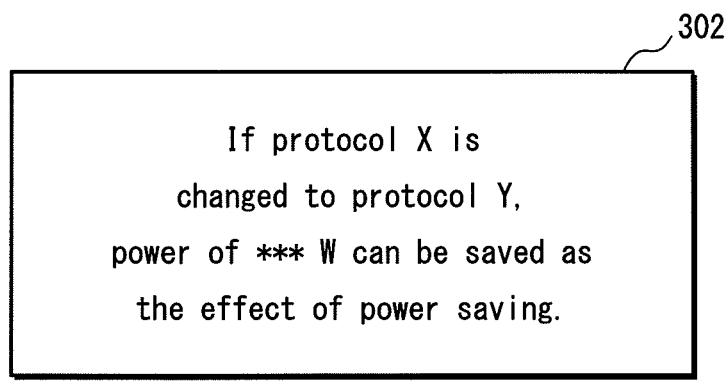
FIG. 21 shows one example of a screen 302.

One example of the protocol changeover screen is illustrated in FIG. 21. As illustrated in FIG. 21, a screen 302 shows a message indicating that, if the protocol indicated by the target protocol number is changed to the protocol indicated by the alternative protocol number, the amount of power displayed on the screen 302 can be saved as the effect of power saving.

Although it has been described above that the calculation unit 122a tallies, for each PC, a return frequency indicating the number of times the MFP 1 (10) returned to the normal mode from the power-saving mode based on one or more pieces of communication history information that are contained in the communication history list 141 and that did not cause a job execution, the present invention is not limited in this way. For example, the calculation unit 122a may tally, for each PC, a return frequency indicating the number of times the MFP 1 (10) returned to the normal mode from the power-saving mode per predetermined time period. The predetermined time period is, for example, one day, one week, two weeks, one month, etc.

Although it has been described above that the data portion addressed to the administrator's PC is written into the transmission buffer unit 104d, the present invention is not limited in this way. Alternatively, the data portion may be addressed to a PC of a general user for which the return frequency has been judged to be larger than the predetermined reference value.

Alternatively, the above message may be transmitted by e-mail to a PC of a general user for which the return frequency has been judged to be larger than the predetermined reference value, to the administrator's PC 31, or to both of this PC of the general user and the administrator's PC 31.

Alternatively, a device driver that uses the protocol indicated by the alternative protocol number may be transmitted to the corresponding PC so as to mandatorily cause the corresponding PC to update its device driver.

As described above, the message generation unit 120 (i) calculates the amount of power that can be saved in the MFP 1 (10) if the protocol used by the corresponding PC is changed to the protocol indicated by the alternative protocol number, and (ii) generates a message including information showing the calculated amount of power that can be saved.

(Operations of Analysis Unit 122 Relating to Processing for Requesting Administrator's PC to Change Protocol)

Figure 22:
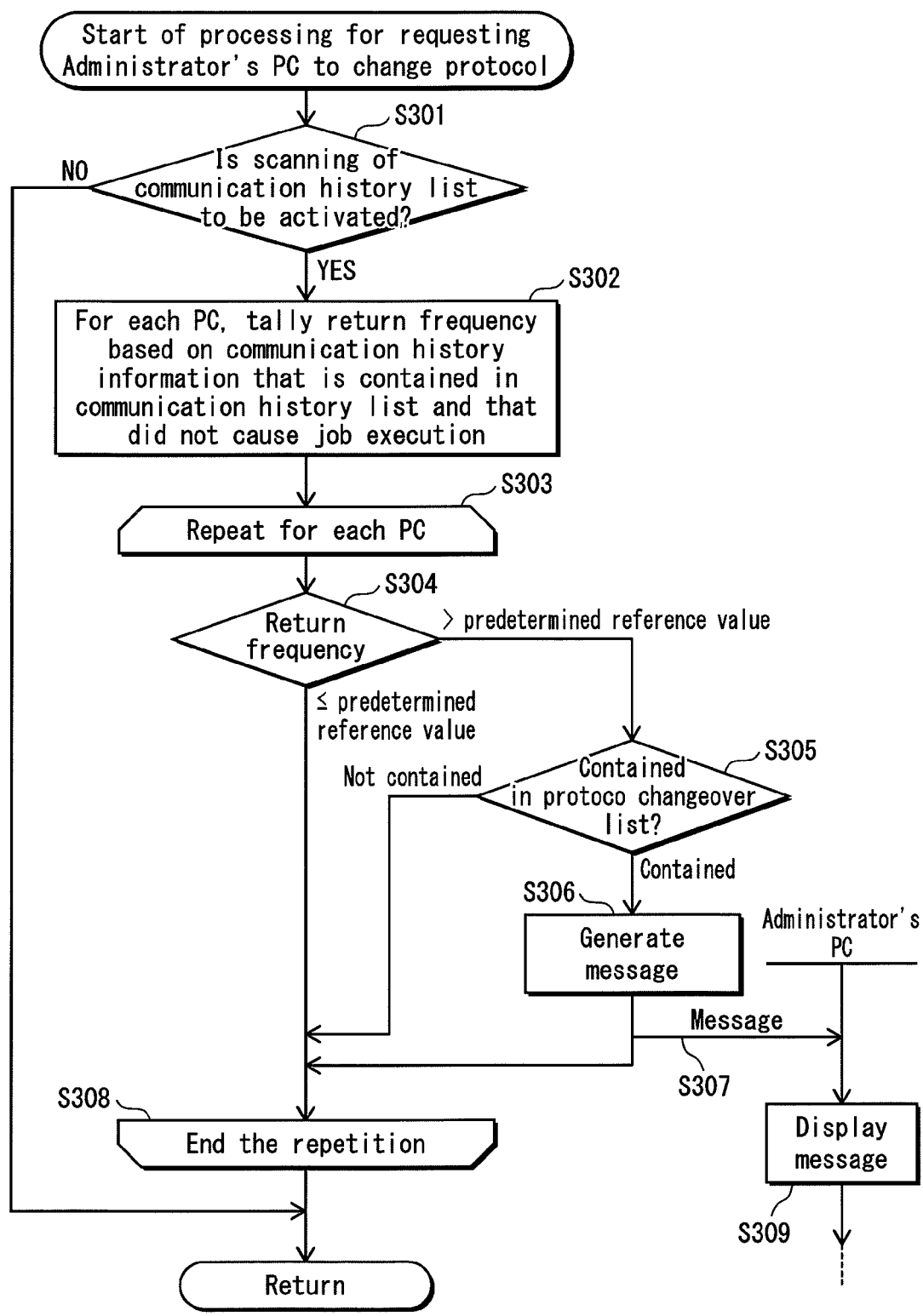
FIG. 22 is a sequence diagram of operations performed by an analysis unit 122 relating to processing for requesting the administrator's PC to change a protocol.

The following describes the operations of the analysis unit 122 relating to processing for requesting the administrator's PC to change a protocol with reference to the sequence diagram of FIG. 22.

Based on the scan activation flag 148 stored in the first memory unit 107, the analysis unit 122 judges whether or not to activate scanning of the communication history list 141 (step S301).

When judging that the scanning of the communication history list 141 is not to be activated (the "NO" branch of step S301), the analysis unit 122 does not perform the following processing for requesting the administrator's PC 31 to change a protocol.

When the analysis unit 122 judges that the scanning of the communication history list 141 is to be activated (the "YES" branch of step S301), the calculation unit 122a tallies, for each PC, a return frequency indicating the number of times the MFP 1 (10) switched from the power-saving mode to the normal mode, based on one or more pieces of communication history information that are contained in the communication history list 141 and that did not cause a job execution—i.e., one or more pieces of communication history information whose job execution record indicates "Not executed" (step 302).

The analysis unit 122 repeats the steps S304, S305, S306 and S307 for each PC (steps S303 through S308).

The judgment unit 122b judges, for each PC, whether or not the return frequency is larger than a predetermined reference value (step S304). When the judgment unit 122b judges that the return frequency is smaller than or equal to the predetermined reference value (the "≤predetermined reference value" branch of step S304), the analysis unit 122 does not perform any processing, and ends the processing for requesting a protocol changeover. When the judgment unit 122b judges that the return frequency is larger than the predetermined reference value (the ">predetermined reference value" branch of step S304), the search unit 122c judges whether or not a protocol number that is contained in the pieces of communication history information and that indicates a protocol used by the corresponding PC is contained in the protocol changeover list 143 as a target protocol number (step S305). When the search unit 122c judges that the protocol number indicating the protocol used by the corresponding PC is not contained in the protocol changeover list 143 as a target protocol number (the "Not contained" branch of step S305), the analysis unit 122 does not perform any processing and ends the processing for requesting a protocol changeover. When the search unit 122c judges that the protocol number indicating the protocol used by the corresponding PC is contained in the protocol changeover list 143 as a target protocol number (the "Contained" branch of step S305), the message generation unit 120 calculates the effect of power saving, and generates a message indicating that, if the protocol used by the corresponding PC is changed to the protocol indicated by the alternative protocol number corresponding to the target protocol number, the calculated amount of power (watt) can be saved as the effect of power saving. Then, based on the generated message, the search unit 122c generates a data portion to be included in a packet to be transmitted, and writes the generated data portion, which is addressed to the administrator's PC, into the transmission buffer unit 104d of the EMAC unit 104 (step S306).

The transmission/reception unit 119 transmits the data portion to the administrator's PC 31 via LAN 40 (step S307). The administrator's PC 31 receives the data portion, i.e., the message indicating the effect of power saving (step S307), and displays the received message on a screen (step S309).

As described above, a message indicating an alternative protocol and the effect of power saving achieved by the protocol changeover is generated and transmitted. That is, the message transmitted to the administrator of information terminal devices is more persuasive. If the administrator causes an information terminal device of a general user to change its protocol, the possibility of the image forming device returning to the normal mode from the power-saving mode decreases. This can prevent wasteful consumption of power.

6. Embodiment 6

The following describes a network system 5e (not illustrated) as yet another embodiment of the present invention. The structure of the network system 5e is similar to that of the network system 5 pertaining to Embodiment 1. The main difference between the network system 5e and the network system 5 pertaining to Embodiment 1 is the processing for requesting the administrator's PC 31 to change a protocol. In the present embodiment, the processing of the network system 5 for requesting a general PC to change its protocol, which has been described in Embodiment 1, is replaced with the following processing for requesting the administrator's PC 31 to change a protocol. The following description will be given with a focus on the above difference.

The first memory unit 107 further stores therein a protocol changeover list 143. The description of the protocol changeover list 143 has been provided above.

The analysis unit 122 includes a search unit 122c in addition to the calculation unit 122a and judgment unit 122b.

Based on the scan activation flag 148 stored in the first memory unit 107, the analysis unit 122 judges whether or not to activate scanning of the communication history list 141.

When judging that the scanning of the communication history list 141 is not to be activated, the analysis unit 122 does not perform the following processing for requesting the administrator's PC 31 to change a protocol.

When the analysis unit 122 judges that the scanning of the communication history list 141 is to be activated, the calculation unit 122a of the analysis unit 122 tallies, for each PC, a return frequency indicating the number of times the MFP 1 (10) returned to the normal mode from the power-saving mode, based on one or more pieces of communication history information that are contained in the communication history list 141 and that did not cause a job execution—i.e., one or more pieces of communication history information whose job execution record indicates "Not executed". That is to say, the calculation unit 122a calculates the number of times the MFP 1 (10) switched from the power-saving mode to the normal mode without executing a job.

Next, the judgment unit 122b judges, for each PC, whether or not the return frequency satisfies a predetermined criterion. More specifically, the judgment unit 122b judges, for each PC, whether or not the return frequency is larger than a predetermined reference value. When the judgment unit 122b judges that the return frequency is smaller than or equal to the predetermined reference value, the analysis unit 122 does not perform any processing, and ends the processing for requesting a protocol changeover with respect to the corresponding PC.

With reference to the communication history list 141, the search unit 122c searches for the corresponding PC from among PCs that issued a request causing a job execution. More specifically, the search unit 122c searches for the corresponding PC from one or more pieces of communication history information that are contained in the communication history list 141 and that caused a job execution—i.e., one or more pieces of communication history information whose job execution record indicates "Executed". When the corresponding PC is found, the analysis unit 122 does not perform any processing, and ends the processing for requesting a protocol changeover with respect to the corresponding PC. The search unit 122c further judges whether or not the protocol number indicating the protocol used by the corresponding PC is contained in the protocol changeover list 143 as a target protocol number. When the search unit 122c judges that the protocol number indicating the protocol used by the corresponding PC is not contained in the protocol changeover list 143 as a target protocol number, the analysis unit 122 does not perform any processing and ends the processing for requesting a protocol changeover with respect to that protocol.

When the judgment unit 122b judges that the tallied return frequency satisfies the predetermined criterion and the search unit 122c (i) has not found the corresponding PC from among the PCs that issued a request causing a job execution and (ii) judges that the protocol number indicating the protocol used by the corresponding PC is contained in the protocol changeover list 143 as a target protocol number, the message generation unit 120 generates a message described below. More specifically, when the judgment unit 122b judges that the return frequency is larger than the predetermined reference value and the search unit 122c (i) has not found the corresponding and (ii) judges that the protocol number indicating the protocol used by the corresponding PC is contained in the protocol changeover list 143 as a target protocol number, the message generation unit 120 calculates the effect of power saving by using the following equation.

Amount of power saved (watt)=Amount of power required each time MFP switches from power-saving mode to normal mode×the number of times MFP is activated per predetermined time period Next, the message generation unit 120 generates a message indicating that, if the protocol used by the corresponding PC is changed to the protocol indicated by the alternative protocol number corresponding to the target protocol number, the calculated amount of power (watt) can be saved as the effect of power saving. Based on the generated message, the message generation unit 120 generates a data portion to be included in a packet to be transmitted, and writes the generated data portion, which is transmitted to the administrator's PC 31, into the transmission buffer unit 104d of the EMAC unit 104.

One example of the protocol changeover screen is illustrated in FIG. 21. As illustrated in FIG. 21, the screen 302 shows a message indicating that, if the protocol indicated by the target protocol number is changed to the protocol indicated by the alternative protocol number, the amount of power displayed on the screen 302 can be saved as the effect of power saving.

Although it has been described above that the calculation unit 122a tallies, for each PC, a return frequency indicating the number of times the MFP 1 (10) returned to the normal mode from the power-saving mode based on one or more pieces of communication history information that are contained in the communication history list 141 and that did not cause a job execution, the present invention is not limited in this way. For example, the calculation unit 122*a* may tally, for each PC, a return frequency indicating the number of times the MFP 1 (10) returned to the normal mode from the power-saving mode per predetermined time period. The predetermined time period is, for example, one day, one week, two weeks, one month, etc.

Although it has been described above that the data portion addressed to the administrator's PC 31 is written into the transmission buffer unit 104*d*, the present invention is not limited in this way. Alternatively, the data portion may be addressed to a PC of a general user for which the return frequency has been judged to be larger than the predetermined reference value.

Alternatively, the above message may be transmitted by e-mail to a PC of a general user for which the return frequency has been judged to be larger than the predetermined reference value, to the administrator's PC 31, or to both of this PC of the general user and the administrator's PC 31.

Alternatively, a device driver that uses a protocol indicated by the alternative protocol number may be transmitted to the corresponding PC so as to mandatorily cause the corresponding PC to update its device driver.

(Operations of Analysis Unit 122 Relating to Processing for Requesting Administrator's PC to Change Protocol)

Figure 23:
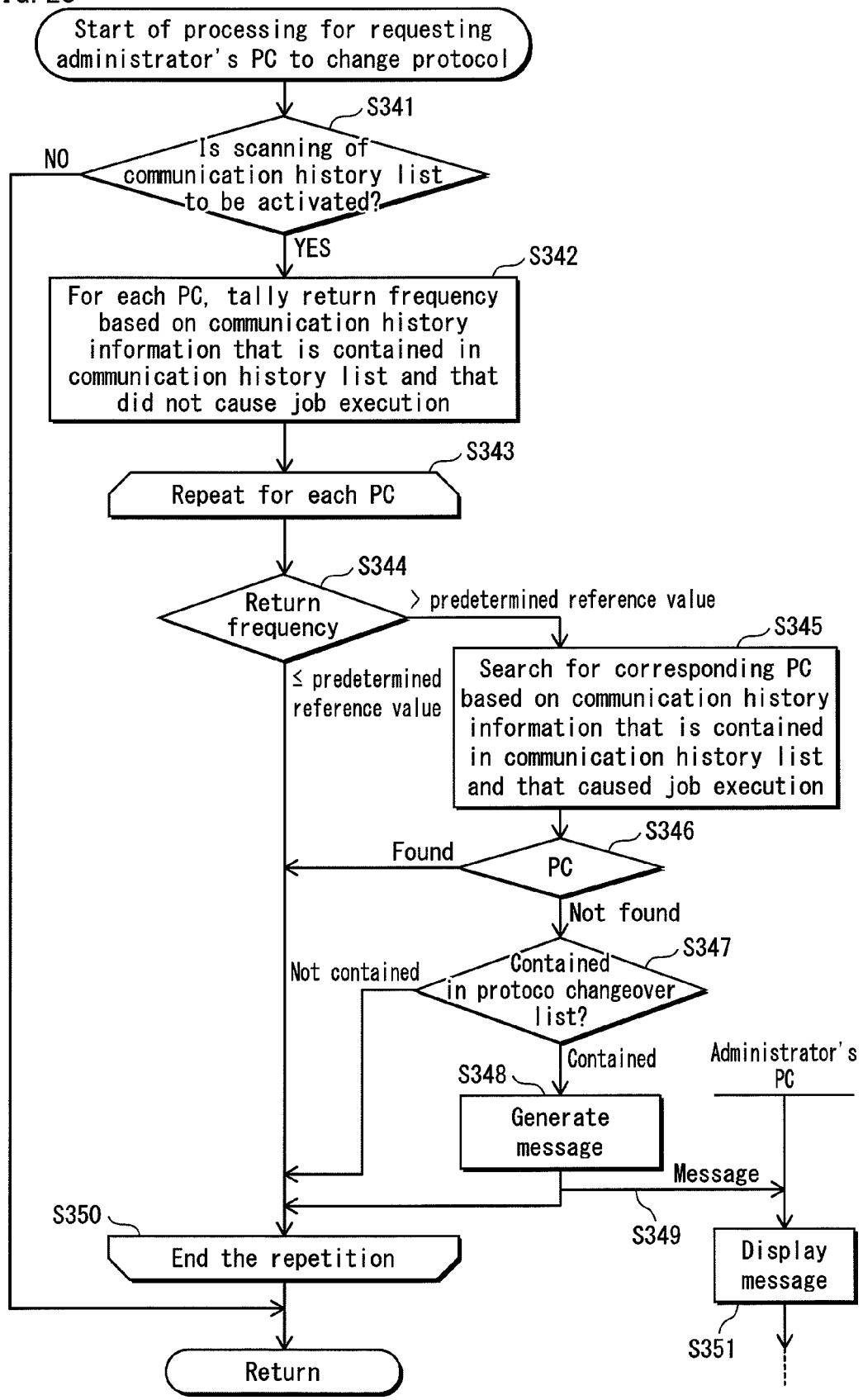
FIG. 23 is a sequence diagram of operations performed by an analysis unit 122 pertaining to Embodiment 6 relating to processing for requesting the administrator's PC to change a protocol.

The following describes the operations of the analysis unit 122 relating to processing for requesting the administrator's PC to change a protocol with reference to the sequence diagram of FIG. 23.

Based on the scan activation flag 148 stored in the first memory unit 107, the analysis unit 122 judges whether or not to activate scanning of the communication history list 141 (step S341).

When judging that the scanning of the communication history list 141 is not to be activated (the "NO" branch of step S341), the analysis unit 122 does not perform the processing for requesting the administrator's PC 31 to change a protocol.

When the analysis unit 122 judges that the scanning of the communication history list 141 is to be activated (the "YES" branch of step S341), the calculation unit 122*a* tallies, for each PC, a return frequency indicating the number of times the MFP 1 (10) switched from the power-saving mode to the normal mode, based on one or more pieces of communication history information that are contained in the communication history list 141 and that did not cause a job execution—i.e., one or more pieces of communication history information whose job execution record indicates "Not executed" (step 342).

Next, the analysis unit 122 repeats the steps S344, S345, S346, S347, S348, S349 and S351 for each PC (steps S343 through S350).

The judgment unit 122*b* judges whether or not the return frequency is larger than the predetermined reference value (step S344). When the judgment unit 122*b* judges that the return frequency is smaller than or equal to the predetermined reference value (the "≤predetermined reference value" branch of step S344), the analysis unit 122 does not perform any processing, and ends the processing for requesting a protocol changeover with respect to the corresponding PC. When the judgment unit 122*b* judges that the return frequency is larger than the predetermined reference value (the ">predetermined reference value" branch of step S344), the search unit 122*c* searches for the corresponding PC from among PCs that issued a request causing a job execution, based on one or more pieces of communication history information that are contained in the communication history list 141 and that did not cause a job execution—i.e., one or more pieces of communication history information whose job execution record indicates "Executed" (step S345). When the corresponding PC is found (the "Found" branch of step S346), the analysis unit 122 does not perform any processing and ends the processing for requesting a protocol changeover with respect to the corresponding PC. When the corresponding PC is not found (the "Not found" branch of step S346), the search unit 122*c* further judges whether or not the protocol number indicating the protocol used by the corresponding PC is contained in the protocol changeover list 143 as a target protocol number (step S347). When the search unit 122*c* judges that the protocol number indicating the protocol used by the corresponding PC is not contained in the protocol changeover list 143 as a target protocol number (the "Not contained" branch of step S347), the analysis unit 122 does not perform any processing and ends the processing for requesting a protocol changeover with respect to that protocol. When the search unit 122*c* judges that the protocol number indicating the protocol used by the corresponding PC is contained in the protocol changeover list 143 as a target protocol number (the "Contained" branch of step S347), the message generation unit 120 calculates the effect of power saving, and generates a message indicating that, if the protocol used by the corresponding PC is changed to the protocol indicated by the alternative protocol number corresponding to the target protocol number, the calculated amount of power (watt) can be saved as the effect of power saving. Then, based on the generated message, the message generation unit 120 generates a data portion to be included in a packet to be transmitted, and writes the generated data portion, which is addressed to the administrator's PC, into the transmission buffer unit 104*d* of the EMAC unit 104 (step S348).

The transmission/reception unit 119 transmits the data portion to the administrator's PC via the LAN 40 (step S349). The administrator's PC receives the data portion, i.e., the message indicating the effect of power saving (step S349), and displays the received message on a screen (step S351).

As described above, when the number of times an image forming device switched from the power-saving mode to the normal mode without a job execution satisfies a predetermined criterion, it means that the image forming device wastefully consumed power in the past each time it returned to the normal mode from the power-saving mode. In a case where a request from an information terminal device does not cause a job execution, if the information terminal device changes its protocol, then the possibility of the image forming device returning to the normal mode from the power-saving mode decreases. In this case, a message indicating an alternative protocol and the effect of power saving achieved by the protocol changeover is generated and transmitted. That is, the message transmitted to the administrator of information terminal devices is more persuasive. If the administrator causes an information terminal device of a general user to change its protocol, the possibility of the image forming device returning to the normal mode from the power-saving mode decreases. This can prevent wasteful consumption of power.

7. Embodiment 7

The following describes a network system 5*f* (not illustrated) as yet another embodiment of the present invention. The structure of the network system 5*f* is similar to that of the network system 5 pertaining to Embodiment 1. The main difference between the network system 5*f* and the network system 5 pertaining to Embodiment 1 is processing for extracting changeover candidates. In the present embodiment, the processing of the network system 5 for requesting a general PC to change its protocol, which has been described in Embodiment 1, is replaced with the following processing of the network system 5f for extracting changeover candidates. The following description will be given with a focus on the above difference.

(Changeover Candidate List 147)

The first memory unit 107 further stores therein a changeover candidate list 147.

The changeover candidate list 147 includes an area for storing one or more pieces of communication history information. Here, the one or more pieces of communication history information have the same data structure as the one or more pieces of communication history information contained in the communication history list 141, and therefore are omitted from the following description.

The changeover candidate list 147 is generated by the analysis unit 122 (described later). The changeover candidate list 147 contains, out of the pieces of communication history information contained in the communication history list 141, one or more pieces of communication history information whose protocol number indicates a protocol that can be changed.

(Analysis Unit 122)

With reference to the communication history list 141, the analysis unit 122 analyzes whether or not the protocol used by each PC can be changed. When the protocol used by each PC can be changed, the analysis unit 122 generates a message for changing the protocol used by each PC.

The following provides a detailed description of the analysis unit 122.

The analysis unit 122 repeatedly performs the following processing for each piece of communication history information contained in the communication history list 141.

The analysis unit 122 reads one piece of communication history information from the communication history list 141, extracts the protocol number from the read piece of communication history information, and judges whether or not the protocol indicated by the extracted protocol number can be changed. The judgment as to whether or not the protocol indicated by the extracted protocol number can be changed is made as follows. The analysis unit 122 prestores therein a changeability list. The changeability list contains protocol numbers of protocols that can be changed. The analysis unit 122 judges whether or not the extracted protocol number is contained in the changeability list. When contained, the analysis unit 122 judges that the protocol indicated by the extracted protocol number can be changed. Upon judging that the protocol indicated by the extracted protocol number can be changed, the analysis unit 122 writes the read piece of communication history information into the changeover candidate list 147 stored in the first memory unit 107. When judging that the protocol indicated by the extracted protocol number cannot be changed, the analysis unit 122 does not write the read piece of communication history information into the changeover candidate list 147.

When the above processing has been repeatedly performed for each piece of communication history information contained in the communication history list 141, the analysis unit 122 rewrites the changeover candidate list 147 by merging, out of the pieces of communication history information contained in the changeover candidate list 147, two or more pieces of communication history information with the same transmission source and the same protocol number.

Thereafter, the message generation unit 120 generates a message indicating that "more power can be saved by changing the protocol of a PC in the network". The message generation unit 120 then generates a data portion to be included in a packet to be transmitted, the data portion including the generated changeover candidate list 147 and the generated message, and writes the generated data portion, which is addressed to the administrator's PC 31, into the transmission buffer unit 104d of the EMAC unit 104.

Alternatively, the above message may be transmitted by e-mail to the administrator's PC 31.

Alternatively, a device driver that uses a new protocol to which the current protocol of a PC should be changed may be transmitted to the PC so as to mandatorily cause the PC to update its device driver.

(Operations of Analysis Unit 122 to Extract Changeover Candidates)

Figure 24:
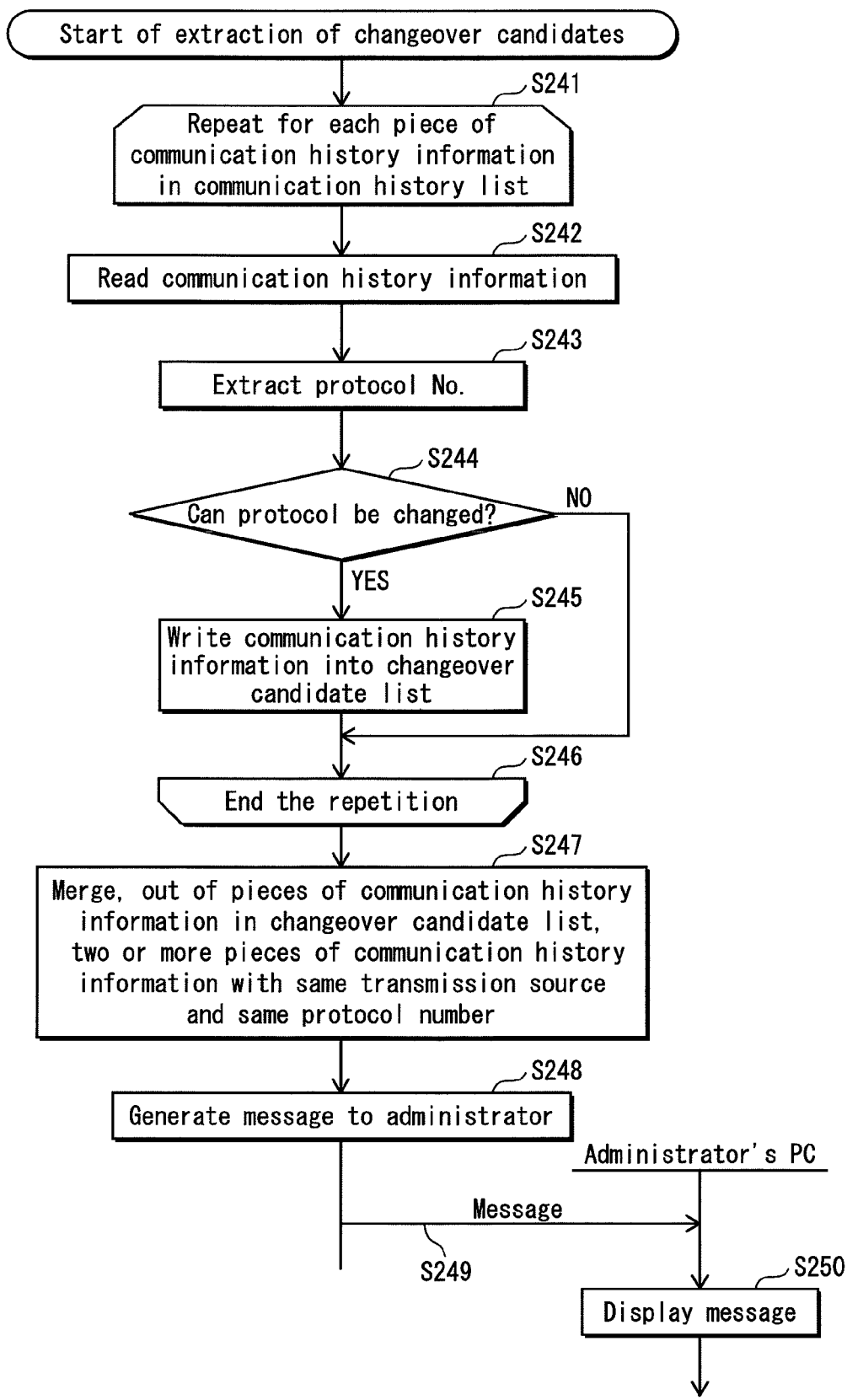
FIG. 24 is a sequence diagram of operations performed by an analysis unit 122 pertaining to Embodiment 7 to extract changeover candidates.

The following describes the operations of the analysis unit 122 to extract changeover candidates with reference to the sequence diagram of FIG. 24.

The analysis unit 122 repeatedly performs the processing of steps S242 through S245 for each piece of communication history information contained in the communication history list 141 (steps S241 through S246).

The analysis unit 122 reads one piece of communication history information from the communication history list 141 (step S242), extracts the protocol number from the read piece of communication history information (step S243), and judges whether or not the protocol indicated by the extracted protocol number can be changed (step S244). When judging that the protocol indicated by the extracted protocol number can be changed (the "YES" branch of step S244), the analysis unit 122 writes the read piece of communication history information into the changeover candidate list 147 stored in the first memory unit 107 (step S245). When judging that the protocol indicated by the extracted protocol number cannot be changed (the "NO" branch of step S244), the analysis unit 122 does not write the read piece of communication history information into the changeover candidate list 147.

When the above processing (steps S241 through S246) has been repeatedly performed for each piece of communication history information contained in the communication history list 141, the analysis unit 122 rewrites the changeover candidate list 147 by merging, out of the pieces of communication history information contained in the changeover candidate list 147, two or more pieces of communication history information with the same transmission source and the same protocol number (step S247).

Thereafter, the message generation unit 120 generates a message indicating that "more power can be saved by changing the protocol of a PC in the network". The message generation unit 120 then generates a data portion to be included in a packet to be transmitted, the data portion including the generated changeover candidate list 147 and the generated message, and writes the generated data portion, which is addressed to the administrator's PC 31, into the transmission buffer unit 104d of the EMAC unit 104 (step S248).

The transmission/reception unit 119 transmits the data portion that has been written into the transmission buffer unit 104d of the EMAC unit 104 and that is addressed to the administrator's PC 31 (i.e., the generated changeover candidate list 147 and the message indicating that "more power can be saved by changing the protocol of a PC in the network") to the administrator's PC 31 via LAN 40 (step S249). Upon receiving the message (step S249), the administrator's PC 31 displays the received message (step S250).

As described above, a message for changing a protocol is transmitted. If the administrator causes an information terminal device of a general user to change its protocol, then the possibility of the image forming device returning to the normal mode from the power-saving mode decreases. This can prevent wasteful consumption of power.

8. Embodiment 8

The following describes a network system 5g (not illustrated) as yet another embodiment of the present invention. The structure of the network system 5g is similar to that of the network system 5 pertaining to Embodiment 1. The main difference between the network system 5g and the network system 5 pertaining to Embodiment 1 is processing for transmitting alternative driver information. In the present embodiment, the processing of the network system 5 for requesting a general PC to change its protocol, which has been described in Embodiment 1, is replaced with the following processing of the network system 5g for transmitting the alternative driver information. The following description will be given with a focus on the above difference.

The first memory unit 107 further stores therein an alternative protocol list 142, a multicast protocol list 144, a driver information list 145, and a driver information list 146.

The descriptions of the alternative protocol list 142 and the multicast protocol list 144 have been provided above.

(Driver Information List 145)

The driver information list 145 contains pieces of driver information on device drivers that are installed in the PC 1 (21), PC 2 (22) and PC 3 (23).

By way of example, as shown in FIG. 25, the driver information list 145 includes an area for storing one or more pieces of driver information. Each driver information is composed of a transmission source and a protocol number. Each transmission source indicates a corresponding PC. Each protocol number indicates a protocol used by a device driver installed in the corresponding PC.

As shown in FIG. 25, the driver information list 145 contains three pieces of driver information 145a, three pieces of driver information 145b, and six pieces of driver information 145c.

The three pieces of driver information 145a show protocol numbers of protocols used by three device drivers installed in the PC 1 (21). The three pieces of driver information 145b show protocol numbers of protocols used by three device drivers installed in the PC 2 (22). The six pieces of driver information 145c show protocol numbers of protocols used by six device drivers installed in the PC 3 (23).

(Driver Information List 146)

The driver information list 146 contains pieces of driver information that indicate, among the device drivers installed in the PC 1 (21), PC 2 (22) and PC 3 (23), device drivers that use multicast protocols.

By way of example, as shown in FIG. 26, the driver information list 146 includes an area for storing one or more pieces of driver information. Each driver information is composed of a transmission source and a protocol number. As the transmission source and protocol number included in the driver information list 146 are the same as those included in the driver information list 145, they are omitted from the following description.

As shown in FIG. 26, the driver information list 146 includes a pair of the transmission source 146a indicating "PC 2" and the protocol number 146b indicating "No. of protocol X". This means that a device driver using a protocol indicated by the "No. of protocol X" is installed in the PC 2 (22) and this protocol is a multicast protocol.

(Analysis Unit 122)

The analysis unit 122 analyzes whether or not the protocol number that is received from each PC and that indicates the protocol used by the PC is contained in the alternative protocol list 142 as a target protocol number. When contained, the analysis unit 122 generates a message including (i) terminal information indicating the PC, (ii) protocol information indicating the protocol used by the PC, and (iii) protocol information indicating the protocol that is indicated by the alternative protocol number corresponding to the target protocol number. The analysis unit 122 then performs control so that the generated message is transmitted to the administrator's PC 31.

The following provides a detailed description of the analysis unit 122.

The analysis unit 122 generates a request for pieces of device driver information, which is addressed to the PC 1 (21), PC 2 (22) and PC 3 (23). Based on the generated request, the analysis unit 122 generates a data portion to be included in a packet to be transmitted, and writes the generated data portion, which is addressed to the PC 1 (21), PC 2 (22) and PC 3 (23), into the transmission buffer unit 104d of the EMAC unit 104.

Next, the analysis unit 122 receives, from the reception control unit 123, pieces of device driver information of the PC 1 (21), pieces of device driver information of the PC 2 (22), and pieces of device driver information of the PC 3 (23). The analysis unit 122 additionally writes the following information into the driver information list 145: (i) protocol numbers included in the received pieces of device driver information of the PC 1 (21), together with a transmission source indicating the PC 1 (21), (ii) protocol numbers included in the received pieces of device driver information of the PC 2 (22), together with a transmission source indicating the PC 2 (22), and (iii) protocol numbers included in the received pieces of device driver information of the PC 3 (23), together with a transmission source indicating the PC 3 (23).

Thereafter, the analysis unit 122 extracts, from the driver information list 145, pieces of driver information including the same protocol numbers as the protocol numbers contained in the multicast protocol list 144. The analysis unit 122 then extracts, from the alternative protocol list 142, pieces of alternative protocol information including the target protocol numbers that are the same as the protocol numbers included in the extracted pieces of driver information.

The message generation unit 120 generates a message including the extracted pieces of driver information and the extracted pieces of alternative protocol information. Based on the generated message, the message generation unit 120 generates a data portion to be included in a packet to be transmitted, and writes the generated data portion, which is addressed to the administrator's PC, into the transmission buffer unit 104d of the EMAC unit 104.

One example of a screen showing the generated message is illustrated in FIG. 27. By way of example, a screen 305 illustrated in FIG. 27 shows (i) PCs that have a possibility of causing the MFP 1 (10) to switch from the power-saving mode to the normal mode without executing a job, (ii) protocols used by the PCs, and (iii) alternative protocols that can replace the protocols used by the PCs.

Alternatively, the generated message may be transmitted by e-mail to the administrator's PC.

Alternatively, a device driver that uses an appropriate protocol may be transmitted to the corresponding PC so as to mandatorily cause the corresponding PC to update its device driver.

(Operations of Analysis Unit 122 to Transmit Pieces of Alternative Driver Information)

Figure 28:
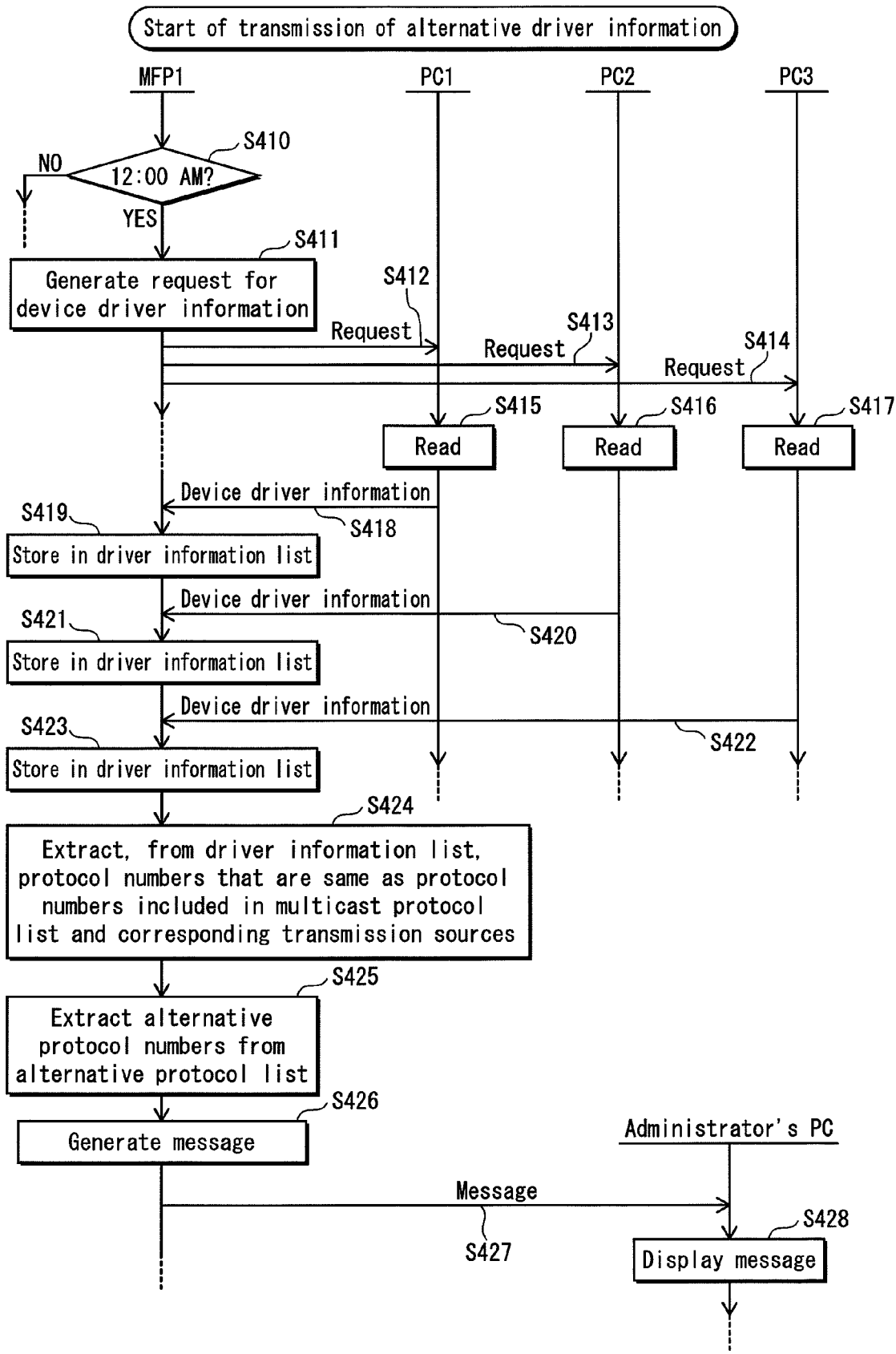
FIG. 28 is a sequence diagram of operations performed by an analysis unit 122 to transfer alternative driver information.

The following describes the operations of the analysis unit 122 to transmit pieces of alternative driver information with reference to the sequence diagram of FIG. 28.

Every day at 12:00 AM (the "YES" branch of step S410), the analysis unit 122 generates a request for pieces of device driver information, which is addressed to the PC 1 (21), PC 2 (22) and PC 3 (23) (step S411). Based on the generated request, the analysis unit 122 generates a data portion to be included in a packet to be transmitted, and writes the generated data portion, which is addressed to the PC 1 (21), PC 2 (22) and PC 3 (23), into the transmission buffer unit 104d of the EMAC unit 104 (steps S412, S413 and S414).

Each of the PC 1 (21), PC 2 (22) and PC 3 (23) receives the request for the pieces of device driver information (steps S412, S413 and S414), reads the pieces of device driver information (steps S415, S416 and S417), and transmits the read pieces of device driver information to the MFP 1 (10) (steps S418, S420 and S422).

The analysis unit 122 receives the pieces of device driver information from the PC 1 (21), PC 2 (22) and PC 3 (23) (steps S418, S420 and S422), and additionally writes, into the driver information list 145, the received pieces of device driver information together with transmission sources indicating the PCs (steps S419, S421 and S423).

Thereafter, the analysis unit 122 extracts, from the driver information list 145, (i) pieces of driver information including the same protocol numbers as the protocol numbers contained in the multicast protocol list 144, and (ii) corresponding transmission sources (step S424). The analysis unit 122 then extracts, from the alternative protocol list 142, pieces of alternative protocol information including the target protocol numbers that are the same as the protocol numbers included in the extracted pieces of driver information (step S425).

The message generation unit 120 generates a message including the extracted pieces of driver information and the extracted pieces of alternative protocol information. Based on the generated message, the message generation unit 120 generates a data portion to be included in a packet to be transmitted, and writes the generated data portion, which is transmitted to the administrator's PC, into the transmission buffer unit 104d of the EMAC unit 104 (step S426).

The transmission/reception unit 119 transmits the data portion to the administrator's PC 31 via LAN 40 (step S427). The administrator's PC 31 receives the data portion, i.e., the message including the extracted pieces of driver information and the extracted pieces of alternative protocol information (step S427), and displays the received message on a screen (step S428).

It has been described above that the analysis unit 122 transmits pieces of alternative driver information every day at 12:00 AM. Alternatively, the analysis unit 122 may be controlled to perform such transmission a different time point. Alternatively, the analysis unit 122 may be controlled to perform such transmission at least twice a day, once a week, or once a month. As described above, when an information terminal device of a general user uses a multicast protocol, information on an alternative protocol that can be used in place of the multicast protocol is transmitted to the administrator of the information terminal device. If the administrator causes the information terminal device of the general user to change its protocol, the possibility of the image forming device returning to the normal mode from the power-saving mode decreases. This can prevent wasteful consumption of power.

9. Embodiment 9

The following describes a network system 5h (not illustrated) as yet another embodiment of the present invention. The structure of the network system 5h is similar to that of the network system 5 pertaining to Embodiment 1. The main difference between the network system 5h and the network system 5 pertaining to Embodiment 1 is processing for deleting a protocol number from the automatic response protocol list. In the present embodiment, the processing of the network system 5 for requesting a general PC to change its protocol, which has been described in Embodiment 1, is replaced with the following processing of the network system 5h for deleting a protocol number from the automatic response protocol list. The following description will be given with a focus on the above difference.

(Automatic Response Unit 102)

The automatic response unit 102 includes a deletion unit. When the received packet contains an instruction for deleting a protocol number from the automatic response protocol list 132, the deletion unit extracts, from the received packet, the protocol number to be deleted, and deletes the same protocol number as the extracted protocol number from the automatic response protocol list 132. More specifically, the deletion unit deletes the protocol number from the automatic response protocol list 132 under control of a deletion processing unit 122d of the analysis unit 122 (described later).

(Analysis Unit 122)

The analysis unit 122 judges whether or not to delete one protocol number from the automatic response protocol list 132. When judging that one protocol number should be deleted from the automatic response protocol list 132, the analysis unit 122 controls the automatic response unit 102 to delete this protocol number from the automatic response protocol list 132. More specifically, the analysis unit 122 analyzes, with reference to the communication history list 141, whether or not the request from the PC has a possibility of causing the MFP 1 (10) to switch from the power-saving mode to the normal mode without executing a job. When judging that the request from the PC has the possibility, the analysis unit 122 controls the automatic response unit 102 to delete a protocol number indicating the protocol associated with the PC from the automatic response protocol list 132. The analysis unit 122 includes a search unit 122c and the deletion processing unit 122d in addition to the calculation unit 122a and judgment unit 122b.

Based on the scan activation flag 148 stored in the first memory unit 107, the analysis unit 122 judges whether or not to activate scanning of the communication history list 141.

When judging that the scanning of the communication history list 141 is not to be activated, the analysis unit 122 does not perform the following processing for deleting a protocol number from the automatic response protocol list 132.

When the analysis unit 122 judges that the scanning of the communication history list 141 is to be activated, the calculation unit 122a tallies, for each protocol, a return frequency indicating the number of times the MFP 1 (10) returned to the normal mode from the power-saving mode, based on one or more pieces of communication history information that are contained in the communication history list 141 and that did not cause a job execution—i.e., one or more pieces of communication history information whose job execution record indicates "Not executed". That is to say, the calculation unit 122a calculates the number of times the MFP 1 (10) switched from the power-saving mode to the normal mode without executing a job.

Next, the judgment unit 122b judges, for each protocol, whether or not the return frequency satisfies a predetermined criterion. More specifically, the judgment unit 122b judges, for each protocol, whether or not the return frequency is larger than a predetermined reference value. When the judgment unit 122b judges that the return frequency is smaller than or equal to the predetermined reference value, the analysis unit 122 does not perform any processing, and ends the processing for deleting a protocol number from the automatic response protocol list 132 for the corresponding protocol.

The search unit 122c searches for the corresponding protocol from among protocols that caused a job execution, based on one or more pieces of communication history information that are contained in the communication history list 141 and that caused a job execution—i.e., one or more pieces of communication history information whose job execution record indicates "Executed". When the search unit 122c has found the corresponding protocol, the analysis unit 122 does not perform any processing, and ends the processing for deleting a protocol number from the automatic response protocol list 132 for the corresponding protocol.

When (i) the calculated return frequency satisfies the predetermined criterion and (ii) the protocol number of the corresponding protocol for which the predetermined criterion has been satisfied is not indicated by any of the pieces of communication history information that are contained in the communication history list 141 and that did not cause a job execution, the deletion processing unit 122d controls the automatic response unit 102 to delete the corresponding protocol number from the automatic response protocol list 132.

More specifically, when (i) the return frequency is judged to be larger than the predetermined reference value and (ii) the corresponding protocol is not indicated by any of the pieces of communication history information whose job execution record indicates "Executed", the deletion processing unit 122d generates an instruction to "delete a protocol number of the corresponding protocol from the automatic response protocol list 132". Based on the generated instruction, the deletion processing unit 122d generates a data portion to be included in a packet to be transmitted, and writes the generated data portion, which is addressed to the automatic response unit 102, into the transmission buffer unit 104d of the EMAC unit 104. Then, the message generation unit 120 generates a message indicating deletion of the protocol number of the corresponding protocol from the automatic response protocol list 132. Based on the generated message, the message generation unit 120 generates a data portion to be included in a packet to be transmitted, and writes the generated data portion, which is transmitted to the administrator's PC, into the transmission buffer unit 104d of the EMAC unit 104. This concludes the processing for deleting a protocol number from the automatic response protocol list 132 for the corresponding protocol.

Figure 29:
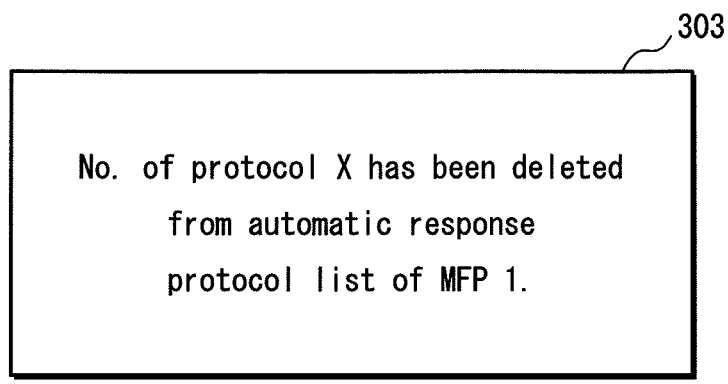
FIG. 29 shows one example of a screen 303 pertaining to Embodiment 9.

FIG. 29 shows one example of a screen showing a message indicating the deletion of the protocol number of the corresponding protocol. As shown in FIG. 29, a screen 303 shows a message indicating that one protocol number has been deleted from the automatic response protocol list.

Although it has been described above that the calculation unit 122a tallies, for each protocol, a return frequency indicating the number of times the MFP 1 (10) returned to the normal mode from the power-saving mode based on one or more pieces of communication history information that are contained in the communication history list 141 and that did not cause a job execution, the present invention is not limited in this way. For example, the calculation unit 122a may tally, for each protocol, a return frequency indicating the number of times the MFP 1 (10) returned to the normal mode from the power-saving mode per predetermined time period. The predetermined time period is, for example, one day, one week, two weeks, one month, etc.

Although it has been described above that the data portion generated based on the message, which is addressed to the administrator's PC 31, is written into the transmission buffer unit 104d, the present invention is not limited in this way. Alternatively, the data portion may be transmitted to a PC of a general user for which the return frequency has been judged to be larger than the predetermined reference value.

Alternatively, the above message may be transmitted by e-mail to a PC of a general user for which the return frequency has been judged to be larger than the predetermined reference value, to the administrator's PC 31, or to both of this PC of the general user and the administrator's PC 31.

Alternatively, a device driver that uses an appropriate protocol may be transmitted to the corresponding PC so as to mandatorily cause the corresponding PC to update its device driver.

(Operations for Deleting Protocol Number from Automatic Response Protocol List)

Figure 30:
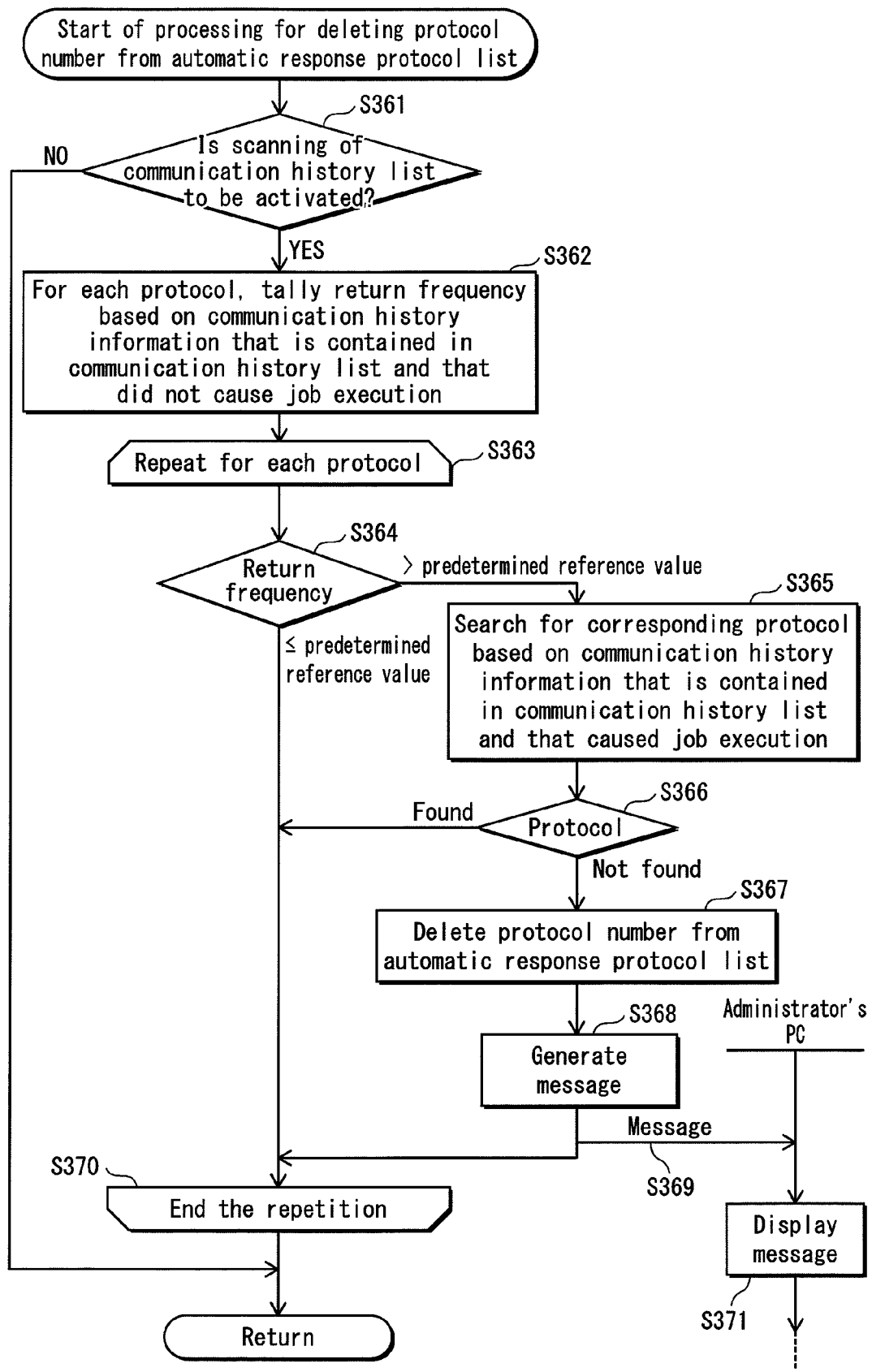
FIG. 30 is a sequence diagram of operations performed by a deletion processing unit 122d to delete data from an automatic response protocol list.

The following describes the operations of the analysis unit 122 for deleting a protocol number from the automatic response protocol list with reference to the sequence diagram of FIG. 30.

Based on the scan activation flag 148 stored in the first memory unit 107, the analysis unit 122 judges whether or not to activate scanning of the communication history list 141 (step S361).

When judging that the scanning of the communication history list 141 is not to be activated (the NO branch of step S361), the analysis unit 122 does not delete a protocol number from the automatic response protocol list.

When the analysis unit 122 judges that the scanning of the communication history list 141 is to be activated (the "YES" branch of step S361), the calculation unit 122a tallies, for each protocol, a return frequency indicating the number of times the MFP 1 (10) switched from the power-saving mode to the normal mode, based on one or more pieces of communication history information that are contained in the communication history list 141 and that did not cause a job execution—i.e., one or more pieces of communication history information whose job execution record indicates "Not executed" (step 362).

Next, the analysis unit 122 repeats the following steps S364, S365, S366, S367, S368, S369 and S371 for each protocol (steps S363 through S370).

The judgment unit 122b judges whether or not the return frequency is larger than the predetermined reference value (step S364). When the judgment unit 122b judges that the return frequency is smaller than or equal to the predetermined reference value (the "≤predetermined reference value" branch of step S364), the analysis unit 122 does not perform any processing, and ends the processing for deleting a protocol number from the automatic response protocol list 132 for the corresponding protocol.

When the judgment unit 122b judges that the return frequency is larger than the predetermined reference value (the ">predetermined reference value" branch of step S364), the search unit 122c searches for the corresponding protocol from among protocols that caused a job execution, based on one or more pieces of communication history information that are contained in the communication history list 141 and that caused a job execution—i.e., one or more pieces of communication history information whose job execution record indicates "Executed" (step S365). When the search unit 122c has found the corresponding protocol (the "Found" branch of step S366), the analysis unit 122 does not perform any processing, and ends the processing for deleting a protocol number from the automatic response protocol list 132 for the corresponding protocol.

When the corresponding protocol has not been found (the "Not found" branch of step S366), the deletion processing unit 122d generates an instruction for deleting a protocol number of the corresponding protocol from the automatic response protocol list 132. Based on the generated instruction, the deletion processing unit 122d generates a data portion to be included in a packet to be transmitted, and writes the generated data portion, which is to addressed to the automatic response unit 102, into the transmission buffer unit 104d of the EMAC unit 104. The deletion unit of the automatic response unit 102 deletes this protocol number from the automatic response protocol list 132 (step S367). The message generation unit 120 generates a message indicating deletion of the protocol number of the corresponding protocol from the automatic response protocol list 132. Based on the generated message, the message generation unit 120 generates a data portion to be included in a packet to be transmitted, and writes the generated data portion, which is addressed to the administrator's PC, into the transmission buffer unit 104d of the EMAC unit 104 (step S368).

The transmission/reception unit 119 transmits the data portion to the administrator's PC 31 via LAN 40 (step S369). The administrator's PC 31 receives the data portion, i.e., the message indicating the deletion of the protocol number from the automatic response protocol list 132 (step S369), and displays the received message on a screen (step S371).

As described above, when the number of times an image forming device switched from the power-saving mode to the normal mode without executing a job satisfies a predetermined criterion, it means that the image forming device wastefully consumed power in the past each time it returned to the normal mode from the power-saving mode. In a case where a job is not executed as a result of using a protocol on which a request from the information terminal device is based, if the protocol number of this protocol is deleted from the automatic response protocol list, then the possibility of the image forming device returning to the normal mode from the power-saving mode decreases. This can prevent wasteful consumption of power.

10. Embodiment 10

The following describes a network system 5i (not illustrated) as yet another embodiment of the present invention. The structure of the network system 5i is similar to that of the network system 5 pertaining to Embodiment 1. The main difference between the network system 5i and the network system 5 pertaining to Embodiment 1 is processing for deleting a protocol number from the automatic response protocol list. In the present embodiment, the processing of the network system 5 for requesting the general PC to change its protocol, which has been described in Embodiment 1, is replaced with the following processing of the network system 5i for deleting a protocol number from the automatic response protocol list. The following description will be given with a focus on the above difference.

(Server Flag 134)

The third memory unit 103 further stores therein a server flag 134.

The server flag 134 indicates whether or not the MFP 1 (10) is a server. When the server flag 134 indicates "1", it means that the MFP 1 (10) is a server. When the server flag 134 indicates "0", it means that the MFP 1 (10) is not a server.

In the present description, the MFP 1 (10) being a server means that the MFP 1 (10) has functions of a server, e.g., a web server (HTTP server), mail server, file server, or the like. Furthermore, the MFP 1 (10) not being a server means that the MFP 1 (10) does not have functions of a server.

(Outline of Automatic Response Unit 102)

The automatic response unit 102 includes a deletion unit. The automatic response unit 102 judges (i) whether or not the protocol on which the request received from the PC is based matches one of the protocols indicated by the protocol numbers contained in the automatic response protocol list 132, (ii) whether or not the request is based on a protocol associated with device administration, and (iii) whether or not the MFP 1 (10) is a server. When the automatic response unit 102 judges (i) the protocol on which the request received from the PC is based matches one of the protocols indicated by the protocol numbers contained in the automatic response protocol list 132, (ii) the request is based on the protocol associated with device administration, and (iii) the MFP 1 (10) is not a server, the deletion unit deletes the protocol number of the stated one of the protocols from the automatic response protocol list 132.

(Details of Automatic Response Unit 102)

In the case of the power-saving mode, the automatic response unit 102 searches the automatic response protocol list 132 to judge whether or not the automatic response protocol list 132 contains the same protocol number as the protocol number extracted from the received packet. When judging that the automatic response protocol list 132 contains the same protocol number, the automatic response unit 102 may operate as follows.

The automatic response unit 102 prestores therein an IP address assigned to the administrator's PC. The automatic response unit 102 also prestores therein a protocol number of a protocol used for administration. The protocol used for administration is, for example, SNMP. As described earlier, in a TCP/IP network, SNMP is a protocol for monitoring and controlling communication devices connected to the network (e.g., routers, computers, and terminals) via the network.

The automatic response unit 102 judges whether or not the transmission source IP address extracted from the received packet is the IP address assigned to the administrator's PC. When judging that the transmission source IP address is the IP address assigned to the administrator's PC, the automatic response unit 102 further judges whether or not the protocol number extracted from the received packet indicates a protocol used for administration. When judging that the protocol number extracted from the received packet indicates a protocol used for administration, the automatic response unit 102 reads the server flag 134 from the third memory unit 103, and judges whether the read server flag 134 indicates "0", meaning that the MFP 1 (10) is not a server, or indicates "1", meaning that the MFP 1 (10) is a server. When the automatic response unit 102 judges that the read server flag 134 indicates "0", the deletion unit of the automatic response unit 102 deletes, from the automatic response protocol list 132, a piece of automatic response protocol information including the protocol number included in the received packet.

When the automatic response unit 102 judges that (i) the transmission source IP address extracted from the received packet is not the IP address assigned to the administrator's PC, (ii) the protocol number extracted from the received packet is not a protocol number of a protocol used for administration, or (iii) the MFP 1 (10) is a server, the automatic response unit 102 outputs a return trigger signal to the wakeup circuit 105, as described in Embodiment 1.

It is possible to transmit, to the administrator's PC, a message indicating that a piece of automatic response protocol information including the protocol number has been deleted from the automatic response protocol list 132. In this case, the message may be transmitted by e-mail.

(Operations of MFP 1 (10))

Figure 31:
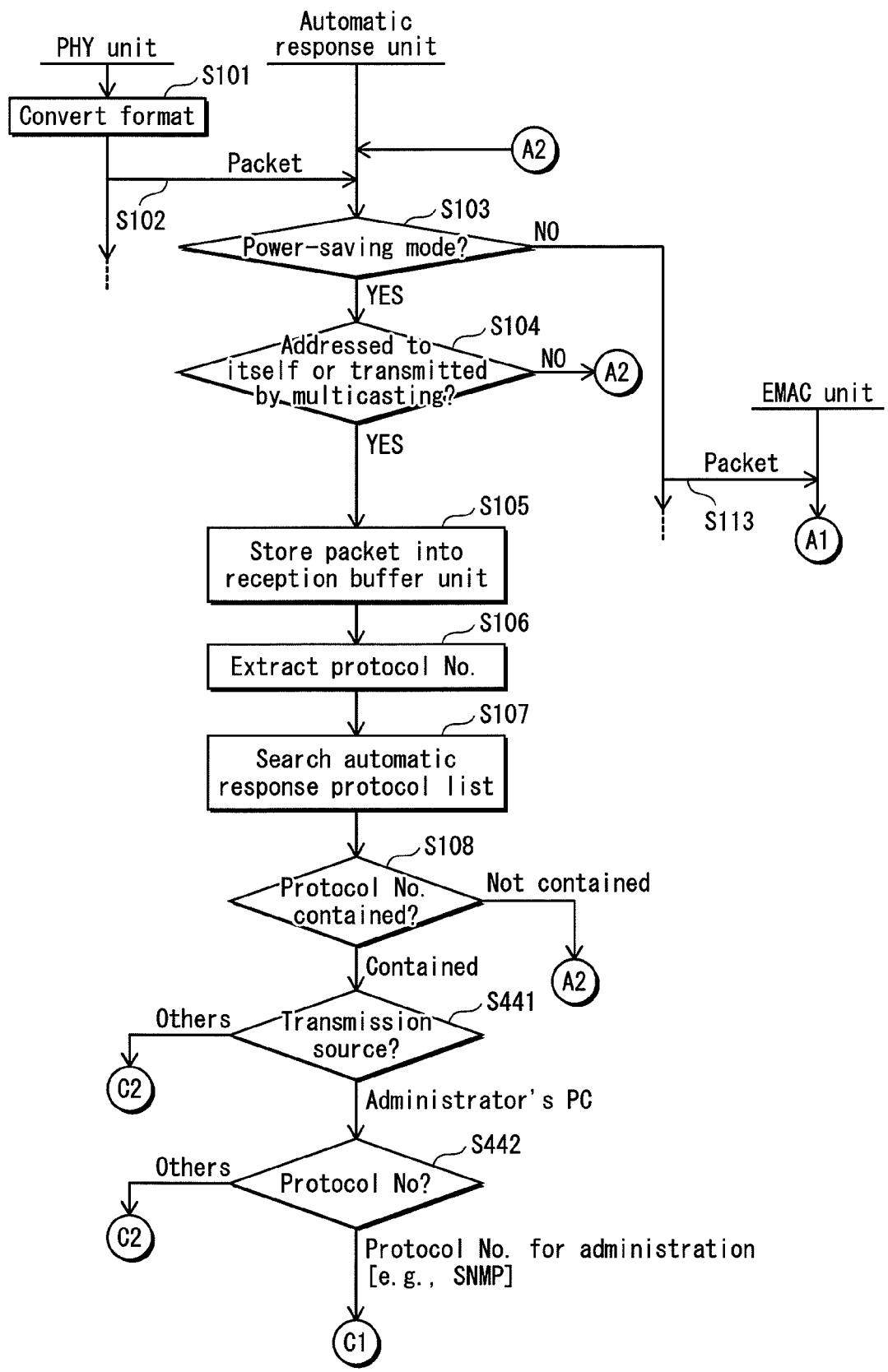
FIG. 31 is a sequence diagram of operations performed by an automatic response unit 102 pertaining to Embodiment 10 to delete data from an automatic response protocol list, continuing to FIG. 32.
Figure 32:
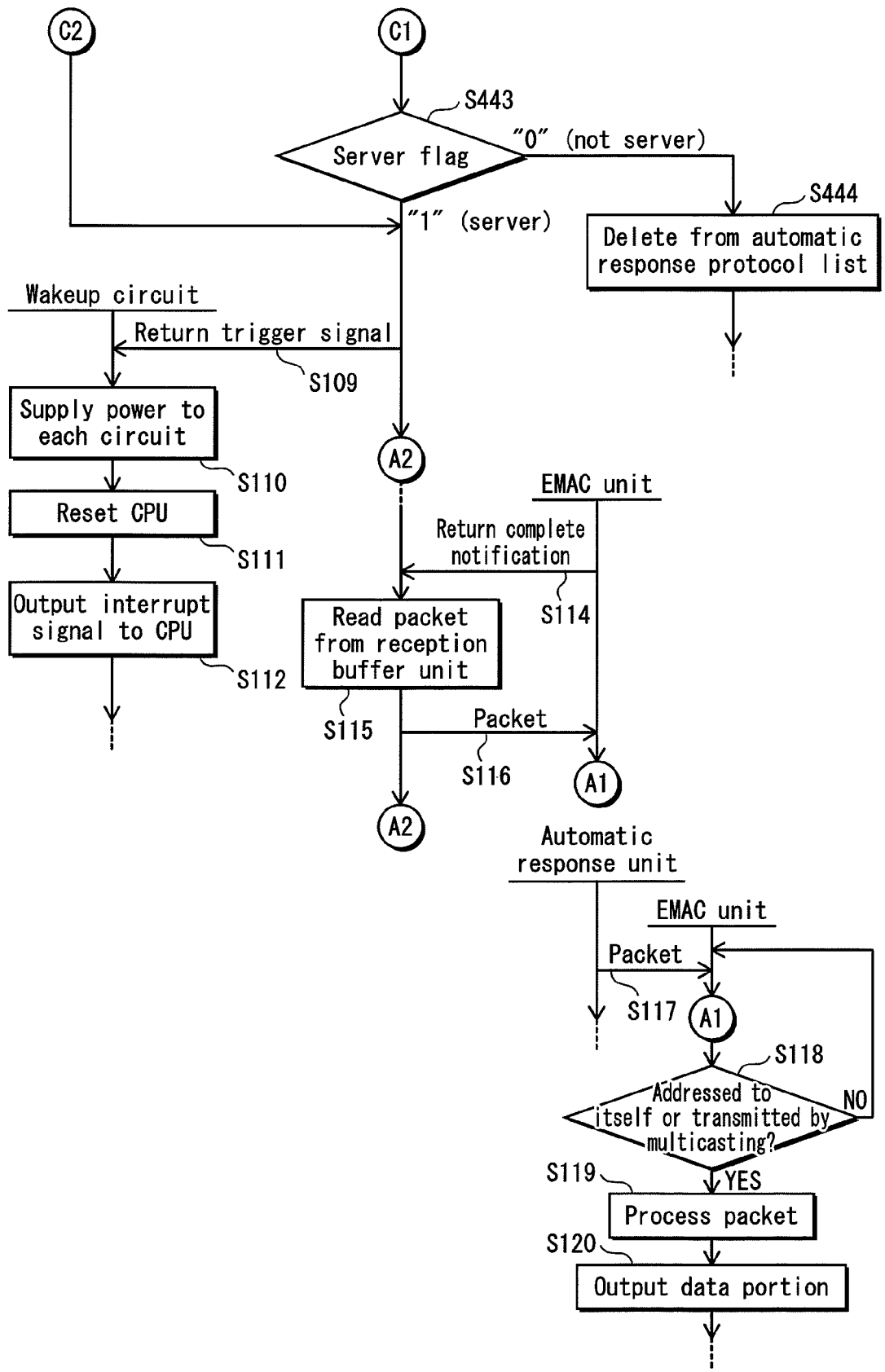
FIG. 32 is a sequence diagram of operations performed by the automatic response unit 102 to delete data from the automatic response protocol list, continuing from FIG. 31.

A description is now given of the operations of the MFP 1 (10), particularly the operations of the PHY unit 101, automatic response unit 102, EMAC unit 104 and wakeup circuit 105, with reference to the sequence diagrams of FIGS. 31 and 32.

The PHY unit 101 receives an electric signal from LAN 40, generates digital data as a packet by converting the format of the received electric signal (step S101), and outputs the packet to the automatic response unit 102 (step S102).

The automatic response unit 102 judges whether or not the mode flag 133 indicates the normal mode or the power-saving mode (step S103). When judging that the mode flag 133 indicates the normal mode (the "NO" branch of step S103), the automatic response unit 102 outputs the received packet to the EMAC unit 104 (step S113).

When judging that the mode flag 133 indicates the power-saving mode (the "YES" branch of step S103), the automatic response unit 102, for example, judges whether or not the received packet is addressed to itself or is transmitted by multicasting (step S104). When the received packet is neither addressed to the automatic response unit 102 nor transmitted by multicasting (the "NO" branch of step S104), the automatic response unit 102 discards this packet and waits for reception of the next packet.

When the automatic response unit 102 judges that the received packet is addressed to itself or is transmitted by multicasting (the "YES" branch of step S104), the automatic response unit 102 writes the received packet into the reception buffer unit 131 (step S105), extracts a protocol number from the received packet (step S106), searches the automatic response protocol list 132 (step S107), and judges whether or not the automatic response protocol list 132 contains the extracted protocol number (step S108).

When judging that the automatic response protocol list 132 does not contain the extracted protocol number (the "Not contained" branch of step S108), the automatic response unit 102 waits for reception of the next packet.

When judging that the automatic response protocol list 132 contains the extracted protocol number (the "Contained" branch of step S108), the automatic response unit 102 further judges whether or not the transmission source IP address extracted from the received packet is the IP address assigned to the administrator's PC (step S441). When judging that the transmission source IP address is the IP address assigned to the administrator's PC (the "Administrator's PC" branch of step S441), the automatic response unit 102 further judges whether or not the protocol number extracted from the received packet indicates a protocol used for administration (step S442). When judging that the protocol number extracted from the received packet indicates a protocol for administration (the "Protocol No. for administration . . . " branch of step S442), the automatic response unit 102 reads the server flag 134 from the third memory unit 103 and judges whether or not the read server flag 134 indicates "0" or "1" (step S443). When the automatic response unit 102 judges that the read server flag 134 indicates "0" (the "0 (not server)" branch of step S443), the deletion unit of the automatic response unit 102 deletes, from the automatic response protocol list 132, a piece of automatic response protocol information including the protocol number included in the received packet (step S444).

When the automatic response unit 102 judges (i) the transmission source IP address extracted from the received packet is not the IP address assigned to the administrator's PC (the "Others" branch of step S441), (ii) the protocol number extracted from the received packet does not indicate a protocol for administration (the "Others" branch of step S442), or (iii) the read server flag 134 indicates "1" (the "1 (server)" branch of step S443), the automatic response unit 102 outputs a return trigger signal to the wakeup circuit 105 (step S109).

Upon receiving the return trigger signal (step S109), the wakeup circuit 105 controls the second power circuit 126 to supply power to the following constituent elements for which power supply had been stopped (step S110): the EMAC unit 104, CPU 106, constituent elements of the first bridge 108 other than the control unit 108a, second memory unit 109, memory controller 110, print engine 111, second bridge 112, HDD 113, operation panel 114, scanner 115, raster IF unit 116, image processing unit 117, and bus 118. Thereafter, the wakeup circuit 105 resets the CPU 106 (step S111) and outputs an interrupt signal that instructs a return to the normal mode to the CPU 106 (step S112).

When the automatic response unit 102 receives the return complete notification from the EMAC unit 104 (step S114), the automatic response unit 102 reads a packet from the reception buffer unit 131 (step S115) and outputs the read packet to the EMAC unit 104 (step S116).

The EMAC unit 104 receives the packet from the automatic response unit 102 (step S117), and judges whether or not the received packet is addressed to itself or is transmitted by multicasting (step S118). When the EMAC unit 104 judges that the received packet is neither addressed to itself nor transmitted by multicasting (the "NO" branch of step S118), the EMAC unit 104 discards this packet and waits for reception of the next packet.

When the EMAC unit 104 judges that the received packet is addressed to itself or is transmitted by multicasting (the "YES" branch of step S118), the EMAC unit 104 processes this packet (step S119) and outputs the data portion of this packet (step S120).

As set forth above, there is no need to transmit a request based on a protocol associated with device administration to a non-server image forming device (an image forming device that is not a server). Even when such a request is erroneously transmitted to the non-server image forming device, if the protocol number of such a protocol is deleted from the automatic response protocol list, then the non-server image forming device would not switch from the power-saving mode to the normal mode. This can prevent wasteful consumption of power.

11. Other Modification Examples

Although the present invention has been described based on the above embodiments, it goes without saying that the present invention is not limited to the above embodiments. The following cases are also included in the present invention.

(1) The following describes modification examples of the network system 5 pertaining to Embodiment 1, with a focus on differences from the network system 5.

In the network system 5, the first memory unit 107 of the MFP 1 (10) stores therein one communication history list 141. However, the present invention is not limited in this way.

The first memory unit 107 may store, in place of the communication history list 141, (i) a first return record list 151, which shows the record of the MFP 1 (10) returning from the power-saving mode to the normal mode without executing a job (exemplarily shown in FIG. 33), and (ii) a second return record list 152, which shows the record of the MFP 1 (10) returning from the power-saving mode to the normal mode with a job execution (exemplarily shown in FIG. 34).

Figure 35:
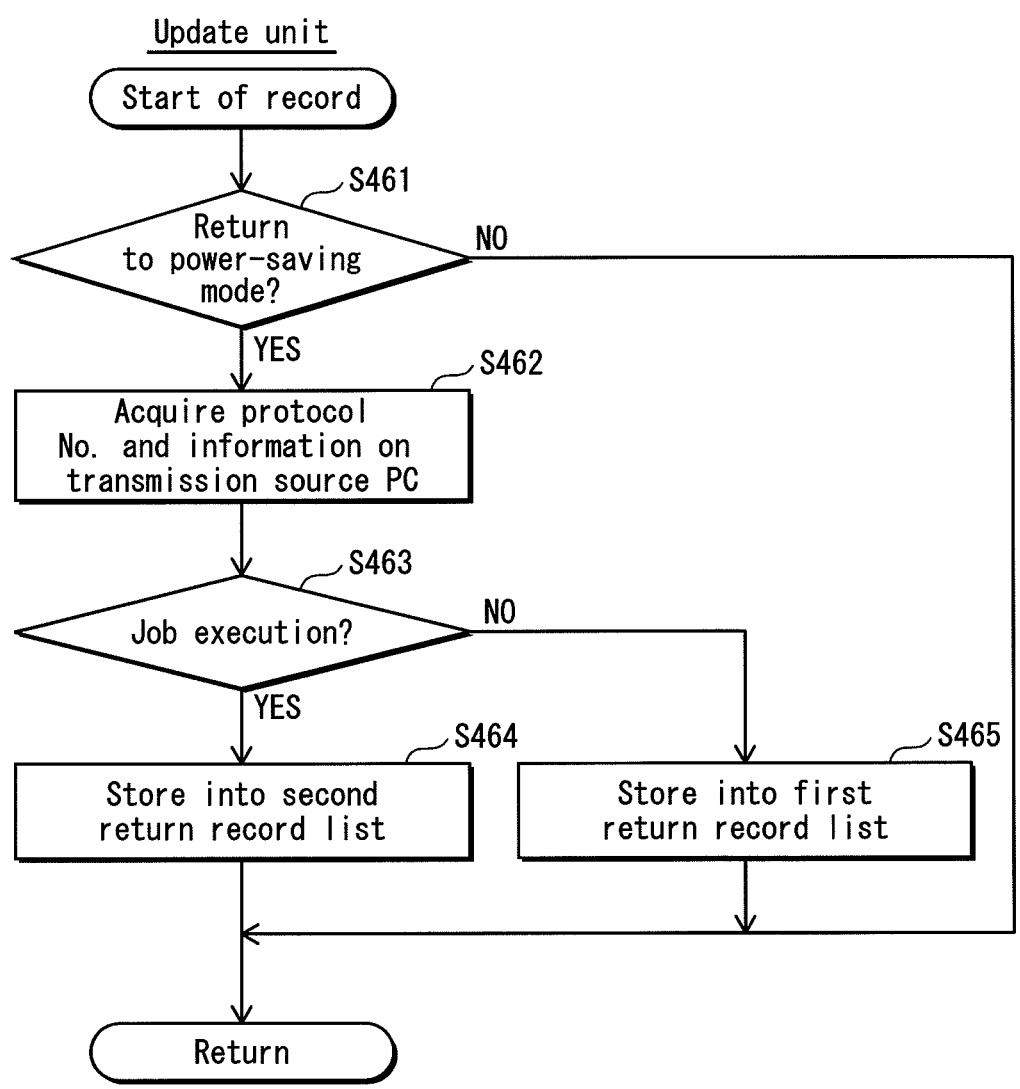
FIG. 35 is a sequence diagram of operations performed by an update unit 121 pertaining to modification example (1).

The following describes the operations of the update unit 121 with reference to the sequence diagram of FIG. 35.

The update unit 121 judges whether or not the MFP 1 (10) returned to the normal mode from the power-saving mode (step S461). When judging that the MFP 1 (10) did not return to the normal mode from the power-saving mode (the "NO" branch of step S461), the update unit 121 does not perform any other processing, and ends the present processing.

When judging that the MFP 1 (10) returned to the normal mode from the power-saving mode (the "YES" branch of step S461), the update unit 121 acquires the protocol number, information on the transmission source, etc. from the received packet during the normal mode (step S462). When the received packet causes a job execution (the "YES" branch of step S463), the update unit 121 generates record information composed of the protocol number, transmission source, job execution record, reception mode, and reception time, and writes the generated record information into the second return record list 152 (step S464). When the received packet does not cause a job execution (the "NO" branch of step S463), the update unit 121 generates record information composed of the protocol number, transmission source, job execution record, reception mode, and reception time, and writes the generated record information into the first return record list 151 (step S465).

The first and second return record lists 151 and 152 thus generated are used in the following cases.

(a) In step S282 of FIG. 13, the first return record list 151 may be used in place of "communication history information that is contained in communication history list and that did not cause job execution".

(b) In step S322 of FIG. 14, the first return record list 151 may be used in place of "communication history information that is contained in communication history list and that did not cause job execution". In step S325 of FIG. 14, the second return record list 152 may be used in place of "communication history information that is contained in communication history list and that caused job execution".

(c) In step S302 of FIG. 22, the first return record list 151 may be used in place of "communication history information that is contained in communication history list and that did not cause job execution".

(d) In step S342 of FIG. 23, the first return record list 151 may be used in place of "communication history information that is contained in communication history list and that did not cause job execution". In step S345 of FIG. 23, the second return record list 152 may be used in place of "communication history information that is contained in communication history list and that caused job execution".

(e) In step S362 of FIG. 30, the first return record list 151 may be used in place of "communication history information that is contained in communication history list and that did not cause job execution". In step S365 of FIG. 30, the second return record list 152 may be used in place of "communication history information that is contained in communication history list and that caused job execution".

(2) Specifically, each of the above devices is a computer system including a microprocessor, ROM, RAM or the like. A computer program is stored in the RAM. Each device realizes its functions by the microprocessor operating in accordance with the computer program. Here, the computer program is configured by combining a plurality of instruction codes representing instructions to a computer in order to achieve predetermined functions.

(3) The present invention may be the above-described methods. Alternatively, the present invention may be a computer program that realizes the above-described methods with use of the computer, or may be a digital signal configured from such a computer program.

Alternatively, the present invention may be a computer-readable recording medium (e.g., a flexible disk, hard disk, CD-ROM, MO, DVD, DVD-ROM, DVD-RAM, Blu-ray Disc (BD), and semiconductor memory) having recorded thereon the above computer program or digital signal. Alternatively, the present invention may be the above computer program or digital signal recorded on such a computer-readable recording medium.

Alternatively, the present invention may transmit the above computer program or digital signal via, for example, telecommunication lines, wireless or wired communication lines, data broadcasting, and a network whose representative example is the Internet.

Alternatively, the present invention may be a computer system including a microprocessor that operates in accordance with the above computer program and memory that stores therein the above computer program.

Alternatively, the above computer program or digital signal may be executed by another independent computer system by transmitting the above computer program or digital signal recorded on the above recording medium, or by transmitting the above computer program or digital signal via the above network or the like.

(4) The above embodiments and modification examples may be used in combination.

As described above, in the above embodiments and modification examples, a message for requesting a protocol changeover is transmitted. If an information terminal device accordingly changes its protocol, then the possibility of an image forming device returning to the normal mode from the power-saving mode decreases, thereby preventing wasteful consumption of power.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

INDUSTRIAL APPLICABILITY

With an image forming device and a control method pertaining to the present invention, the possibility of the image forming device returning to normal mode from power-saving mode decreases, even when receiving a request that is not directly related to printing. As a result, wasteful consumption of power can be prevented. Therefore, the image forming device and the control method pertaining to the present invention are useful as power-saving control technology applied to an image forming device such as a printer, a copier, a facsimile machine, and a multi-functional peripheral having the functions of a printer, a copier and a facsimile machine.

What is claimed is:

1. An image forming device that operates in one of power-saving mode and normal mode by switching therebetween, the image forming device comprising:

an automatic response unit configured to perform control to switch from the power-saving mode to the normal mode in response to a protocol on which a request issued by an information terminal device while the image forming device is in the power-saving mode is based;

an analysis unit configured to calculate a number of times the image forming device has switched from the power-saving mode to the normal mode without a job execution, and to judge whether or not the calculated number satisfies a predetermined criterion;

a message generation unit configured to, when the result of the judgment by the analysis unit is affirmative, generate a message for causing the information terminal device to change the protocol; and a transmission unit configured to transmit the generated message to the information terminal device.

2. The image forming device of claim 1 further comprising an automatic response storage unit storing therein an automatic response protocol list that contains pieces of information each indicating a different one of types of protocols, wherein the automatic response unit performs control to switch from the power-saving mode to the normal mode when one of the pieces of information indicates a type of the protocol on which the request issued by the information terminal device is based.

3. The image forming device of claim 2 further comprising a reception unit configured to receive, from another image forming device, an automatic response protocol list stored in said another image forming device, wherein the analysis unit (i) selects at least one piece of information indicating a type of a protocol that is not a multicast protocol by analyzing the automatic response protocol list received by the reception unit and the automatic response protocol list stored in the automatic response storage unit, and (ii) generates a suggested protocol list containing the selected piece of information, and the transmission unit transmits the suggested protocol list to the information terminal device.

4. The image forming device of claim 1 further comprising a history storage unit storing therein a communication history list that shows, for each of protocols on which requests issued by the information terminal device in the past are based, whether or not the image forming device has executed a job and whether or not the image forming device has switched from the power-saving mode to the normal mode, wherein with reference to the communication history list, the analysis unit analyzes whether or not the protocol on which the request issued by the information terminal device is based has a possibility of requiring the image forming device to switch from the power-saving mode to the normal mode without the job execution, and the message generation unit generates the message when the protocol has the possibility.

5. The image forming device of claim 4, wherein
the analysis unit includes:
a calculation unit configured to, with reference to the communication history list, calculate the number of times the image forming device has switched from the power-saving mode to the normal mode without the job execution; and
a judgment unit configured to judge whether or not the calculated number satisfies a predetermined criterion, and the message generation unit generates the message when the calculated number satisfies the predetermined criterion.

6. The image forming device of claim 4, wherein
the analysis unit includes:
a calculation unit configured to, with reference to the communication history list, calculate the number of times the image forming device has switched from the power-saving mode to the normal mode without the job execution;
a judgment unit configured to judge whether or not the calculated number satisfies a predetermined criterion; and
a search unit configured to search the communication history list for information indicating that the information terminal device has issued a request that causes the job execution, and the message generation unit generates the message when the following conditions are both met: the calculated number satisfies the predetermined criterion; and the search unit has not found the information indicating that the information terminal device has issued the request that causes the job execution.

7. The image forming device of claim 4, wherein
the history storage unit further stores therein a protocol changeover list containing, in one-to-one correspondence, (i) pieces of target protocol information each indicating a different one of types of target protocols, and (ii) pieces of alternative protocol information each indicating a different one of types of alternative protocols that can be used in place of the target protocols,
the analysis unit includes:
a calculation unit configured to, with reference to the communication history list, calculate the number of times the image forming device has switched from the power-saving mode to the normal mode without the job execution;
a judgment unit configured to judge whether or not the calculated number satisfies a predetermined criterion; and
a search unit configured to search whether or not one of the pieces of target protocol information indicates a type of the protocol on which the request issued by the information terminal device is based, and the message generation unit generates the message when both of the following conditions are met: the calculated number satisfies the predetermined criterion; and one of the pieces of target protocol information indicates the type of the protocol, the message further indicating that effects of power saving can be achieved by changing the protocol to a protocol whose type is indicated by one of the pieces of alternative protocol information corresponding to said one of the pieces of target protocol information.

8. The image forming device of claim 7, wherein
the analysis unit further calculates an amount of power that can be saved in the image forming device by changing the protocol to the protocol whose type is indicated by said one of the pieces of alternative protocol information, and the message generation unit generates the message further including information showing the calculated amount of power.

9. The image forming device of claim 4, wherein
the transmission unit transmits the message to the information terminal device when the information terminal device has issued the request based on the protocol that requires the image forming device to switch from the power-saving mode to the normal mode without the job execution.

10. The image forming device of claim 9, wherein
the history storage unit further stores therein an alternative protocol list containing, in one-to-one correspondence, (i) pieces of target protocol information each indicating a different one of types of target protocols, and (ii) pieces of alternative protocol information each indicating a different one of types of alternative protocols that can be used in place of the target protocols, the image forming device further comprises a reception unit configured to receive, from the information terminal device, a piece of protocol information indicating a type of the protocol on which the request issued by the information terminal device is based, the analysis unit analyzes whether or not the received piece of protocol information matches one of the pieces of target protocol information contained in the alternative protocol list, and when the received piece of protocol information matches one of the pieces of target protocol information contained in the alternative protocol list, the message generation unit generates a message suggesting that the protocol be changed to a protocol whose type is indicated by one of the pieces of alternative protocol information corresponding to said one of the pieces of target protocol information.

11. The image forming device of claim 4, wherein
the transmission unit transmits the message to another information terminal device used by an administrator.

12. The image forming device of claim 11, wherein
the history storage unit further stores therein an alternative protocol list containing, in one-to-one correspondence, (i) pieces of target protocol information each indicating a different one of types of target protocols associated with requests that do not cause the job execution, and (ii) pieces of alternative protocol information each indicating a different one of types of alternative protocols that can be used in place of the target protocols, the image forming device further comprises a reception unit configured to receive, from the information terminal device, a piece of protocol information indicating a type of the protocol on which the request issued by the information terminal device is based, the analysis unit analyzes whether or not the received piece of protocol information matches one of the pieces of target protocol information contained in the alternative protocol list, and when the received piece of protocol information matches one of the pieces of target protocol information contained in the alternative protocol list, the message generation unit generates a message including (i) terminal information indicating the information terminal device, (ii) the piece of protocol information indicating the type of the protocol, and (iii) one of the pieces of alternative protocol information corresponding to said one of the pieces of target protocol information.

13. An image forming device that operates in one of power-saving mode and normal mode by switching therebetween, the image forming device comprising:
an automatic response storage unit storing therein an automatic response protocol list that contains pieces of information, the pieces of information each indicating a different one of types of protocols and whether to switch from the power-saving mode to the normal mode in response to a protocol on which a request issued by an information terminal device while the image forming device is in the power-saving mode is based;

an automatic response unit configured to, with reference to the automatic response protocol list, perform control to switch from the power-saving mode to the normal mode when the protocol on which the request issued by the information terminal device is based corresponds to a type of a protocol for switching from the power-saving mode to the normal mode;

an analysis unit configured to calculate a number of times the image forming device has switched from the power-saving mode to the normal mode without a job execution according to a first protocol, and to judge whether or not the calculated number satisfies a predetermined criterion; and a deletion unit configured to, when the result of the judgment by the analysis unit is affirmative, delete, from the automatic response protocol list stored in the automatic response storage unit, one of the pieces of information indicating a type of the first protocol.

14. The image forming device of claim 13, wherein
the pieces of information are protocol numbers each identifying the corresponding protocol, the automatic response protocol list contains the protocol numbers as the pieces of information, the automatic response unit performs control to switch from the power-saving mode to the normal mode when one of the protocol numbers, which are contained in the automatic response protocol list, identifies the protocol on which the request issued by the information terminal device is based, and when the result of the analysis by the analysis unit is affirmative, the deletion unit deletes, from the automatic response protocol list, one of the protocol numbers identifying the first protocol.

15. The image forming device of claim 14 further comprising
a history storage unit storing therein a communication history list that shows, for each of protocols on which requests issued by the information terminal device in the past are based, whether or not the image forming device has executed a job and whether or not the image forming device has switched from the power-saving mode to the normal mode, wherein with reference to the communication history list, the analysis unit analyzes whether or not the protocol on which the request issued by the information terminal device is based has a possibility of requiring the image forming device to switch from the power-saving mode to the normal mode without the job execution, and when the protocol has the possibility, the deletion unit deletes one of the protocol numbers identifying the protocol from the automatic response protocol list.

16. The image forming device of claim 13, wherein
the analysis unit further judges whether or not one of the pieces of information indicates a type of the protocol on which the request issued by the information terminal device is based, whether or not the protocol relates to device management, and whether or not the image forming device is a server, and the deletion unit deletes, from the automatic response protocol list, one of the pieces of information indicating the type of the protocol when all of the following conditions are met: one of the pieces of information indicates the type of the protocol; the protocol relates to the device management; and the image forming device is not the server.

17. A control method used by an image forming device that operates in one of power-saving mode and normal mode by switching therebetween, the control method comprising:
- an automatic response step of performing control to switch from the power-saving mode to the normal mode in response to a protocol on which a request issued by an information terminal device while the image forming device is in the power-saving mode is based;
- an analysis step of calculating a number of times the image forming device has switched from the power-saving mode to the normal mode without a job execution, and judging whether or not the calculated number satisfies a predetermined criterion;
- a message generation step of, when the result of the judgment by the analysis step is affirmative, generating a message for causing the information terminal device to change the protocol; and
- a transmission step of transmitting the generated message to the information terminal device.

18. A control method used by an image forming device that operates in one of power-saving mode and normal mode by switching therebetween and that comprises an automatic response storage unit storing therein an automatic response protocol list that contains pieces of information, the pieces of information each indicating a different one of types of protocols and whether to switch from the power-saving mode to the normal mode in response to a protocol on which a request issued by an information terminal device while the image forming device is in the power-saving mode is based, the control method comprising:
- an automatic response step of performing control, with reference to the automatic response protocol list, to switch from the power-saving mode to the normal mode when the protocol on which the request issued by the information terminal device is based corresponds to a type of a protocol for switching from the power-saving mode to the normal mode;
- an analysis step of calculating a number of times the image forming device has switched from the power-saving mode to the normal mode without a job execution according to a first protocol, and judging whether or not the calculated number satisfies a predetermined criterion; and
- a deletion step of, when the result of the judgment by the analysis step is affirmative, deleting, from the automatic response protocol list stored in the automatic response storage unit, one of the pieces of information indicating a type of the first protocol.

* * * * *